United States Patent
Kimura

(10) Patent No.: US 7,180,479 B2
(45) Date of Patent: Feb. 20, 2007

(54) SIGNAL LINE DRIVE CIRCUIT AND LIGHT EMITTING DEVICE AND DRIVING METHOD THEREFOR

(75) Inventor: Hajime Kimura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 411 days.

(21) Appl. No.: 10/282,004

(22) Filed: Oct. 29, 2002

(65) Prior Publication Data

US 2003/0128199 A1    Jul. 10, 2003

(30) Foreign Application Priority Data

Oct. 30, 2001   (JP)   ............... 2001-333470
Sep. 30, 2002   (JP)   ............... 2002-288043

(51) Int. Cl.
*G09G 3/28*   (2006.01)
(52) U.S. Cl. .................... 345/60; 345/211
(58) Field of Classification Search ........... 345/204, 345/211, 212, 98, 60, 66, 213; 315/291
See application file for complete search history.

(56) References Cited

U.S. PATENT DOCUMENTS

| | | | |
|---|---|---|---|
| 5,041,823 A | | 8/1991 | Johnson et al. |
| 5,138,310 A | * | 8/1992 | Hirane et al. ........... 345/82 |
| 5,266,936 A | * | 11/1993 | Saitoh ................ 345/98 |
| 5,517,207 A | * | 5/1996 | Kawada et al. ......... 345/78 |
| 5,793,163 A | * | 8/1998 | Okuda ............. 315/169.2 |
| 5,844,368 A | * | 12/1998 | Okuda et al. ......... 315/169.3 |
| 5,953,003 A | * | 9/1999 | Kwon et al. .......... 345/204 |
| 6,091,203 A | | 7/2000 | Kawashima et al. |
| 6,201,822 B1 | * | 3/2001 | Okayasu ............. 372/38.04 |
| 6,222,357 B1 | | 4/2001 | Sakuragi |

(Continued)

FOREIGN PATENT DOCUMENTS

EP    1 063 630 A2   12/2000

(Continued)

OTHER PUBLICATIONS

Reiji Hattori et al., "Analog-Circuit Simulation of the Current-Programmed Active-Matrix Pixel Electrode Circuits Based on Poly-Si TFT for Organic Light-Emitting Displays," The Japan Society of Applied Physics, AM-LCD '01, Jul. 11-13, 2001, pp. 223-226.

(Continued)

*Primary Examiner*—Kent Chang
(74) *Attorney, Agent, or Firm*—Eric J. Robinson; Robinson Intellectual Property Law Office, P.C.

(57) ABSTRACT

The variation of characteristics of transistors occurs. The present invention is a signal line drive circuit having a plurality of current source circuit corresponding to a plurality of wirings, a first and a second shift registers, a latch circuit, the foregoing plurality of current source circuits have capacity means and supplying means, respectively, characterized in that the foregoing capacity means converts a supplied current into a voltage according to a sampling pulse supplied from the foregoing first shift register, the foregoing supplying means supplies a current corresponding to the foregoing converted voltage according to a video signal, and the foregoing latch circuit operates according to a sampling pulse supplied from the foregoing second shift register.

28 Claims, 55 Drawing Sheets

U.S. PATENT DOCUMENTS

| | | | |
|---|---|---|---|
| 6,229,506 | B1 | 5/2001 | Dawson et al. |
| 6,310,589 | B1 * | 10/2001 | Nishigaki et al. ............. 345/76 |
| 6,331,844 | B1 * | 12/2001 | Okumura et al. ............. 345/87 |
| 6,344,843 | B1 | 2/2002 | Koyama et al. |
| 6,369,516 | B1 | 4/2002 | Iketsu et al. |
| 6,373,454 | B1 | 4/2002 | Knapp et al. |
| 6,473,064 | B1 | 10/2002 | Tsuchida et al. |
| 6,501,466 | B1 * | 12/2002 | Yamagishi et al. ......... 345/204 |
| 6,552,702 | B1 | 4/2003 | Abe et al. |
| 6,714,091 | B2 * | 3/2004 | Norskov et al. ............. 331/185 |
| 6,788,231 | B1 * | 9/2004 | Hsueh ........................ 341/135 |
| 6,809,320 | B2 * | 10/2004 | Iida et al. ................. 250/338.4 |
| 6,876,350 | B2 * | 4/2005 | Koyama ..................... 345/92 |
| 6,937,233 | B2 | 8/2005 | Sakuma et al. |
| 6,963,336 | B2 * | 11/2005 | Kimura ..................... 345/204 |
| 6,999,048 | B2 * | 2/2006 | Sun et al. .................... 345/82 |
| 2001/0048410 | A1 | 12/2001 | Nishigaki et al. |
| 2002/0057244 | A1 * | 5/2002 | Koyama et al. ............. 345/87 |
| 2002/0135309 | A1 | 9/2002 | Okuda |
| 2003/0048669 | A1 | 3/2003 | Abe |
| 2003/0128199 | A1 | 7/2003 | Kimura |
| 2003/0128200 | A1 | 7/2003 | Yumoto |
| 2003/0156012 | A1 | 8/2003 | Omidi et al. |
| 2003/0156102 | A1 | 8/2003 | Kimura |
| 2003/0169250 | A1 | 9/2003 | Kimura |
| 2004/0085029 | A1 | 5/2004 | Kimura |
| 2004/0085270 | A1 | 5/2004 | Kimura |
| 2004/0174282 | A1 | 9/2004 | Sun et al. |
| 2004/0207578 | A1 * | 10/2004 | Koyama ..................... 345/76 |
| 2004/0222985 | A1 * | 11/2004 | Kimura ..................... 345/212 |
| 2005/0001794 | A1 * | 1/2005 | Nakanishi et al. ........... 345/76 |
| 2006/0028413 | A1 | 2/2006 | Kimura |
| 2006/0103610 | A1 | 5/2006 | Kimura |

FOREIGN PATENT DOCUMENTS

| | | |
|---|---|---|
| EP | 1 102 234 | 5/2001 |
| JP | 62-122488 | 8/1987 |
| JP | 05-042488 | 10/1993 |
| JP | 06-118913 | 4/1994 |
| JP | 08-095522 | 4/1996 |
| JP | 08-101669 | 4/1996 |
| JP | 08-106075 | 4/1996 |
| JP | 09-244590 | 9/1997 |
| JP | 10-312173 | 11/1998 |
| JP | 11-045071 | 2/1999 |
| JP | 11-231834 | 8/1999 |
| JP | 11-282419 | 10/1999 |
| JP | 2000-081920 | 3/2000 |
| JP | 2000-122607 | 4/2000 |
| JP | 2001-034221 | 2/2001 |
| JP | 2001-042822 | 2/2001 |
| JP | 2001-056667 | 2/2001 |
| JP | 2001-147659 | 5/2001 |
| JP | 2001-290469 | 10/2001 |
| JP | 2001-005426 | 1/2002 |
| JP | 2002-514320 | 5/2002 |
| JP | 2002-517806 | 6/2002 |
| JP | 2002-215095 | 7/2002 |
| JP | 2002-278497 | 9/2002 |
| JP | 2003-150112 | 5/2003 |
| JP | 2003-195812 | 7/2003 |
| WO | WO 98/48403 | 10/1998 |
| WO | WO 99/65011 | 12/1999 |
| WO | WO 02/39420 | 5/2002 |

OTHER PUBLICATIONS

Reiji Hattori et al. "Circuit Simulation of Poly-Si TFT Based Current-Writing Active-Matrix Organic LED Display," Technical Report of IEICE, ED2001-8, pp. 7-14.

Abe et al., *16-1: A Poly-Si TFT 6-Bit Current Data Driver for Active Matrix Organic Light Emitting Diode Displays*, Eurodisplay 2002, pp. 279-282.

Hattori, *Data-Line Driver Circuits for Current Programmed Active-Matrix OLED Based on Poly-Si TFTs*, AM-LCD '02, pp. 17-20.

Yumoto et al., *Pixel-Driving Methods for Large-Sized Poly-Si AM-OLED Displays*, Asia Display/IDW '01, pp. 1395-1398.

J. Tseng et al., *A NEW 6-bit Digital-type Current Driven Structure of OLED Display*, IDW '03, Proceedings of the 10th International Display Workshops, Jan. 2003, pp. 271-274.

K. Morosawa et al., *A Novel Poly-Si TFT Current DAC Circuit for AM-OLED Displays*, AM-LCD '03, Digest of Technical Papers, Jan. 2003, pp. 301-304.

J. Tseng et al., *An Active Matrix OLED Display Employing an Improving Gray Scale Structure*, IDW '03, Proceedings of the 10th International Display Workshops, Jan. 2003, pp. 523-526.

International Preliminary Examination Report mailed Oct. 14, 2004 for Application No. PCT/JP2002/011355.

International Preliminary Examination Report mailed Oct. 14, 2004 for Application No. PCT/JP2002/011278.

International Preliminary Examination Report mailed Oct. 14, 2004 for Application No. PCT/JP2002/011280.

International Preliminary Examination Report mailed Oct. 14, 2004 for Application No. PCT/JP2002/011354.

International Preliminary Examination Report dated Oct. 14, 2004 for Application No. PCT/JP2002/011279.

Official Action dated Aug. 25, 2005 for U.S. Appl. No. 10/282,234 to Kimura.

\* cited by examiner

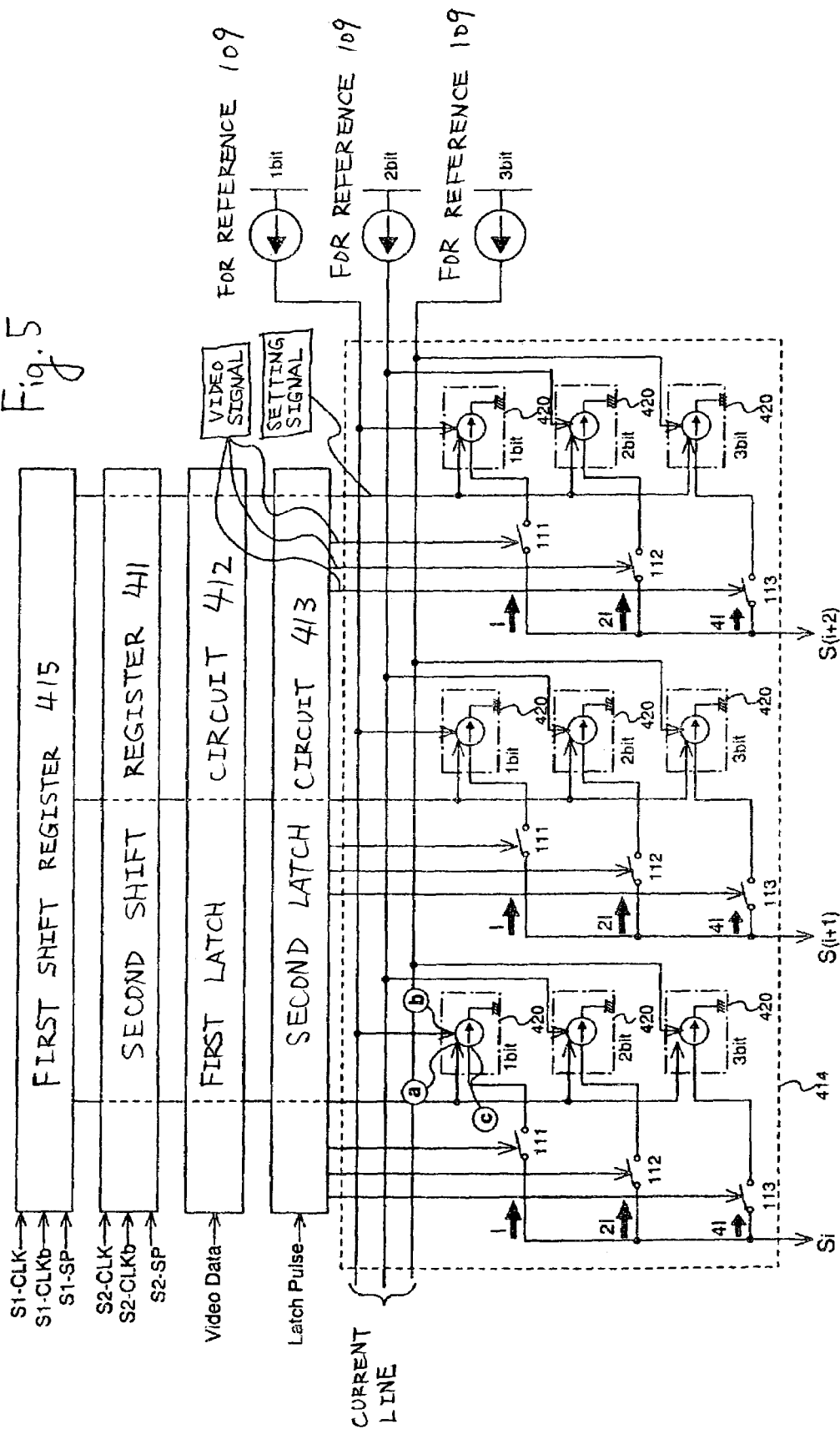

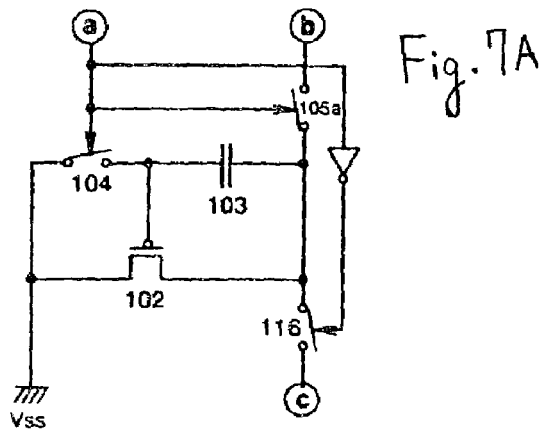
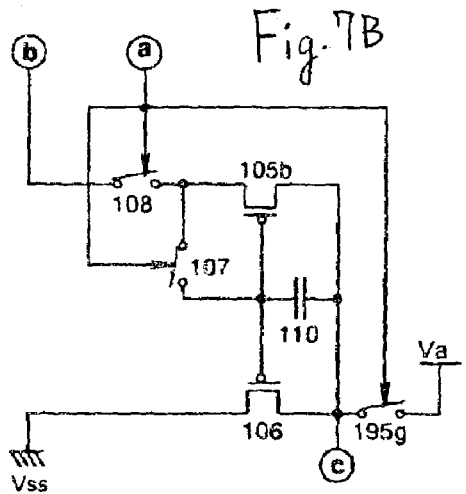
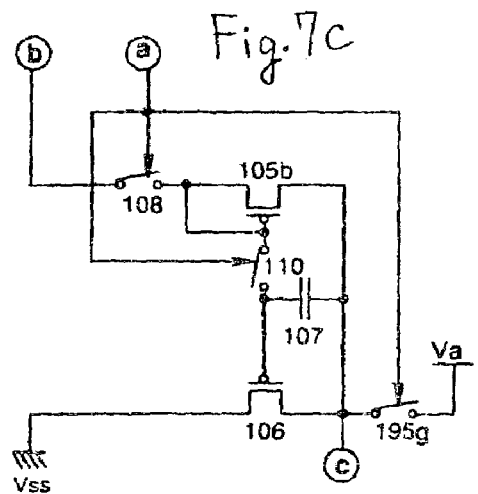
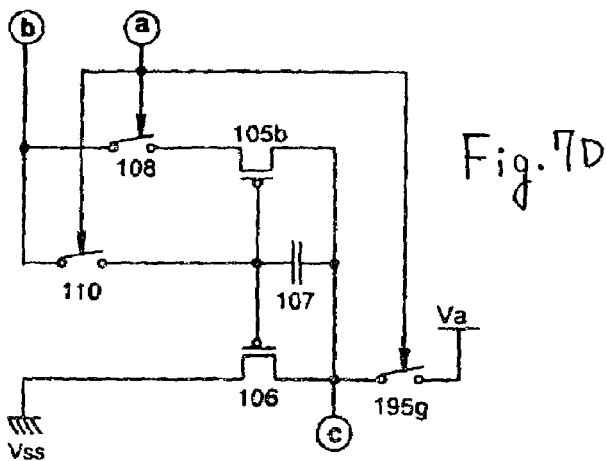

Fig.13A
Fig.13B
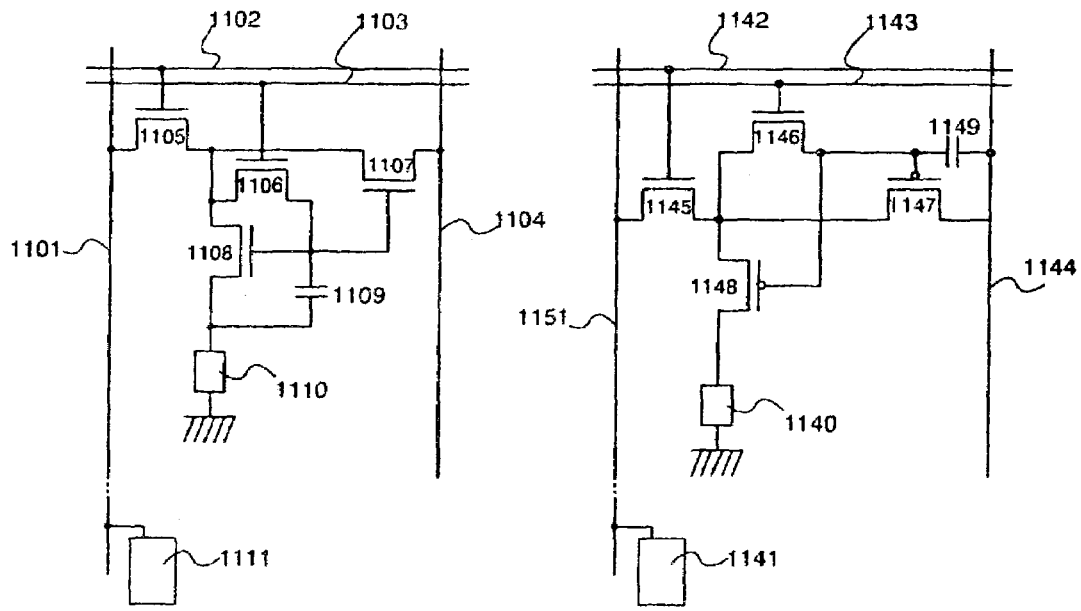
Fig.13C
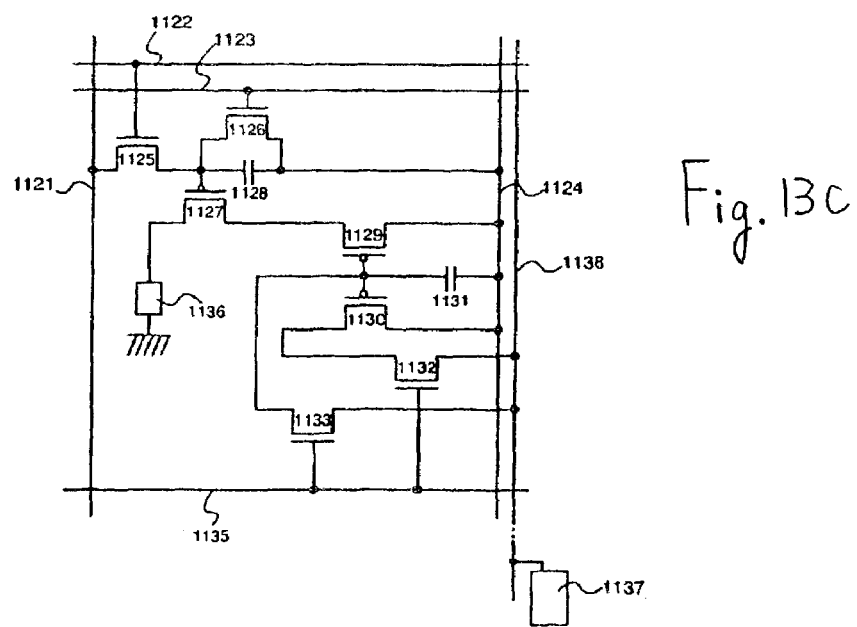

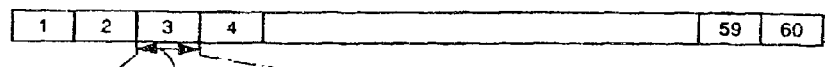
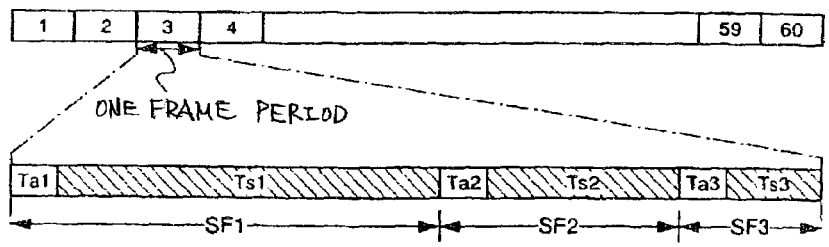
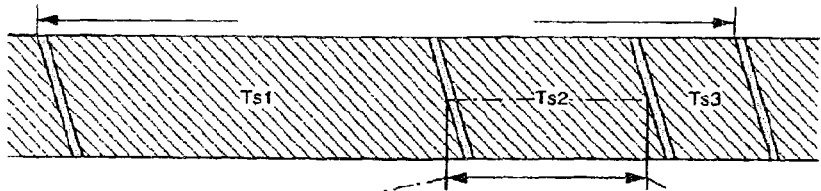
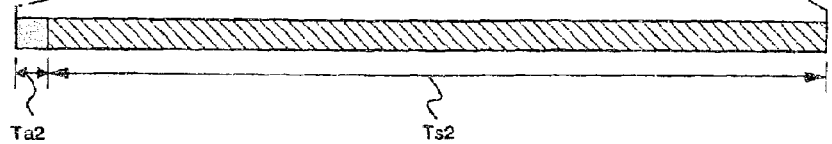
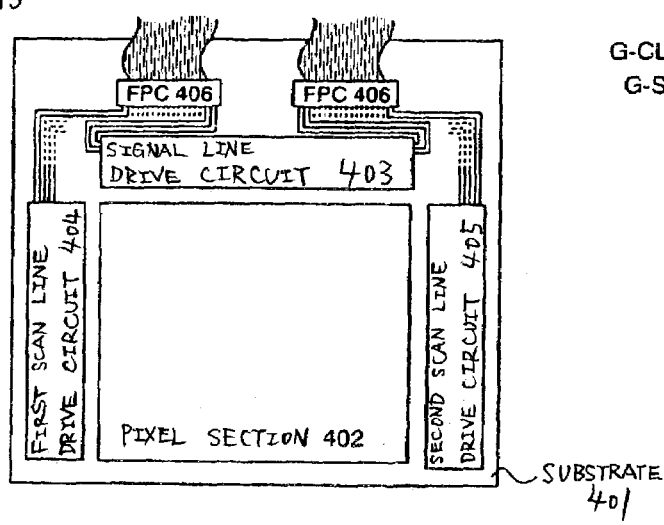
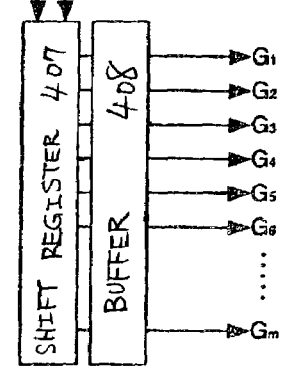

501 : SIGNAL LINE
502 : SCAN LINE
503 : TFT FOR SWITCHING
504 : TFT FOR DRIVING
505 : CAPACITY ELEMENT
506 : LIGHT EMITTING ELEMENT
507, 508 : ELECTRIC SOURCE

Prior Art

601 : SIGNAL LINE
602 : FIRST SCAN LINE
603 : SECOND SCAN LINE
604 : THIRD SCAN LINE
605 : CURRENT LINE
606~609 : TFT
610 : CAPACITY ELEMENT
611 : LIGHT EMITTING ELEMENT
612 : CURRENT SOURCE CIRCUIT

Prior Art

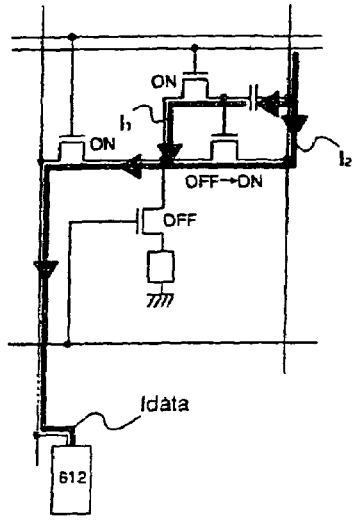
Fig. 17 (A) AT THE TIME WHEN SIGNAL IS INPUTTED
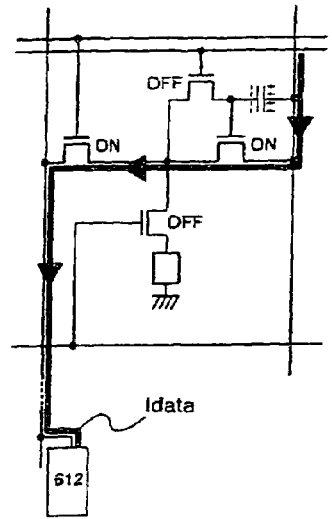
Fig. 17 (B) AT THE TIME WHEN SIGNAL INPUT IS COMPLETED
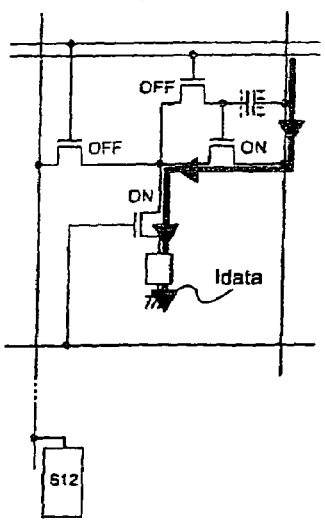
Fig. 17 (C) DURING LIGHT EMITTING
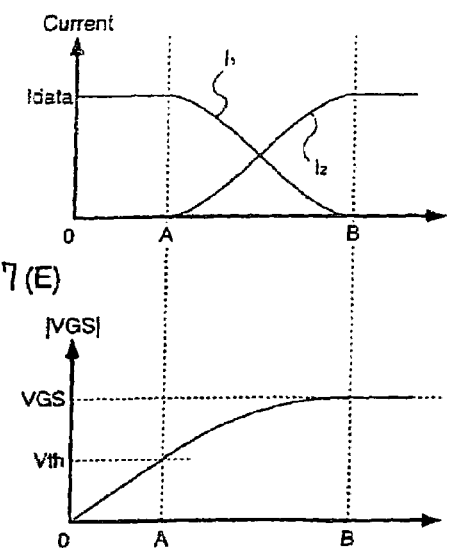
Fig. 17 (D)
Fig. 17 (E)
Prior Art

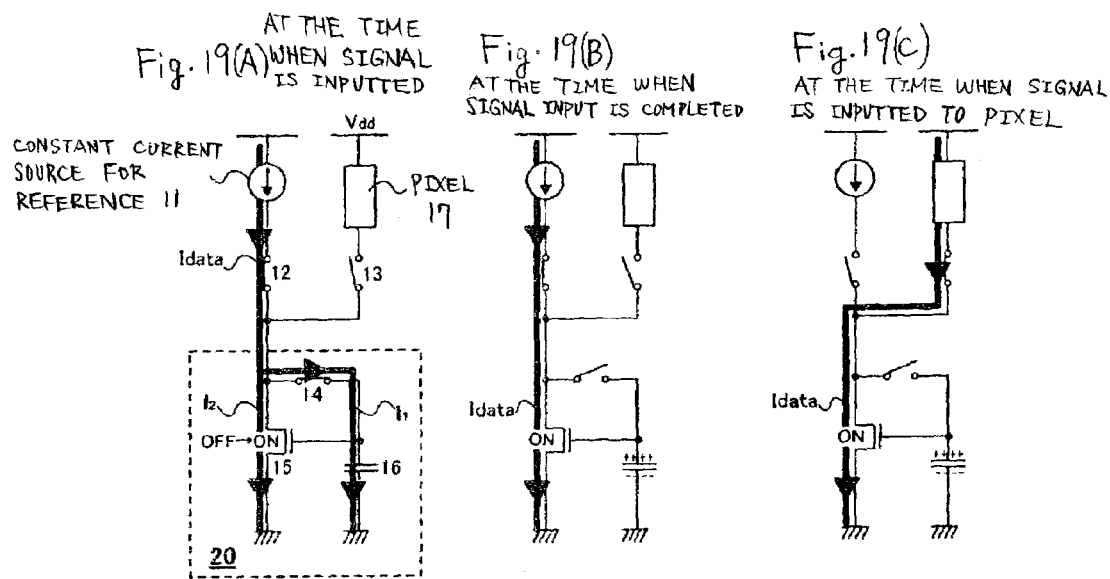
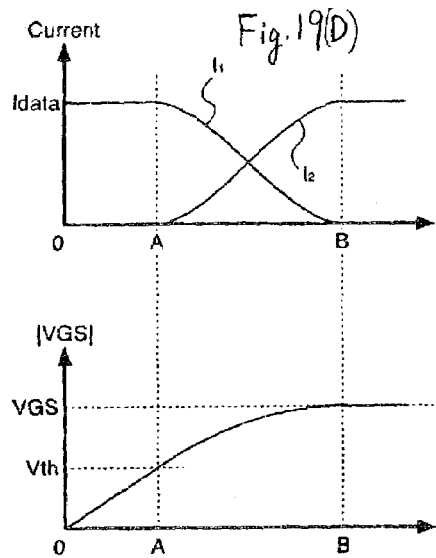
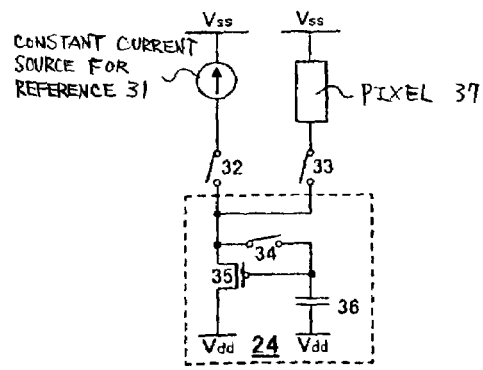

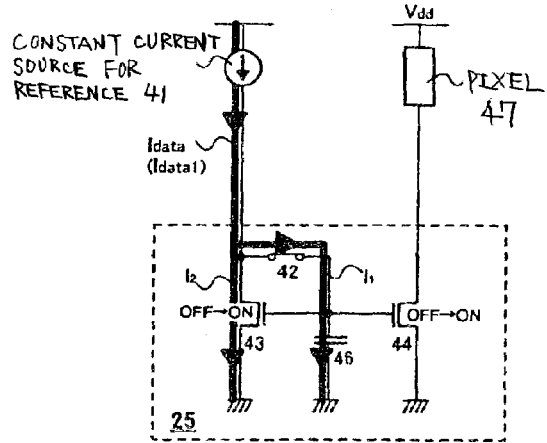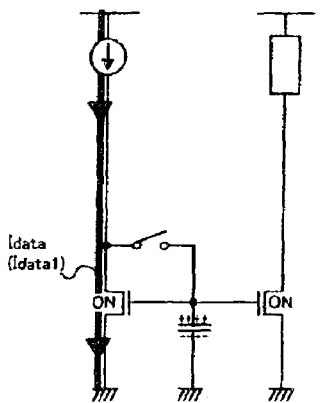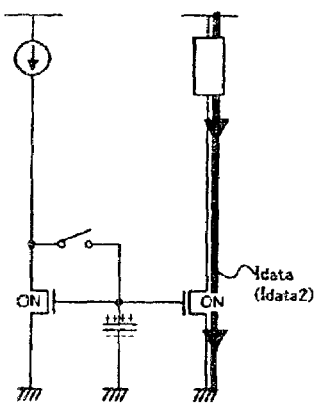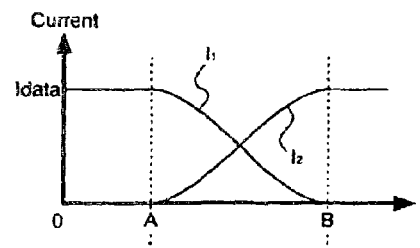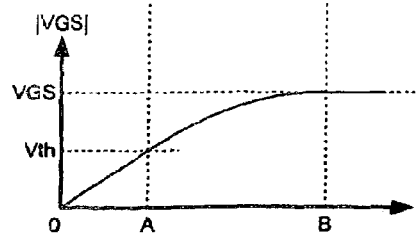

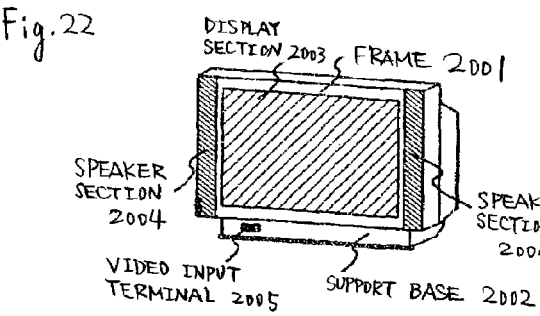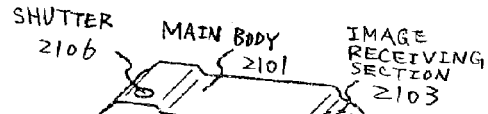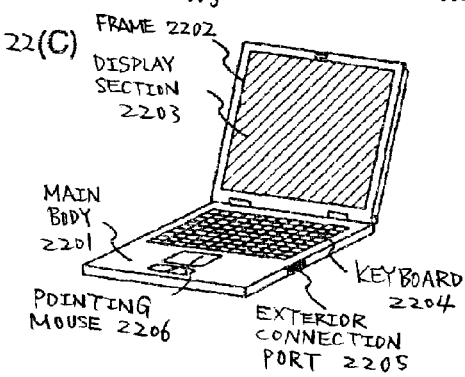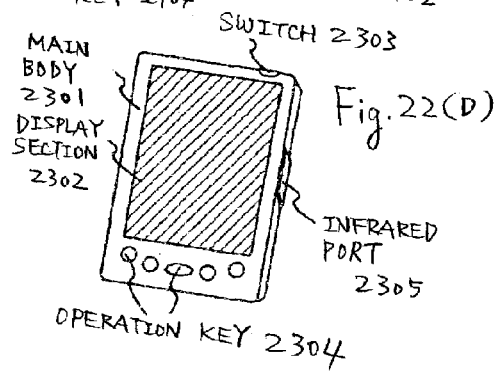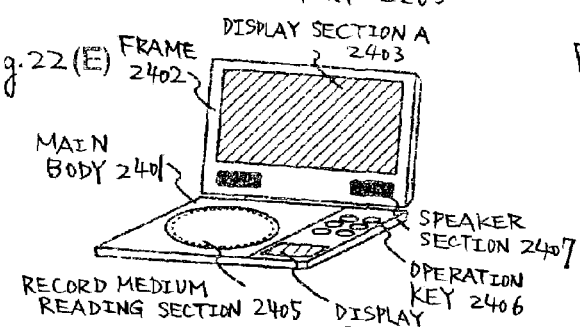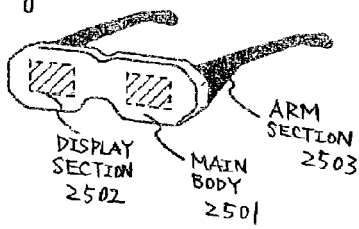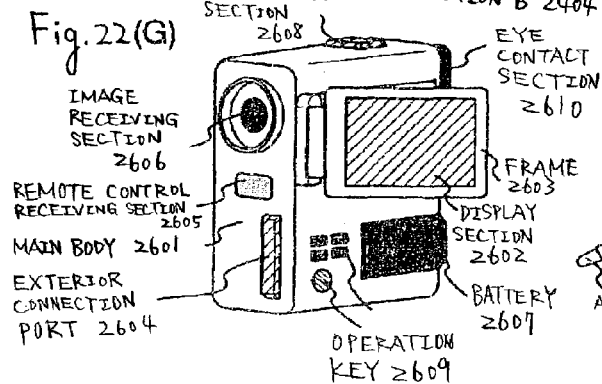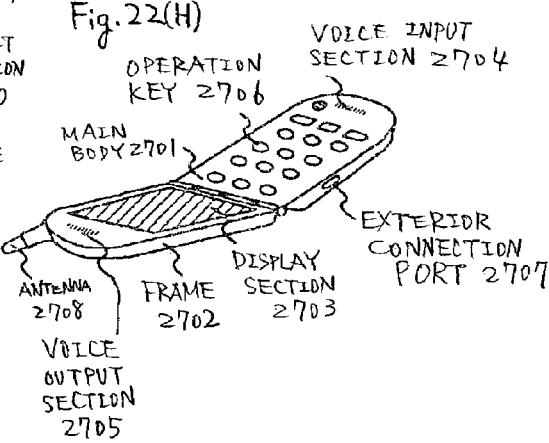

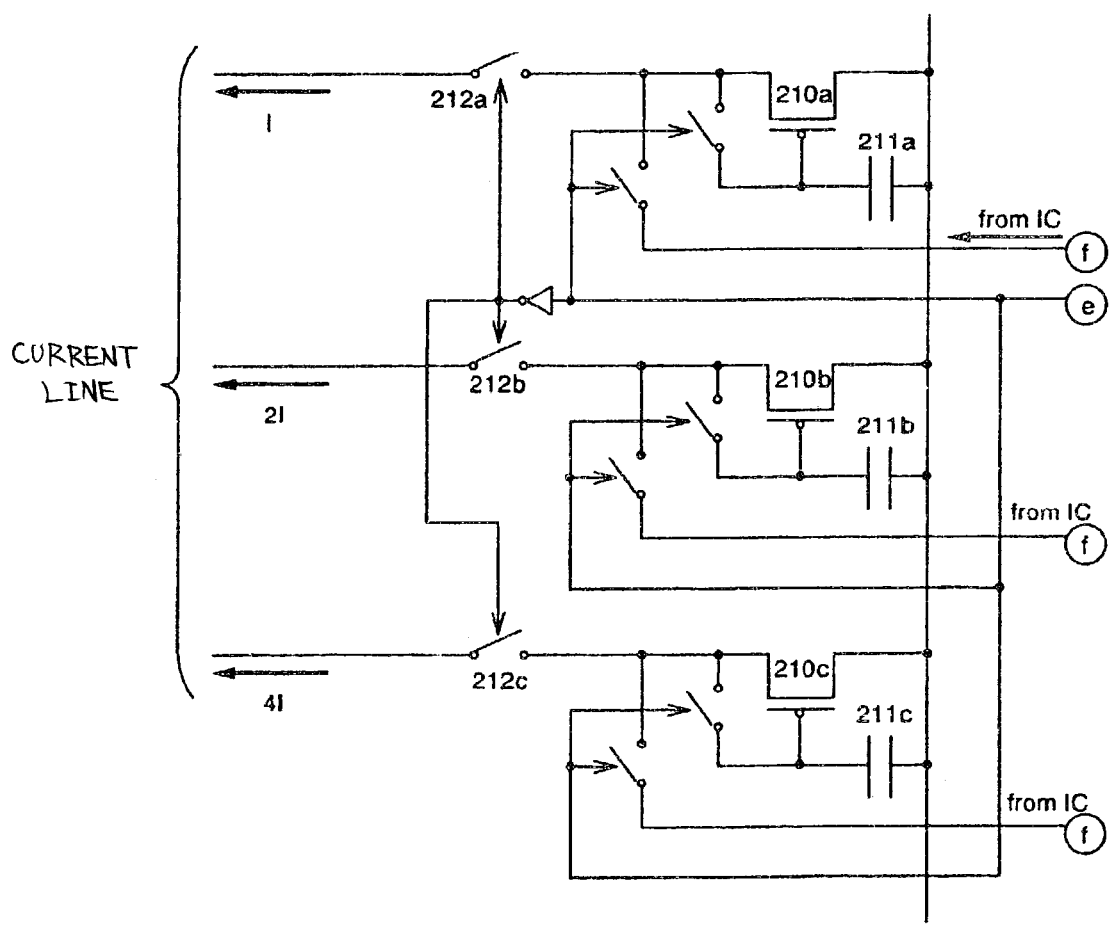

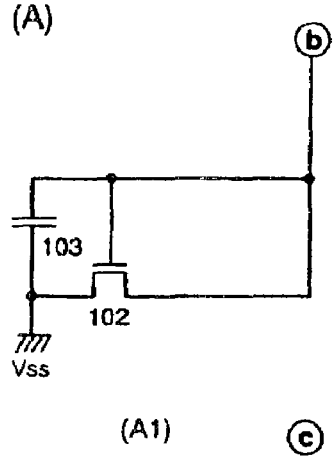
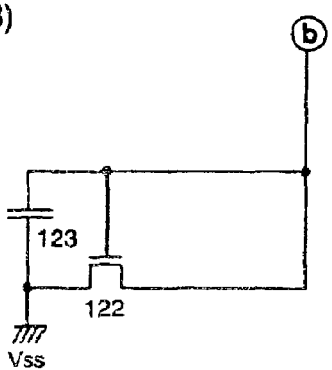
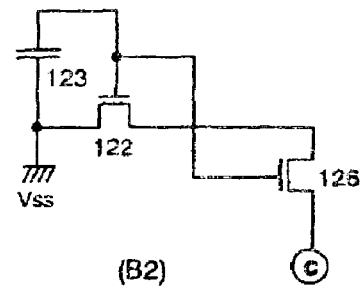
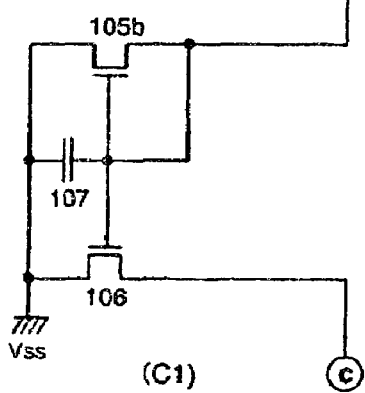
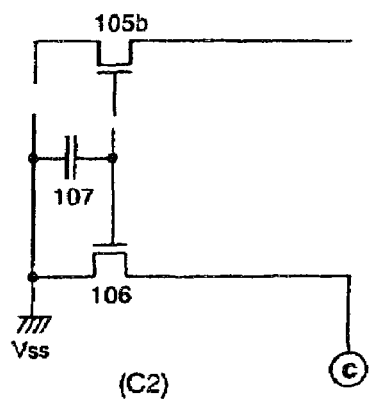
Fig. 31 (A), Fig. 31 (B), Fig. 31 (C)

Fig.34 (A) 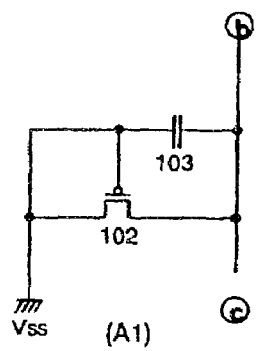 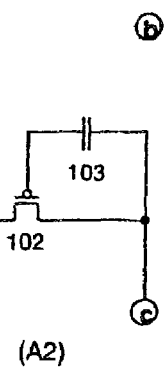
(A1)　　　　　　　(A2)
Fig.34 (B) 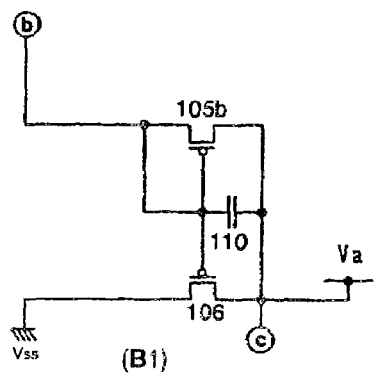 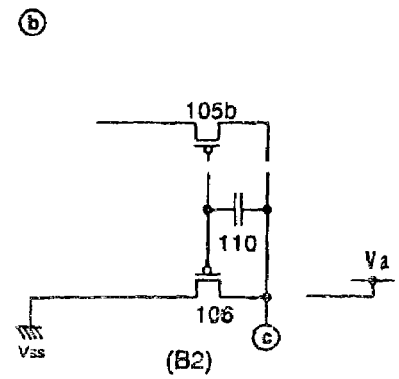
(B1)　　　　　　　(B2)
Fig.34 (C) 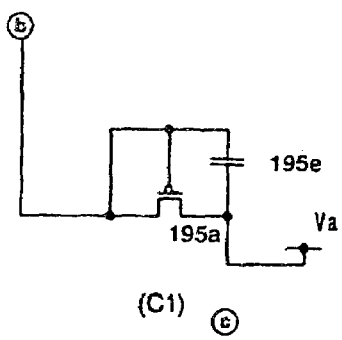 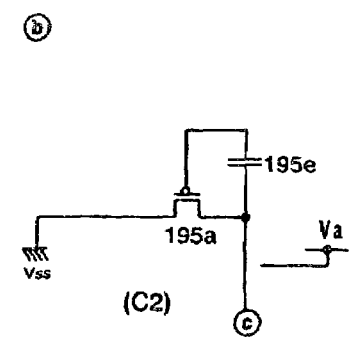
(C1)　　　　　　　(C2)
Fig.34 (D) 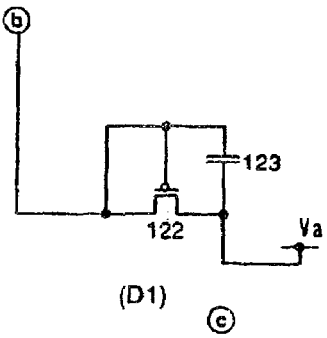 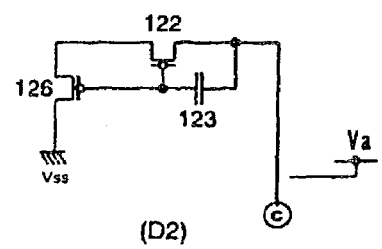
(D1)　　　　　　　(D2)

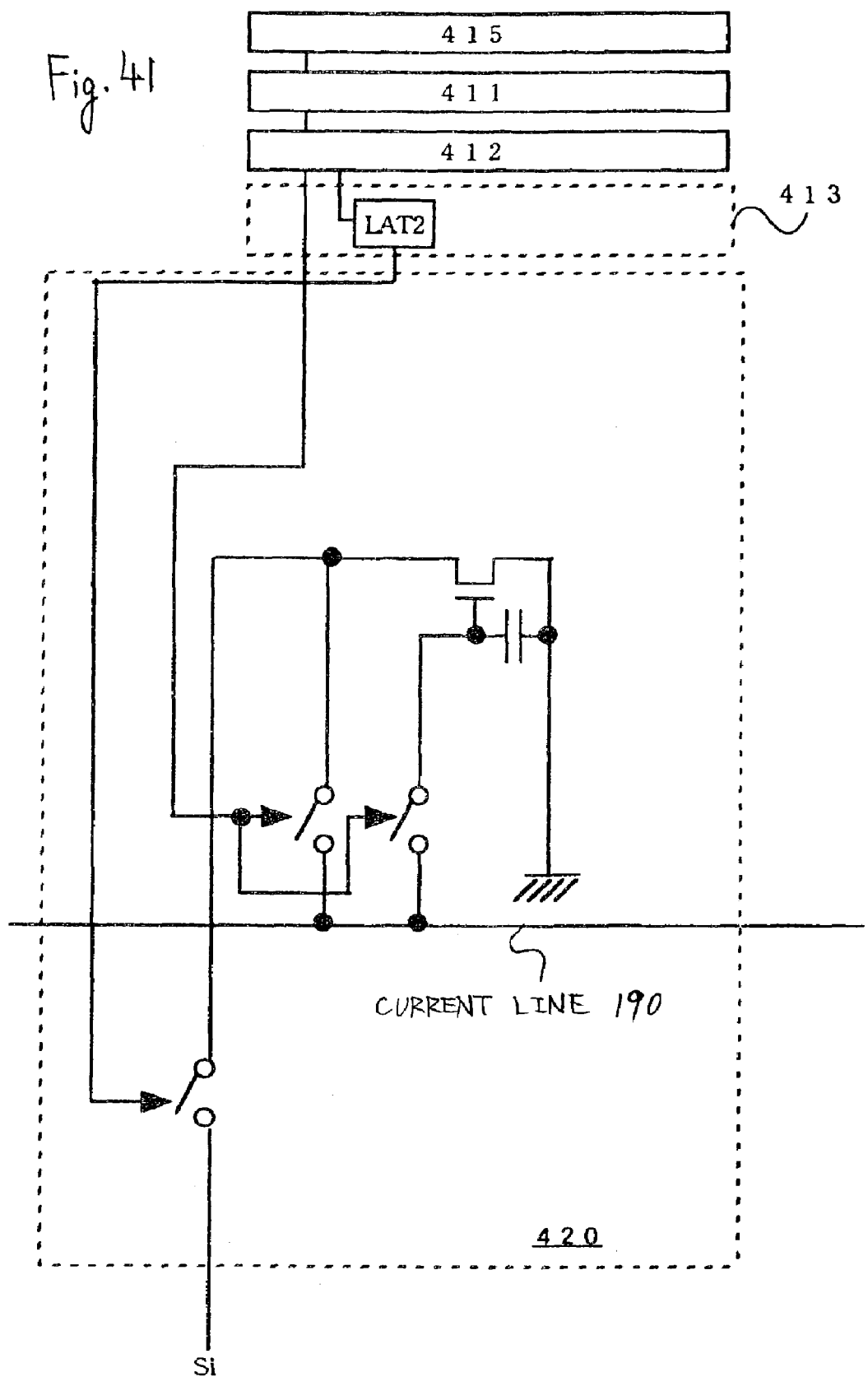

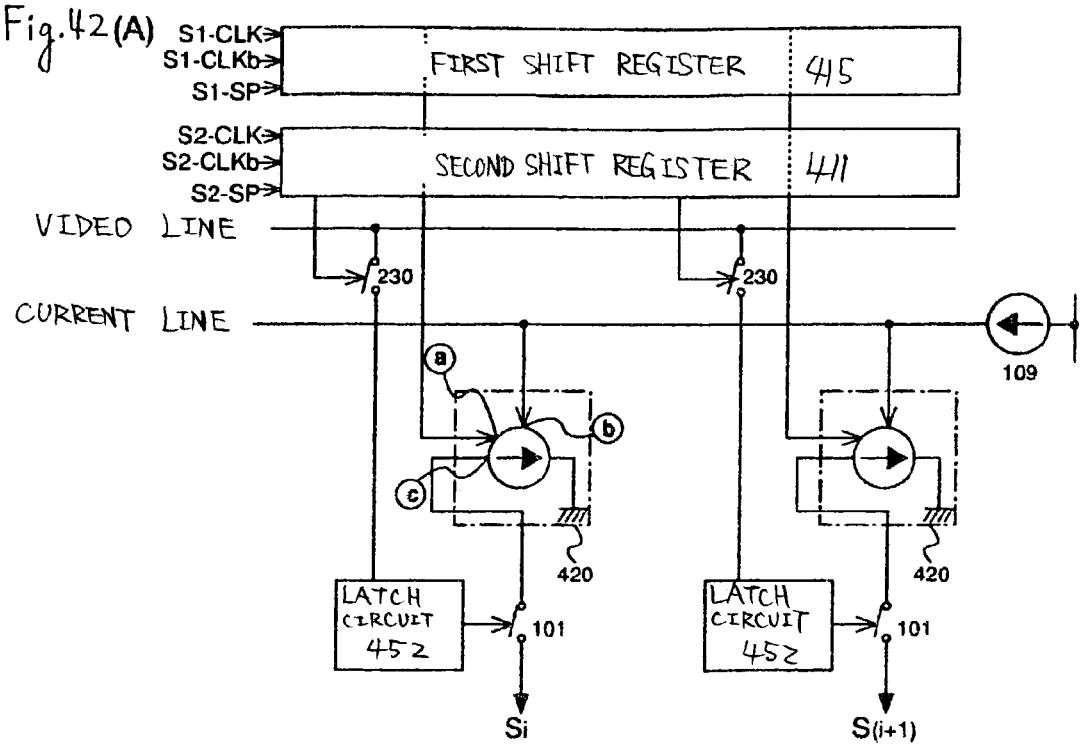
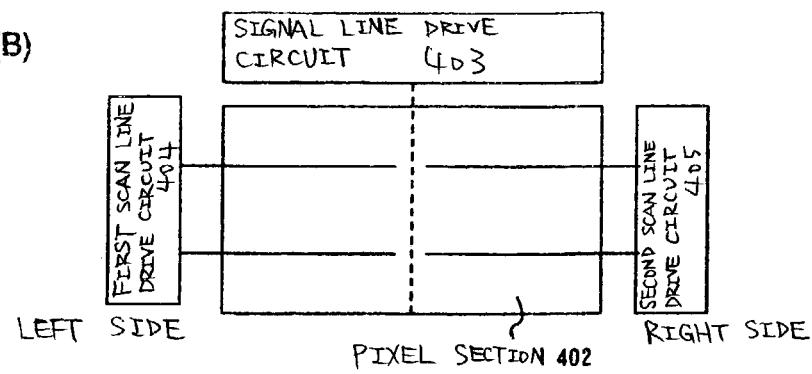
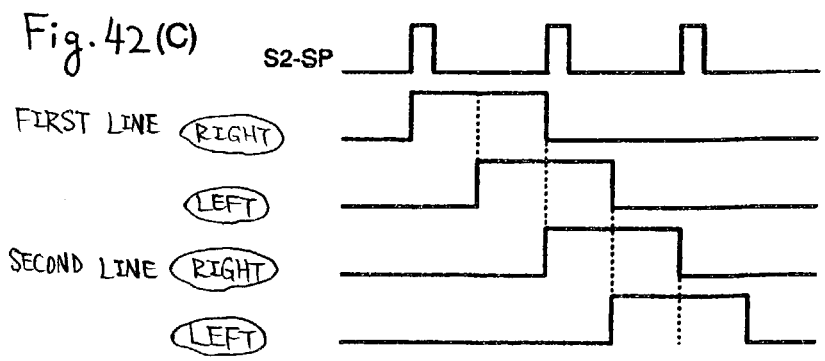

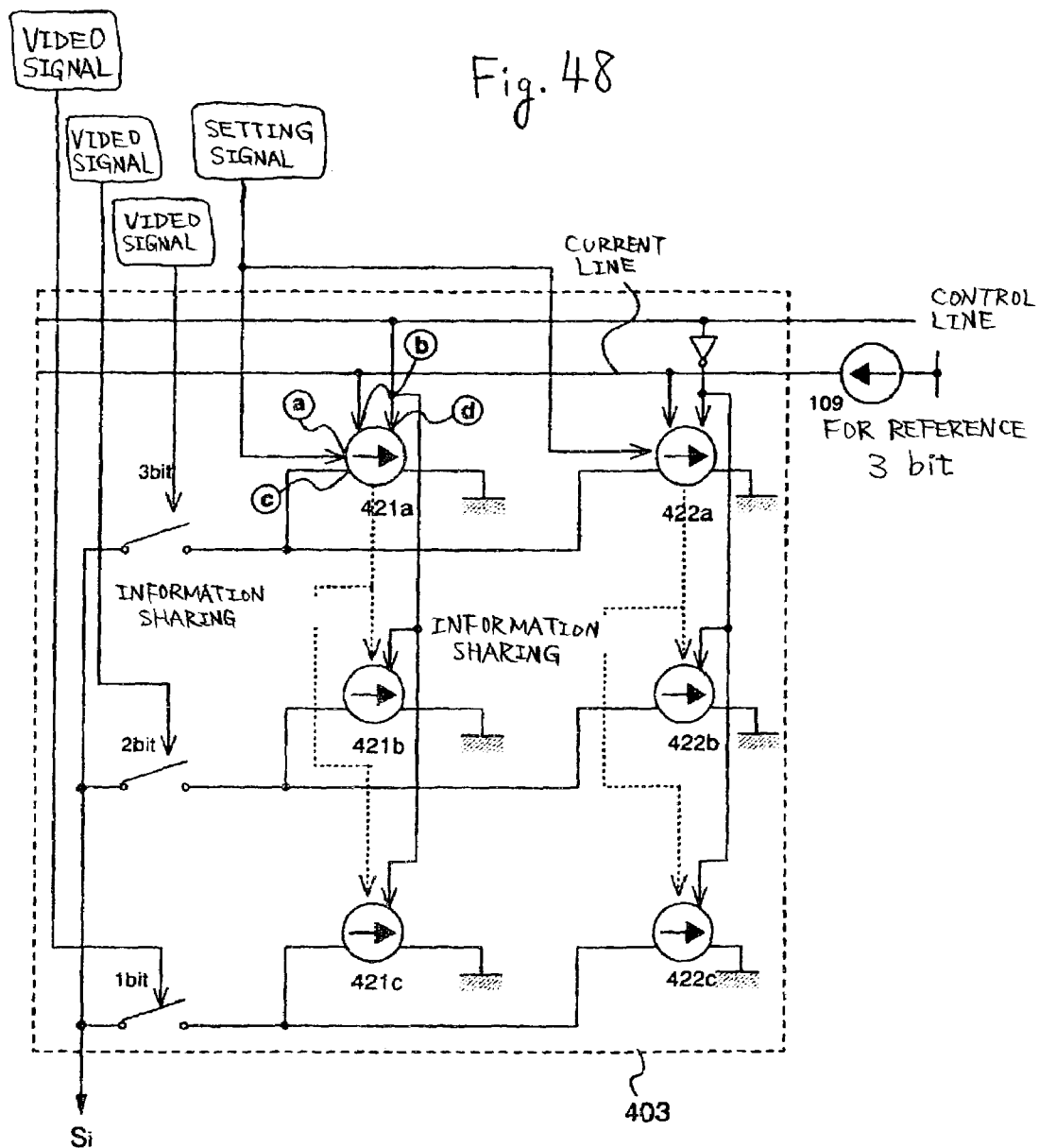

SIGNAL LINE DRIVE CIRCUIT AND LIGHT EMITTING DEVICE AND DRIVING METHOD THEREFOR

TECHNICAL FIELD

The present invention relates to a technique of a signal line driver circuit. Further, the present invention relates to a light emitting device including the signal line driver circuit.

BACKGROUND ART

Recently, display devices for performing image display are being developed. Liquid crystal display apparatus that perform image display by using a liquid crystal device are widely used as display apparatus because of advantages of high image quality, thinness, lightweight, and the like.

In addition, light emitting apparatus using self-light emitting devices as light emitting devices are recently being developed. The light emitting apparatus has characteristics of, for example, a high response speed suitable for motion image display, low voltage, and low power consumption, in addition to advantages of existing liquid crystal display apparatus, and thus, attracts a great deal of attention as the next generation display.

As gradation representation methods used in displaying a multi-gradation image on a light emitting apparatus, an analog gradation method and a digital gradation method are given. The former analog gradation method is a method in which the gradation is obtained by conducting analog control of the magnitude of a current that flows to a light emitting device. The latter digital gradation method is a method in which the light emitting device is driven only in two states thereof: an ON state (state where the luminance is substantially 100%) and an OFF state (state where the luminance is substantially 0%). In the digital gradation method, since only two gradations can be displayed, a method configured by combining the digital gradation method and a different method to display multi-gradation images has been proposed.

When classification is made based on the type of a signal that is input to pixels, a voltage input method and a current input method are given as pixel-driving methods. The former voltage input method is a method in which: a video signal (voltage) that is input to a pixel is input to a gate electrode of a driving element; and the driving element is used to control the luminance of a light emitting device. The latter current input method is a method in which the set signal current is flown to a light emitting device to control the luminance of the light emitting device.

Hereinafter, referring to FIG. 16(A), a brief description will be made of an example of a circuit of a pixel in a light emitting apparatus employing the voltage input method and a driving method thereof. The pixel shown in FIG. 16(A) includes a signal line 501, a scanning line 502, a switching TFT 503, a driving TFT 504, a capacitor device 505, a light emitting device 506, and power sources 507 and 508.

When the potential of the scanning line 502 varies, and the switching TFT 503 is turned ON, a video signal that has been input to the signal line 501 is input to a gate electrode of the driving TFT 504. According to the potential of the input video signal, a gate-source voltage of the driving TFT 504 is determined, and a current flowing between the source and the drain of the driving TFT 504 is determined. This current is supplied to the light emitting device 506, and the light emitting device 506 emits light.

As a semiconductor device for driving the light emitting device, a polysilicon transistor is used. However, the polysilicon transistor is prone to variation in electrical characteristics, such as a threshold value and an ON current, due to defects in a grain boundary. In the pixel shown in FIG. 16(A), if characteristics of the driving TFT 504 vary in units of the pixel, even when identical video signals have been input, the magnitudes of the corresponding drain currents of the driving TFTs 504 are different. Thus, the luminance of the light emitting device 506 varies.

To solve the problems described above, a desired current may be input to the light emitting device, regardless of the characteristics of the TFTs for driving the light emitting device. From this viewpoint, the current input method has been proposed which can control the magnitude of a current that is supplied to a light emitting device regardless of the TFT characteristics.

Next, referring to FIGS. 16(B) and 17, a brief description will be made of a circuit of a pixel in a light emitting apparatus employing the current input method and a driving method thereof. The pixel shown in FIG. 16(B) includes a signal line 601, first to third scanning lines 602 to 604, a current line 605, TFTs 606 to 609, a capacitor device 610, and a light emitting device 611. A current source circuit 612 is disposed to each signal line (each column).

Operations of from video signal-writing to light emission will be described by using FIG. 17. In FIG. 17, reference numerals denoting respective portions conform to those shown in FIG. 16. FIGS. 17(A) to 17(C) schematically show current paths. FIG. 17(D) shows the relationship between currents flowing through respective paths during a write of a video signal, and FIG. 17(E) shows a voltage accumulated in the capacitor device 610 also during the write of a video signal, that is, a gate-source voltage of the TFT 608.

First, a pulse is input to the first and second scanning lines 602 and 603 to turn the TFTs 606 and 607 ON. A signal current flowing through the signal line 601 at this time will be referred to as $I_{data}$. As shown in FIG. 17(A), since the signal current $I_{data}$ is flowing through the signal line 601, the current separately flows through current paths $I_1$ and $I_2$ in the pixel. FIG. 17(D) shows the relationship between the currents. Needless to say, the relationship is expressed as $I_{data}=I_1+I_2$.

The moment the TFT 606 is turned ON, no charge is yet accumulated in the capacitor device 610, and thus, the TFT 608 is OFF. Accordingly, $I_2=0$ and $I_{data}=I_1$ are established. In the moment, the current flows between electrodes of the capacitor device 610, and charge accumulation is performed in the capacitor device 610.

Charge is gradually accumulated in the capacitor device 610, and a potential difference begins to develop between both the electrodes (FIG. 17(E)). When the potential difference of both the electrodes has reached $V_{th}$ (point A in FIG. 17(E)), the TFT 608 is turned ON, and $I_2$ occurs. As described above, since $I_{data}=I_1+I_2$ is established, while $I_1$ gradually decreases, the current keeps flowing, and charge accumulation is continuously performed in the capacitor device 610.

In the capacitor device 610, charge accumulation continues until the potential difference between both the electrodes, that is, the gate-source voltage of the TFT 608 reaches a desired voltage. That is, charge accumulation continues until the voltage reaches a level at which the TFT 608 can allow the current $I_{data}$ to flow. When charge accumulation terminates (B point in FIG. 17(E)), the current $I_1$ stops flowing. Further, since the TFT 608 is fully ON, $I_{data}=I_2$ is established (FIG. 17(B)). According to the operations described above, the operation of writing the signal to the pixel is completed. Finally, selection of the first and second scanning lines 602 and 603 is completed, and the TFTs 606 and 607 are turned OFF.

Subsequently, a pulse is input to the third scanning line 604, and the TFT 609 is turned ON. Since VGS that has been just written is held in the capacitor device 610, the TFT 608 is already turned ON, and a current identical to $I_{data}$ flows thereto from the current line 605. Thus, the light emitting device 611 emits light. At this time, when the TFT 608 is set to operate in a saturation region, even if the source-drain voltage of the TFT 608 varies, a light emitting current $I_{EL}$ flowing to the light emitting device 611 flows continuously.

As described above, the current input method refers to a method in which the drain current of the TFT 609 is set to have the same current value as that of the signal current $I_{data}$ set in the current source circuit 612, and the light emitting device 611 emits light with the luminance corresponding to the drain current. By using the thus structured pixel, influence of variation in characteristics of the TFTs constituting the pixel is suppressed, and a desired current can be supplied to the light emitting device.

Incidentally, in the light emitting apparatus employing the current input method, a signal current corresponding to a video signal needs to be precisely input to a pixel. However, when a signal line driver circuit (corresponding to the current source circuit 612 in FIG. 16) used to input the signal current to the pixel is constituted by polysilicon transistors, variation in characteristics thereof occurs, thereby also causing variation in characteristics of the signal current.

That is, in the light emitting apparatus employing the current input method, variation in characteristics of TFTs constituting the pixel and the signal line driver circuit need to be suppressed. However, while the influence of variation in characteristics of the TFTs constituting the pixel can be suppressed by using the pixel having the structure of FIG. 16(B), suppression of the influence of variation in characteristics of the TFTs constituting the signal line driver circuit is difficult.

Hereinafter, using FIG. 18, a brief description will be made of the structure and operation of a current source circuit disposed in the signal line driver circuit that drives the pixel employing the current input method.

The current source circuit 612 shown in FIGS. 18(A) and 18(B) corresponds to the current source circuit 612 of FIG. 16(B). The current source circuit 612 includes constant current sources 555 to 558. The constant current sources 555 to 558 are controlled by signals that are input via respective terminals 551 to 554. The magnitudes of currents supplied from the constant current sources 555 to 558 are different from one another, and the ratio thereof is set to 1:2:4:8.

FIG. 18(B) shows a circuit structure of the current source circuit 612, in which the constant current sources 555 to 558 shown therein correspond to transistors. The ratio of ON currents of the transistors 555 to 558 is set to 1:2:4:8 according to the ratio (1:2:4:8) of the value of L (gate length)/W (gate width). The current source circuit 612 then can control the current magnitudes at $2^4=16$ levels. Specifically, currents having 16-gradation analog values can be output for 4-bit digital video signals. Note that the current source circuit 612 is constituted by polysilicon transistors, and is integrally formed with the pixel portion on the same substrate.

As described above, conventionally, a signal line driver circuit incorporated with a current source circuit has been proposed (for example, refer to Non-patent Documents 1 and 2).

In addition, digital gradation methods include a method in which a digital gradation method is combined with an area gradation method to represent multi-gradation images (hereinafter, referred to as area gradation method), and a method in which a digital gradation method is combined with a time gradation method to represent multi-gradation images (hereinafter, referred to as time gradation method). The area gradation method is a method in which one pixel is divided into a plurality of sub-pixels, emission or non-emission is selected in each of the sub-pixels, and the gradation is represented according to a difference between a light emitting area and the other area in a single pixel. The time gradation method is a method in which gradation representation is performed by controlling the emission period of a light emitting device. To be more specific, one frame period is divided into a plurality of subframe periods having mutually different lengths, emission or non-emission of a light emitting device is selected in each period, and the gradation is presented according to a difference in length of light emission time in one frame period. In the digital gradation method, the method in which a digital gradation method is combined with a time gradation method (hereinafter, referred to as time gradation method) is proposed. (For example, refer to Patent Document 1).

[Non-patent Document 1]
Reiji Hattori & three others, "Technical Report of Institute of Electronics, Information and Communication Engineers (IEICE)", ED 2001-8, pp. 7–14, "Circuit Simulation of Current Specification Type Polysilicon TFT Active Matrix-Driven Organic LED Display"

[Non-patent Document 2]
Reiji H et al.; "AM-LCD'01", OLED-4, pp. 223–226

[Patent Document 1]
JP 2001-5426 A

SUMMARY OF THE INVENTION

The above-described current source circuit 612 is set so that the ratio of ON-state currents of the transistors becomes 1:2:4:8 by designing L/W value. However, as for the transistors 555–558, the factors of variation such as the gate length, the gate width and the film thickness of a gate insulating film, which are generated by the difference of fabricating steps and substrates to be used are piled up, and the variation is generated in the threshold value and mobility. Therefore, it is difficult to precisely make the ratio of ON-state currents of the transistors 555–558 to be 1:2:4:8 as it has been designed. Specifically, the variation of the values of currents for supplying to the pixels is generated depending upon the column.

In order to precisely make the ratio of ON-state currents of the transistors 555–558 to be 1:2:4:8 as it has been designed, it is necessary to make all the characteristics of the current source circuits existing in the whole columns the same. Specifically, it is necessary to make all the characteristics of the transistors of the current source circuits that signal line drive circuit has the same, however, it is very difficult to realize it.

The present invention has been carried out by considering the above-described problems, the present invention provides a signal line drive circuit capable of suppressing the influence of the characteristic variation of TFTs and supplying the desired signal current to the pixels. Furthermore, the present invention provides a light emitting apparatus capable of suppressing the influence of variation of the characteristics of TFTs which configure both a pixel and a drive circuit and supplying the desired signal current to a light emitting device which configures both of a pixel and a drive circuit by utilizing a pixel having a circuit configuration which has suppressed the influence of variation of the characteristics of TFTs.

The present invention provides a signal line drive circuit having a new configuration in which an electric circuit (in the present specification, referred to as current source circuit) for suppressing the influence of variation of the characteristics of TFTs and passing the desired constant current has been provided. Furthermore, the present invention provides a light emitting apparatus equipped with the foregoing signal line drive circuit.

The present invention provides a signal line drive circuit in which a current source circuit is disposed on each column (each signal line or the like).

A signal line drive circuit of the present invention is set so that the predetermined signal current is supplied to a current source circuit disposed on each signal line (each column) using a constant current source for reference. A current source circuit set so as to supply the signal current has the ability to pass the current in proportion to that of the constant current source for reference. As a result, the influence of variation of the characteristics of TFTs which configure the signal line drive circuit can be suppressed by utilizing the foregoing current source circuit. Then, in a signal line drive circuit of the present invention, a switch for determining whether or not a signal current set in a current source circuit is supplied to the pixel is controlled by a video signal.

Specifically, in the case where it is necessary to pass a signal current in proportion to a video signal through a signal line, there is a switch for determining whether or not the signal current is supplied from the current source circuit to the signal line drive circuit, which is controlled by the video signal.

It should be noted that in the present specification, the switch for determining whether or not the signal current is supplied from the current source circuit to the signal line drive circuit is defined to be referred to as a signal current control switch.

It should be noted that the constant current source for reference might be integrally formed with the signal line drive circuit on the substrate. Or, as a current for reference, a certain current may be inputted from the exterior of the substrate using IC or the like.

The outline of a signal line drive circuit of the present invention will be described below with reference to FIGS. 1 and 2. In FIGS. 1 and 2, the signal line drive circuits around the three signal lines from i th column to (i+2)th column are shown.

First, the case where it is necessary to pass the signal current in proportion to that of the video signal through the signal line will be described below.

In FIG. 1, as for a signal line drive circuit 403, a current source circuit 420 is disposed on each signal line (each column). The current source circuit 420 has a terminal a, a terminal b and a terminal c. A set point signal is inputted into the terminal a. The current (current for reference) is supplied from the constant current source for reference 109, which is connected to the current line, to the terminal b. Moreover, the terminal c outputs a signal kept in the current source circuit 420 via a switch 101 (signal current control switch) outputs. Specifically, the current source circuit 420 is controlled by the set point signal inputted from the terminal a, current (current for reference) is supplied from the terminal b, and the current (signal current) in proportion to the relevant current (current for reference) is outputted from the terminal c. The switch 101 (signal current control switch) is disposed between the current source circuit 420 and the pixel, turning ON or OFF of the foregoing switch 101 (signal current control switch) is controlled by a video signal.

Subsequently, a signal line drive circuit of the present invention having a configuration different from that of FIG. 1 will be described below with reference to FIG. 2. In FIG. 2, in the signal line drive circuit 403, two or more current source circuits are disposed on each signal line (each column). Here, supposing that two current source circuits are disposed on each column, the current source circuit 420 has a first current source circuit 421 and a second current source circuit 422, a first current source circuit 421 and a second current source circuit 422 have the terminals a–d. A set point signal is inputted into the terminal a. The current (current for reference) is supplied from the constant current source for reference 109 which is connected to the current line, to the terminal b. Moreover, the terminal c outputs a signal (signal current) kept in the first current source circuit 421 and the second current source circuit 422 via the switch 101 (signal current control switch). A control signal is inputted from the terminal d. Specifically, the current source circuit 420 is controlled by a set point signal inputted from the terminal a and by a control signal inputted from the terminal d, the current (current for reference) is supplied from the terminal b, the current (signal current) in proportion to the relevant current (current for reference) is outputted from the terminal c. The switch 101 (signal current control switch) is disposed between the current source circuit 420 and the pixel, and turning ON and OFF of the foregoing switch 101 (signal current control switch) are controlled by a video signal.

It is defined that an operation for terminating writing of a signal current with respect to the current source circuit 420 (an operation defining so that the current source circuit 420 for setting the signal current by the current for reference can output the signal current) is referred to as a setting operation and an operation for inputting the signal current into a pixel (operation that the current source circuit 420 outputs the signal current) is referred to as an input operation. In FIG. 2, since control signals inputted into the first current source circuit 421 and the second current source circuit 422 are different from each other, as for the first current source circuit 421 and the second current source circuit 422, one performs a setting operation and the other performs an input operation, thereby capable of carrying out two operations on each column at the same time.

It should be noted that a setting operation might be carried out during an optional time period at an optional timing, and optional times. That at what kind of timing the setting operation is carried out is capable of being optionally adjusted by a pixel configuration (current source circuit disposed in a pixel) and by configuration such as a current source circuit disposed in the signal line drive circuit. As for the number of times the setting operation is carried out, at least one time may be carried out at the time when the electric source is supplied to the signal line drive circuit and the operation is initiated. However, actually, since there are some cases where the acquired information is leaked by the setting operation, the setting operation may be again carried out when the good timing for acquiring the information comes again.

Concerning with the signal line drive circuit shown in FIGS. 1 and 2, the case where the signal current in proportion to a video signal is supplied to the signal line has been described. However, the present invention is not limited to this. For example, the current may be supplied to another wiring different from the signal line. In this case, it is not necessary to dispose the switch 101 (signal current control switch). The case where the switch 101 is not disposed is shown in FIG. 29 concerning with FIG. 1 and shown in FIG. 30 concerning with FIG. 2. In this case, the current is outputted into a current line for pixel and a video signal is outputted into a signal line.

The present invention provides a signal line drive circuit which provides two shift registers (first and second shift register). The first and second shift registers, one is a current source circuit, and the other is a circuit for controlling a video signal, that is, a circuit operated for displaying an image, it controls, for example, a latch circuit, a sampling switch and the switch 101 (signal current control switch) and the like. Then, an operation of the first and second shift registers is capable of being independently carried out, and necessarily, the setting operation of the current source circuit and the image displaying operation are capable of being independently carried out. Since the setting operation of the current source circuit is precisely carried out when the time is taken much, the configuration of the present invention in which the current source circuit and the latch circuit are capable of being independently operated is very effective.

It should be noted that a shift register is configured with circuits such as a flip-flop circuit and a decoder circuit. In the case where the shift register is configured with a flip-flop circuit, usually a plurality of wirings are in turn selected from the first column to the final column. On the other hand, in the case where the shift register is configured with a decoder circuit or the like, a plurality of wirings are capable of being selected at random. The configuration of the shift register may be appropriately selected according to the use. If a plurality of wirings can be selected at random, the setting signal is also capable of being outputted. Therefore, the setting operation of the current source circuit is also capable of being carried out not sequentially from the first column but at random. Then, in the case where there is a malfunction accompanying with the setting operation, it can be realized so that the malfunction is overshadowed.

It should be noted that in the present invention, a TFT is capable of being applied by substituting it for a transistor using a usual single crystal, a transistor using SOI, an organic transistor or the like.

Moreover, in the present invention, a light emitting apparatus includes a panel in which a pixel section having a light emitting device and a signal line drive circuit are sealed between the substrate and the cover material, a module in which IC or the like is mounted on the foregoing panel, a display or the like in the category. Specifically, a light emitting apparatus corresponds to the general term including a panel, a module, a display and the like.

The present invention provides a signal line drive circuit having a current source circuit as described above. Furthermore, the present invention provides a light emitting apparatus capable of suppressing the influence of variation of the characteristics of the TFTs configuring both a pixel and a drive circuit and supplying the desired signal current I data to a light emitting device by utilizing a pixel of circuit configuration which is not influenced by the characteristics of TFTs.

BRIEF DESCRIPTION OF THE DRAWINGS

FIG. 5 is a view of a signal line driver circuit (3-bit).
FIG. 7 is circuit diagrams of current source circuits.
FIG. 13 is circuit diagrams of pixels of a light emitting device.
FIG. 14 is explanatory views of a driving method.
FIG. 15 is views of a light emitting device.
FIG. 17 is explanatory views of operations of a pixel of the light emitting device.
FIG. 19 is explanatory views of operations of a current source circuit.
FIG. 20 is explanatory views of operations of a current source circuit.
FIG. 22 is views of electronic devices to which the present invention is applied.
FIG. 27 is a circuit diagram of a reference constant current source.
FIG. 31 is circuit diagrams of current source circuits.
FIG. 34 is circuit diagrams of current source circuits.
FIG. 41 is a view of a signal line driver circuit.
FIG. 42 is a view of a signal line driver circuit.
FIG. 48 is a view of a signal line driver circuit.

BEST MODE FOR EMBODYING THE INVENTION

Embodiment 1

Figure 1:
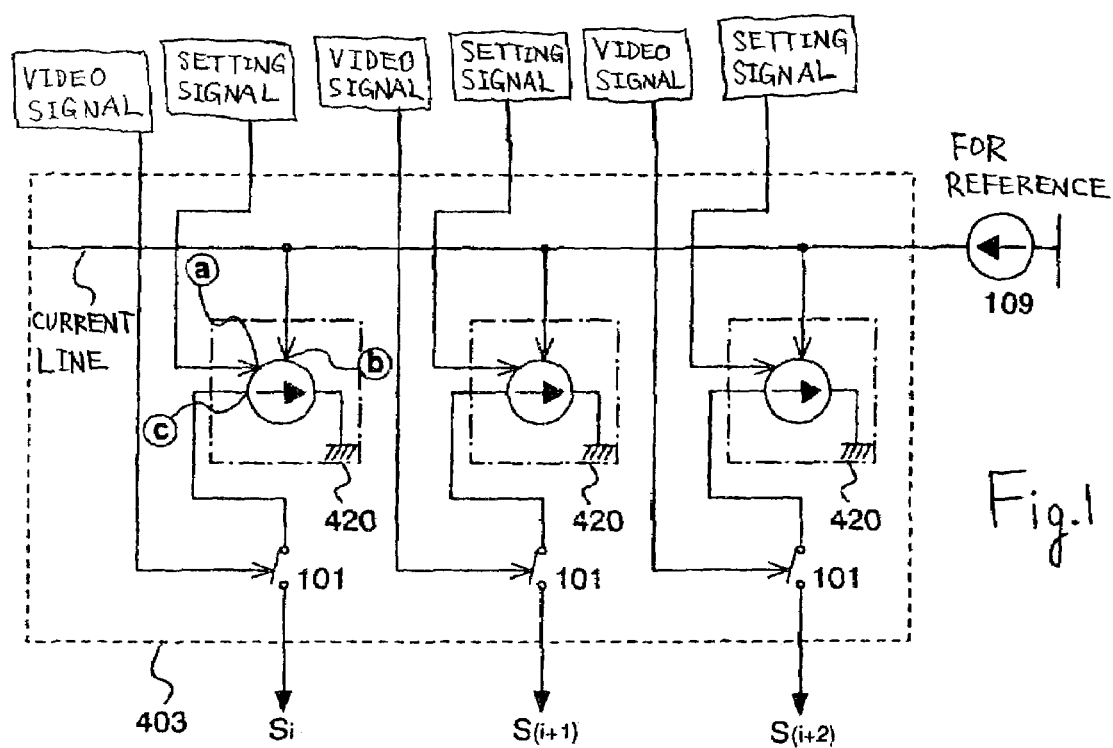
FIG. 1 is a view of a signal line driver circuit.

In this embodiment, a description will be made of a structure and an operation of a current source circuit 420 shown in FIG. 1 provided to a signal line driver circuit of the present invention.

The signal line driver circuit includes the current control source circuit 420, a shift register, and a latch circuit. Further, the signal line driver circuit has the first shift register that controls the current source circuit 420 and the second shift register that controls the latch circuit etc.

In the present invention, a setting signal input from a terminal a corresponds to a sampling pulse from a first shift register. That is, the setting signal in FIG. 1 corresponds to the sampling pulse supplied from the first shift register. The present invention performs setting of the current source circuit 420 in accordance with the timing of the sampling pulse supplied from the first shift register.

In the present invention, independent operations of the first shift register and the second shift register can be fully conducted by means of providing the first shift register that controls the current source circuit 420 and the second shift register that controls the latch circuit. That is, the first shift register can be operated at a low speed while the second shift register is operated at a high speed. Accordingly, it is possible that the setting of the current source circuit 420 spend as much as time as it is conducted precisely.

Note that a shift register includes a flip-flop circuit, a decoder circuit, or the like. In the case where the shift register includes the flip-flop circuit, in general, a plurality of wirings are sequentially selected from the first column to the last column. On the other hand, in the case where the shift register includes the decoder circuit or the like, a plurality of wirings are sequentially selected from the first column to the last column or selected at random. The shift register may select properly according to the usage. In the case of selecting the structure having a function capable of selecting a plurality of wirings at random, setting can be output randomly. Therefore, the setting operation of the current source circuit is not performed sequentially from the first column to the last column, and can be performed randomly. When the setting operation of the current source circuit can be performed at random as described above, in the case where there exists a defect accompanied with the setting operation of the current source circuit, the defect can be made inconspicuous. The shift register may select properly according to the usage.

Note that a shift register has a structure including, for example, flip-flop circuits (FFs) in a plurality of columns. A clock signal (S-CLK), a start pulse (S-SP), and an inverted clock signal (S-CLKb) are input to the shift register, and signals serially output according to the timing of the input signals are referred to as sampling pulses.

Figure 6A:
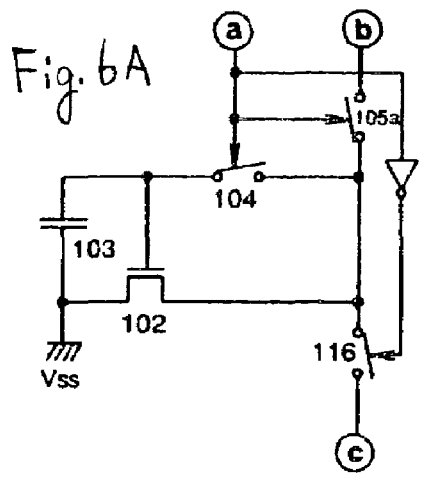
FIG. 6 is circuit diagrams of current source circuits.

In FIG. 6(A), a circuit including switches 104, 105a, and 106, a transistor 102 (n-channel type), and a capacitor device 103 for retaining a gate-source voltage VGS of the transistor 102 corresponds to the current source circuit 420.

In the current source circuit 420, the switch 104 and the switch 105a are turned ON by a sampling pulse input via the terminal a. Then, a current (reference current) is supplied via the terminal b from the reference constant current source 109 (hereinafter referred to as constant current source 109) connected to the current line, and a predetermined charge is retained in the capacitor device 103. The charge is retained in the capacitor device 103 until the current (reference current) flown from the constant current source 109 becomes identical with a drain current of the transistor 102.

Then, the switches 104 and 105a are turned OFF by the signal input via the terminal a. As a result, since the predetermined charge is retained in the capacitor device 103, the transistor 102 has a capability of flowing a current having a magnitude corresponding to the signal current $I_{data}$. If the switch 101 (signal current control switch) and the switch 106 are turned into a conductive state, a current flows to a pixel connected to the signal line via the terminal c. At this time, since the gate voltage of the transistor 102 is set to a predetermined gate voltage by the capacitor device 103, a drain current corresponding to the signal current $I_{data}$ flows to the drain region of the transistor 102. Thus, the magnitude of the current input to the pixel can be controlled without being influenced by the variation in characteristics of the transistors constituting the signal line driver circuit.

Note that, in the case where the switch 101 (signal current control switch) is not arranged, when the switch 116 is turned into a conductive state, a current is supplied to the pixel connected to the signal line via the terminal c.

The connection structure of the switches 104 and 105a is not limited to the structure shown in FIG. 6(A). For example, the structure may be such that: one of terminals of the switch 104 is connected to the terminal b, and the other terminal is connected to the gate electrode of the transistor 102; and one of terminals of the switch 105a is connected to the terminal b via the switch 104, and the other terminal is connected to the switch 106. The switch 104 and the switch 105a are controlled by the signal inputted from the terminal a.

Alternatively, the switch 104 may be arranged between the terminal b and the gate electrode of the transistor 102, and the switch 105a may be arranged between the terminal b and the switch 116. Incidentally, referring to FIG. 31(A), switches may be arranged such that the connection is structured as shown in FIG. 31(A1) in the setting operation, and the connection is structured as shown in FIG. 31(A2) in the input operation. The number of switches and the number of wirings, which are arranged in the current source circuit and the connection are not particularly limited.

In the current source circuit 420 of FIG. 6(A), the operation for setting the signal (setting operation) cannot be performed simultaneously with the operation for inputting the signal (input operation) to the pixel.

Figure 6B:
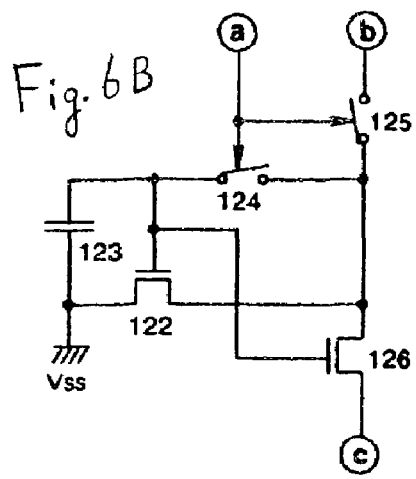

Referring to FIG. 6(B), a circuit including a switch 124, a switch 125, a transistor 122 (n-channel type), a capacitor device 123 for retaining a gate-source voltage VGS of the transistor 122, and a transistor 126 (n-channel type) corresponds to the current source circuit 420.

The transistor 126 functions as either a switch or a part of a current source transistor.

In the current source circuit 420, the switch 124 and the switch 125 are turned ON by a sampling pulse input via the terminal a. Then, a current (reference current) is supplied via the terminal b from the constant current source 109 connected to the current line, and a predetermined charge is retained in the capacitor device 123. The charge is retained until the current (reference current) flown from the constant current source 109 becomes identical with a drain current of the transistor 122. Note that, when the switch 124 is turned ON, since a gate-source voltage VGS of the transistor 126 is set to 0 V, the transistor 126 is turned OFF.

Subsequently, the switches 124 and 125 are turned OFF. As a result, since the predetermined charge is retained in the capacitor device 123, the transistor 122 has a capability of flowing a current having a magnitude corresponding to that of the signal current $I_{data}$. If the switch 101 (signal current control switch) is turned into the conductive state, a current flows to a pixel connected to the signal line via the terminal c. This is because the gate voltage of the transistor 122 is set at a predetermined gate voltage by the capacitor device 123, and thus, a drain current corresponding to the signal current $I_{data}$ flows to the drain region of the transistor 122. Therefore, the magnitude of the current that is input to the pixel can be controlled without being influenced by the variation in characteristics of the transistors constituting the signal line driver circuit.

Note that, when the switches 124 and 125 have been turned OFF, a gate and a source of the transistor 126 do not have the same potential. As a result, since the charge retained in the capacitor device 123 is distributed also to the transistor 126, and the transistor 126 is automatically turned ON. Here, the transistors 122 and 126 are connected in series, and the gates thereof are connected to each other. Accordingly, the transistors 122 and 126 each serve as a multi-gate transistor. That is, a gate length L of the transistor varies between the setting operation and the input operation. Therefore, the value of the current supplied from the terminal b at the time of the setting operation can be made larger than the value of the current supplied from the terminal c at the time of the input operation. Thus, various loads (such as wiring resistances and cross capacitances) disposed between the terminal b and the reference constant current source can be charged even faster. Consequently, the setting operation can be completed quickly. In the case where the switch 101 (signal current control switch) is not arranged, when the switch 126 is turned into the conductive state, a current flows via the terminal c to the pixel connected to the signal line.

Further, the number of switches and the number of wirings, which are arranged in the current source circuit, and the connection are not particularly limited. Specifically, referring to FIG. 31(B), wirings and switches may be arranged such that the connection is structured as shown in FIG. 31(B1) in the setting operation, and the connection is structured as shown in FIG. 31(B2) in the input operation. In particular, in FIG. 31(C2), it is sufficient that the charge accumulated in a capacitor device 107 does not leak.

In the current source circuit 420 of FIG. 6(A), the operation for setting the signal (setting operation) cannot be performed simultaneously with the operation for inputting the signal (input operation) to the pixel.

Figure 6C:
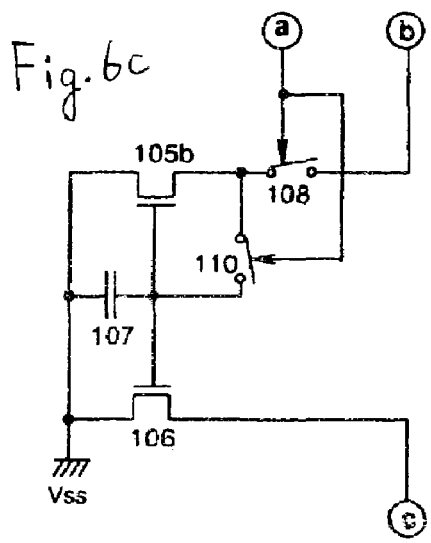

Referring to FIG. 6(C), a circuit including a switch 108, a switch 110, transistors 105b and 106 (n-channel type), and a capacitor device 107 for retaining gate-source voltages VGS of the transistors 105b and 106 corresponds to the current source circuit 420.

In the current source circuit 420, the switch 108 and the switch 110 are turned ON by a sampling pulse input via the terminal a. Then, a current (reference current) is supplied via the terminal b from the constant current source 109 connected to the current line, and a predetermined charge is retained in the capacitor device 107. The charge is retained until the current (reference current) flown from the constant current source 109 becomes identical with a drain current of the transistor 105b. At this time, since the gate electrodes of the transistor 105b and of the transistor 106 are connected to each other, the gate voltages of the transistor 105b and the transistor 106 are retained by the capacitor device 107.

Then, the switches 108 and 110 are turned OFF by a signal input via the terminal a. At this time, since the predetermined charge is retained in the capacitor device 107, the transistor 106 has a capability of flowing a current having a magnitude corresponding to that of the current (reference current). If the switch 101 (signal current control switch) is turned to the conductive state, a current flows to a pixel connected to the signal line via the terminal c. This is because the gate voltage of the transistor 106 is set to a predetermined gate voltage by the capacitor device 107, and thus, a drain current corresponding to the current (reference current) flows to the drain region of the transistor 106. Thus, the magnitude of the current input to the pixel can be controlled without being influenced by the variation in characteristics of the transistors constituting the signal line driver circuit.

Note that, in the case where the switch 101 (signal current control switch) is not arranged, a current flows to the pixel connected to the signal line via the terminal c.

At this time, characteristics of the transistor 105b and the transistor 106 need to be the same to cause the drain current corresponding to the signal current $I_{data}$ to flow precisely to the drain region of the transistor 106. To be more specific, values such as mobility and thresholds of the transistors 105b and 106 need to be the same. In addition, in FIG. 6(C), the value of W/L of each of the transistors 105b and 106 may be arbitrarily set, and a current proportional to the current supplied from the constant current source 109 may be supplied to the pixel.

Further, the value of W/L of the transistor 105b or the transistor 106 that is connected to the constant current source 109 is set high, whereby the write speed can be increased by supplying a large current from the constant current source 109.

Note that, with the current source circuit 420 shown in FIG. 6(C), the setting operation for conducting setting to make the current source circuit have a capability of flowing a signal current can be performed simultaneously with the input operation for inputting the signal current to the pixel.

Figure 6D:
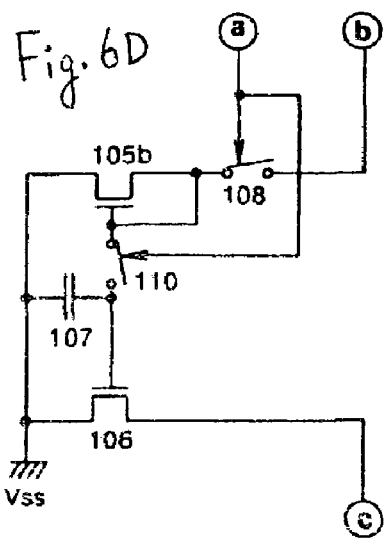
Figure 6E:
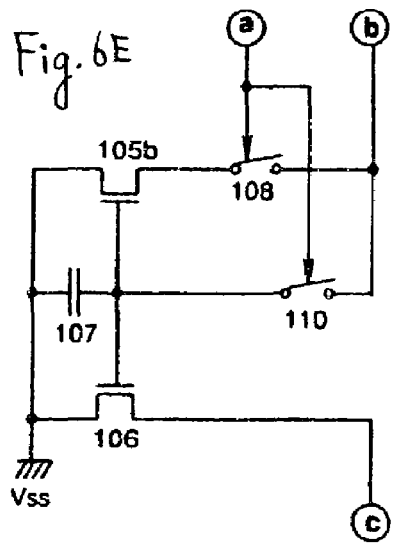

The current source circuit 420 shown in each of FIGS. 6(D) and 6(E) has the same structure as that of the current source circuit of FIG. 6(C), except for the connection of the switch 110. In addition, since the operation of the current source circuit 420 of each of FIGS. 6(D) and 6(E) conforms to the operation of the current source circuit 420 of FIG. 6(C), a description thereof will be omitted here.

Note that, the number of switches and the connection structure are not particularly limited. Specifically, referring to FIG. 31(C), wirings and switches may be arranged such that the connection is structured as shown in FIG. 31(C1) in the setting operation, and the connection is structured as shown in FIG. 31(C2) in the input operation. In particular, in FIG. 31(C2), it is sufficient that the charge held in the capacitor device 107 does not leak. The number of wirings, the number of switches, and the connection structures are not particularly limited.

Referring to FIG. 32(A), a circuit including switches 195b, 195c, 195d, and 195f, a transistor 195a, and a capacitor device 195e corresponds to the current source circuit. In the current source circuit shown in FIG. 32(A), the switches 195b, 195c, 195d, and 195f are turned ON by a signal input via the terminal a. Then, a current is supplied via the terminal b from the constant current source 109 connected to the current line. A predetermined charge is retained in the capacitor device 195e until the signal current supplied from the constant current source 109 becomes identical with a drain current of the transistor 195a.

Then, the switches 195b, 195c, 195d, and 195f are turned OFF by the signal input via the terminal a. At this time, since the predetermined charge is retained in the capacitor device 195e, the transistor 195a has a capability of flowing a current having a magnitude corresponding to that of the signal current. This is because the gate voltage of the transistor 195a is set to a predetermined gate voltage by the capacitor device 195e, and thus, a drain current corresponding to a current (reference current) flows to the drain region of the transistor 195a. In this state, a current is supplied to the outside via the terminal c. Note that, in the current source circuit shown in FIG. 32(A), the operation for setting the current source circuit to have a capability of flowing a signal current cannot be performed simultaneously with the input operation for inputting the signal current to the pixel. Incidentally, when a switch controlled by the signal input via the terminal a is ON, and also, when a current is controlled not to flow from the terminal c, the terminal c needs to be connected to another wiring of the other potential. Assuming that the wiring potential is represented by Va, Va may have any value as long as Va is a potential sufficient to flow a current flowing from the terminal b as it is. A power supply voltage Vdd may be adopted as an example.

Note that, the number of switches, and the connection are not particularly limited. Specifically, referring to FIGS. 32(B) and 32(C), wirings and switches may be arranged such that the connection is structured as shown in either FIG. 32(B1) or 32(C1) in the setting operation, and the connection is structured as shown in either FIG. 32(B2) or 32(C2) in the input operation. The number of wirings, the number of switches, and the connection structures are not particularly limited.

Further, in the current source circuits 420 of FIGS. 6(A) and 6(C) to 6(E), the current-flow directions (directions from the pixel to the signal line driver circuit) are the same. The conductivity type of each of the transistors 102, 105b, and 106 may be of p-channel type.

FIG. 7(A) shows a circuit diagram in which the current-flow direction (direction from the pixel to the signal line driver circuit) is the same, and the transistor 102 shown in FIG. 6(A) is set to be of p-channel type. In FIG. 6(A), with the capacitor device arranged between the gate and the source, even when the source potential varies, the gate-source voltage can be maintained. Further, FIGS. 7(B) to 7(D) show circuit diagrams in which the current-flow directions (directions from the pixel to the signal line driver circuit) are the same, and the transistors 105b and 106 shown in FIGS. 6(C) to 6(D) are set to be of p-channel type.

Figure 32:
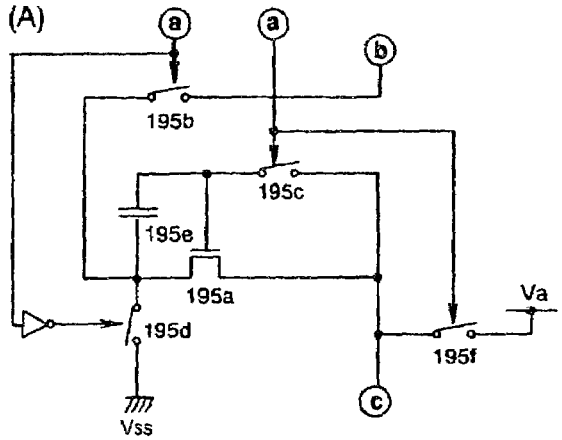
FIG. 32 is circuit diagrams of current source circuits.
Figure 32:
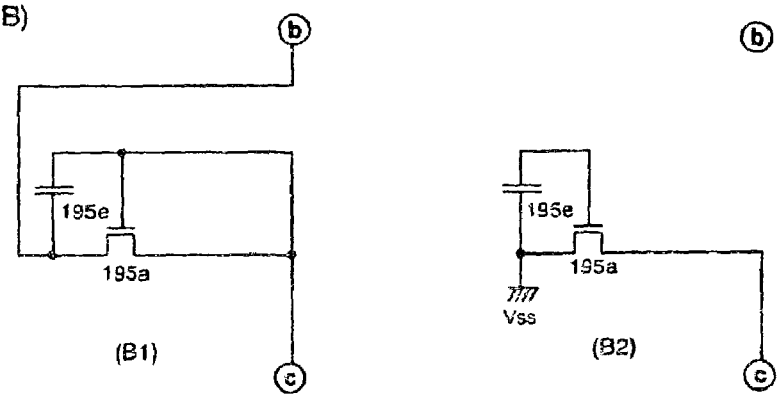
Figure 32:
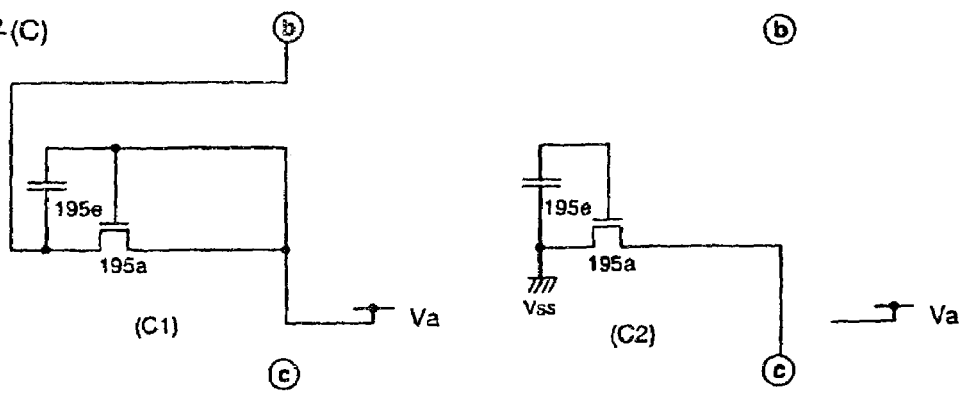
Figure 33:
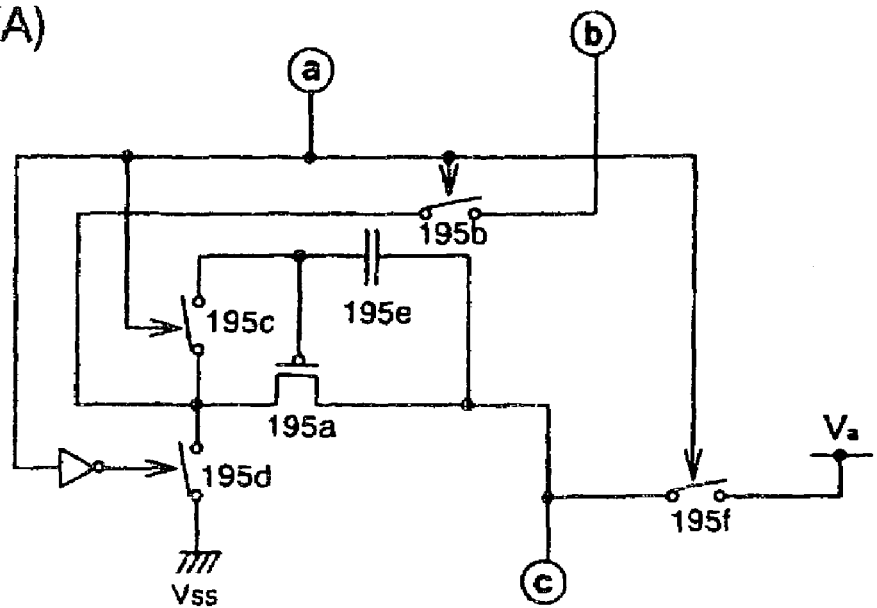
FIG. 33 is circuit diagrams of current source circuits.
Figure 33:
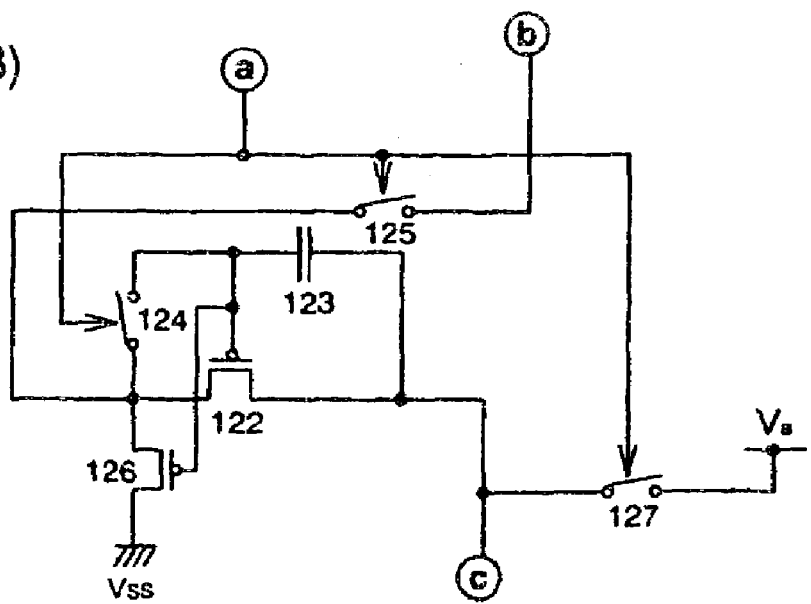

FIG. 33(A) shows a case where the transistor 195a is set to be of p-channel type in the structure of FIG. 32. FIG. 33(B) shows a case where the transistors 122 and 126 are set to be of p-channel type in the structure of FIG. 6(B).

Referring to FIG. 35, a circuit including switches 104 and 116, a transistor 102, a capacitor device 103, and the like corresponds to the current source circuit.

Figures 35A, 35B, 35C:
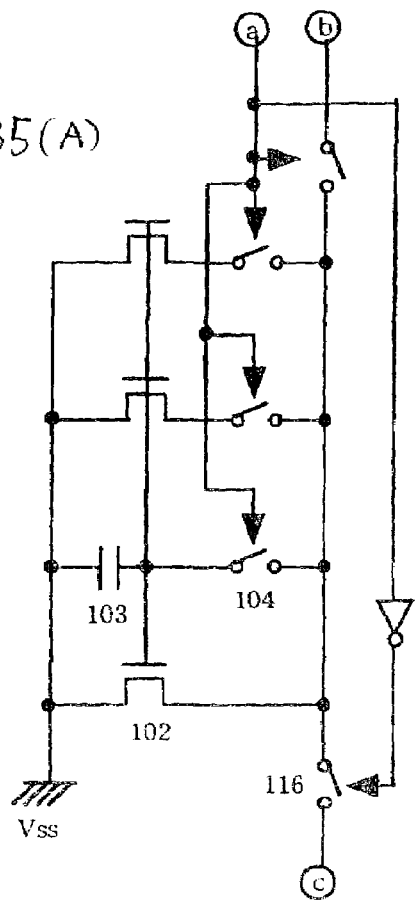
FIG. 35 is circuit diagrams of current source circuits.

FIG. 35(A) corresponds to the circuit of FIG. 6(A) which is partly modified. In the current source circuit of FIG. 35(A), the transistor gate width W varies between the setting operation of the current source and the input operation. Specifically, the connection is structured as shown in FIG. 35(B) in the setting operation while the connection is structured as shown in FIG. 35(C) in the input operation. Thus, the gate width W differs. Therefore, the value of the current supplied from the terminal b at the time of the setting operation can be made larger than the value of the current supplied from the terminal c at the time of the input operation. Thus, various loads (such as wiring resistances and cross capacitances) disposed between the terminal b and the reference constant current source can be charged even faster. Consequently, the setting operation can be completed quickly.

Note that, FIG. 35 shows the circuit of FIG. 6(A) which is partly modified. In addition, the circuit can be easily applied to, for example, other circuits shown in FIG. 6 and to the circuits shown in FIG. 7, FIG. 32, FIG. 33, FIG. 34, and the like.

Note that, in each of the current source circuits shown in FIGS. 6, 7, and 32, a current flows from the pixel to the signal line driver circuit. However, the current not only flows from the pixel to the signal line driver circuit, but also may flow from the signal line driver circuit to the pixel. The direction of the current flow depends on the pixel structure. In the case where the current flows from the signal line driver circuit to the pixel, Vss (low potential power source) may be changed to Vdd (high potential power source), and the transistors 102, 105b, 106, 122, and 126 may be set to be of p-channel type in FIG. 6. Also in FIG. 7, Vss may be changed to Vdd, and the transistors 102, 105b, and 106 may be of n-channel type.

Note that, in all the current source circuits described above, the arranged capacitor device may not be arranged by being substituted by, for example, a gate capacitance of a transistor.

In the circuits of FIGS. 7(A) to 7(D) and 33(A) and 33(B), wirings and switches may be arranged such that the connection is structured as shown in FIGS. 34(A1) to 34(D1) in the setting operation, and the connection is structured as shown in FIGS. 34(A2) to 34(D2) in the input operation. The number of switches and the number of wirings are not particularly limited.

Hereinafter, a description will be made in detail regarding the operations of the current source circuits of FIGS. 6(A), 7(A), 6(C) to 6(E), and 7(B) to 7(D). To begin with, the operations of the current source circuits of FIGS. 6(A) and 7(A) will be described with reference to FIG. 19.

FIGS. 19(A) to 19(C) schematically show paths of a current flowing among circuit elements. FIG. 19(D) shows the relationship between the current flowing through each path and the time in writing the signal current to the current source circuit. FIG. 19(E) shows the relationship between the voltage accumulated in a capacitor device 16, that is, the gate-source voltage of a transistor 15, and the time in writing the signal current to the current source circuit. In the circuit diagrams of FIGS. 19(A) to 19(C), numeral 11 denotes a reference constant current source (hereinafter referred to as constant current source), switches 12 to 14 each are a semiconductor device having a switching function, numeral 15 denotes a transistor, numeral 16 denotes a capacitor device, and numeral 17 denotes a pixel. Further, the circuit including the switch 14, the transistor 15, and the capacitor device 16 corresponds to a current source circuit 20. In FIG. 19A, outgoing lines and symbols are illustrated. In FIGS. 19B, 19C, the outgoing lines and symbols conform to FIG. 19A so that the description thereof will be omitted.

A source region of the transistor 15 is connected to Vss, and a drain region thereof is connected to the constant current source 11. One of electrodes of the capacitor device 16 is connected to Vss (the source of the transistor 15), and the other electrode is connected to the switch 14 (the gate of the transistor 15). The capacitor device 16 plays a role of holding the gate-source voltage of the transistor 15.

The pixel 17 is formed of a light emitting device, a transistor, or the like. The light emitting device includes an anode, a cathode, and a light emitting layer sandwiched between the anode and the cathode. In this specification, the cathode is referred to as the opposite electrode when the anode is used as a pixel electrode, and the anode is referred to as the opposite electrode when the cathode is used to as a pixel electrode. The light emitting layer can be formed of a known light emitting material. Further, the light emitting layer has two structures: a single layer structure and a laminate structure, and any one of the structures may be used. Luminescence in the light emitting layer includes light emission (fluorescence) in returning from a singlet excited state to a normal state and light emission (phosphorescence) in returning from a triplet excited state to a normal state. Either one or both of the two types of light emission may be used. Further, the light emitting layer is formed of a known material such as an organic material or an inorganic material.

In practice, the current source circuit 20 is provided in the signal line driver circuit. A current corresponding to the signal current flows via, for example, a circuit element included in the signal line or the pixel, from the current source circuit 20 provided in the signal line driver circuit. However, since FIG. 19 is a diagram for briefly explaining the outline of the relationship among the constant current source 11, the current source circuit 20, and the pixel 17, a detailed illustration of the structure is omitted.

First, an operation (setting operation) of the current source circuit 20 for retaining the signal current $I_{data}$ will be described by using FIGS. 19(A) and 19(B). Referring to FIG. 19(A), the switches 12 and 14 are turned ON, and the switch 13 is turned OFF. The signal current is supplied from the constant current source 11, and flows to the current source circuit 20 from the constant current source 11. At this time, the current flows separately through current paths $I_1$ and $I_2$ in the current source circuit 20, as shown in FIG. 19(A). FIG. 19(D) shows the relationship. Needless to say, the relationship is expressed as $I_{data}=I_1+I_2$.

The moment the current starts to flow from the constant current source 11, since no charge is held in the capacitor device 16, the transistor 15 is OFF. Accordingly, $I_2=0$ and $I_{data}=I_1$ are established.

Charge is gradually accumulated into the capacitor device 16, and a potential difference begins to occur between both electrodes of the capacitor device 16 (FIG. 19(E)). When the potential difference between both the electrodes has reached $V_{th}$ (point A in FIG. 19(E)), the transistor 15 is turned ON, and $I_2>0$ is established. As described above, since $I_{data}=I_1+I_2$, while $I_1$ gradually decreases, the current keeps flowing. Charge accumulation is continuously performed in the capacitor device 16.

The potential difference between both the electrodes of the capacitor device 16 serves as the gate-source voltage of the transistor 15. Thus, charge accumulation in the capacitor device 16 continues until the gate-source voltage of the transistor 15 reaches a desired voltage, that is, a gate-source voltage that allows the transistor 15 to be flown with the current $I_{data}$. When charge accumulation terminates (B point in FIG. 19(E)), the current $I_2$ stops flowing. Further, since the TFT 15 is fully ON, $I_{data}=I_2$ is established (FIG. 19(B)).

Next, an operation (input operation) for inputting the signal current $I_{data}$ to the pixel will be described by using FIG. 19(C). In FIG. 19(C), the switch 13 is turned ON, and the switches 12 and 14 are turned OFF. Since a predetermined charge is held in the capacitor device 16, the transistor 15 is ON. A current corresponding to the signal current flows to Vss via the switch 13 and transistor 15, and a predetermined signal current $I_{data}$ is supplied to the pixel. At this time, when the transistor 15 is set to operate in a saturation region, even if the source-drain voltage of the transistor 15 varies, a constant current is supplied to the light emitting device.

In the current source circuit 20 shown in FIG. 19, as shown in FIGS. 19(A) to 19(C), the operation is divided into an operation (setting operation; corresponding to FIGS. 19(A) and 19(B)) for completing a write of the signal current $I_{data}$ to the current source circuit 20, and an operation (input operation; corresponding to FIG. 19(C)) for inputting the signal current $I_{data}$ to the pixel). Then, in the pixel, a current is supplied to the light emitting device in accordance with the input signal current $I_{data}$.

The current source circuit 20 of FIG. 19 is not capable of performing the setting operation and the input operation simultaneously. In the case where the setting operation and the input operation need to be performed simultaneously, at least two current source circuits are preferably provided to each of a plurality of signal lines each of which is connected with a plurality of pixels and which are provided in a pixel portion. However, if the setting operation can be performed within a period during which the signal current $I_{data}$ is not input to the pixel, only one current source circuit may be provided for each signal line (each column).

Although the transistor 15 shown in each of FIGS. 19(A) to 19(C) is of n-channel type, the transistor 15 maybe of p-channel type, of course. A circuit diagram for the case where the transistor 15 is of p-channel type is shown in FIG. 19(F). Referring to FIG. 19(F), numeral 31 denotes a reference constant current source, switches 32 to 34 each are a semiconductor device having a switching function, numeral 35 denotes a transistor, numeral 36 denotes a capacitor device, and numeral 37 denotes a pixel. The circuit including the switch 34, the transistor 35, and the capacitor device 36 corresponds to a current source circuit 24.

The transistor 35 is of p-channel type. One of a source region and a drain region of the transistor 35 is connected to Vdd, and the other is connected to the constant current source 31. One of electrodes of the capacitor device 36 is connected to Vdd, and the other electrode is connected to the switch 36. The capacitor device 36 plays a role of holding the gate-source voltage of the transistor 35.

Operation of the current source circuit 24 of FIG. 19(F) is similar to the operation of the current source circuit 20 described above, except for the current-flow direction, and thus, a description thereof will be omitted here. In the case of designing the current source circuit in which the polarity of the transistor 15 is changed without changing the current-flow direction, the circuit diagram of FIG. 7(A) may be referenced.

Figure 36:
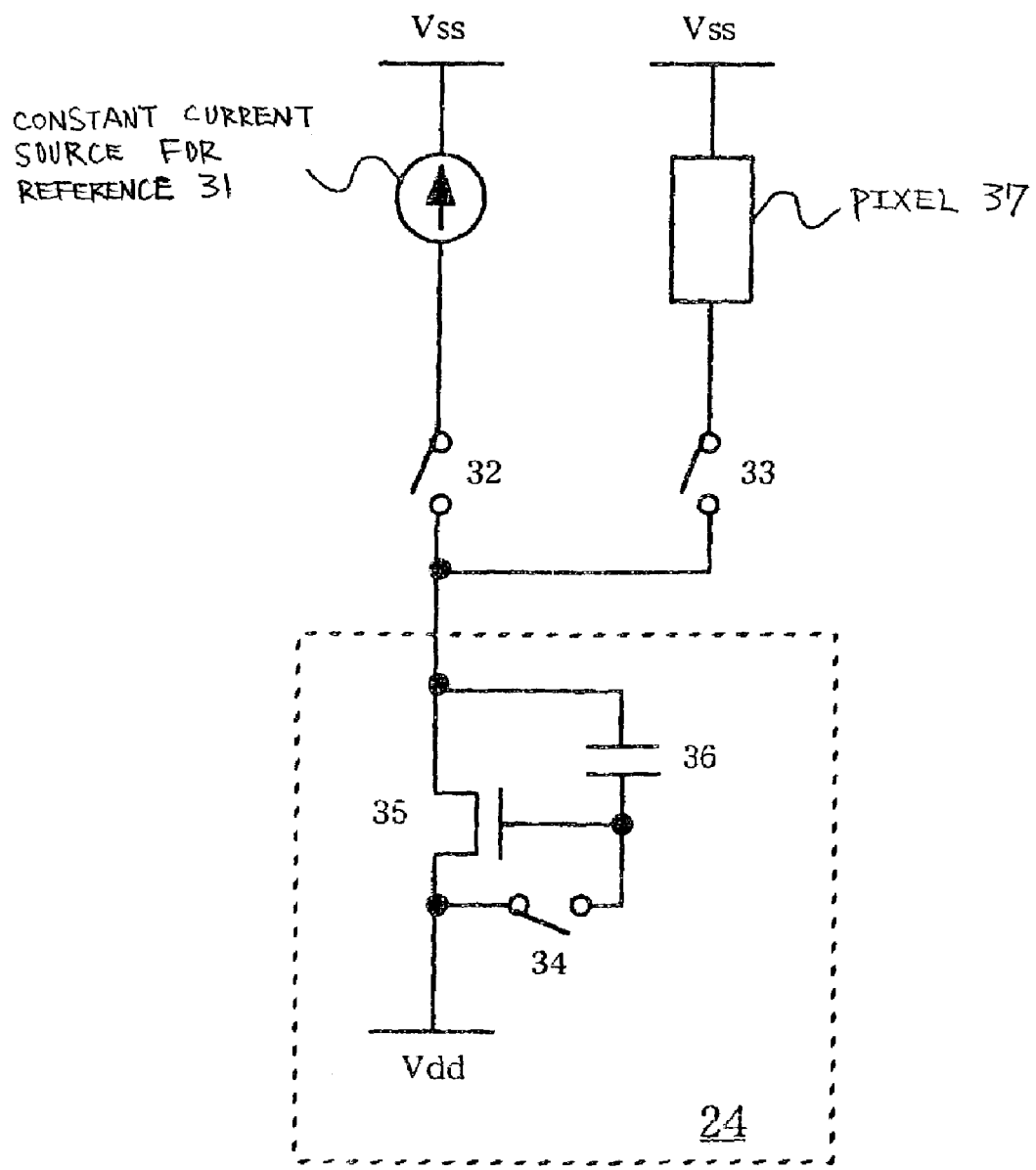
FIG. 36 is circuit diagrams of current source circuits.

Note that in FIG. 36, the current-flow direction is the same as in FIG. 19(F), in which the transistor 35 is of n-channel type. The capacitor device 36 is connected between the gate and the source of the transistor 35. The source potential of the transistor 35 varies between the setting operation and the input operation. However, even when the source potential of the transistor 35 varies, since the gate-source voltage is retained, the operation is normally implemented.

Next, operations of the current source circuits shown in FIGS. 6(C) to 6(E) and FIGS. 7(B) to 7(D) will be described by using FIGS. 20 and 21. FIGS. 20(A) to 20(C) schematically show paths through which a current flows among circuit elements. FIG. 20(D) shows the relationship between the current flowing through each path and the time in writing the signal current $I_{data}$ to the current source circuit. FIG. 20(E) shows the relationship between the voltage accumulated in a capacitor device 46, that is, the gate-source voltages of transistors 43 and 44, and the time in writing the signal current $I_{data}$ to the current source circuit. Further, in the circuit diagrams of FIGS. 20(A) to 20(C), numeral 41 denotes a reference constant current source (hereinafter referred to as constant current source 41), a switch 42 is a semiconductor device having a switching function, numerals 43 and 44 denote transistors, numeral 46 denotes a capacitor device, and numeral 47 denotes a pixel. The circuit including the switch 42, the transistors 43 and 44, and the capacitor device 46 corresponds to a current source circuit 25. In FIG. 20A, outgoing lines and symbols are illustrated. In FIGS. 20B, 20C, the outgoing lines and symbols conform to FIG. 20A so that the description thereof will be omitted.

A source region of the n-channel transistor 43 is connected to Vss, and a drain region thereof is connected to the constant current source 41. A source region of the n-channel transistor 44 is connected to Vss, and a drain region thereof is connected to a terminal 48 of the pixel 47. One of electrodes of the capacitor device 46 is connected to Vss (the sources of the transistors 43 and 44), and the other electrode is connected to the gate electrodes of the transistors 43 and 44. The capacitor device 46 plays a role of holding gate-source voltages of the transistor 43 and the transistor 44.

Note that, in practice, the current source circuit 25 is provided in the signal line driver circuit. A current corresponding to the signal current $I_{data}$ flows via, for example, a circuit element included in the signal line or the pixel, to the light emitting device from the current source circuit 25 provided in the signal line driver circuit. However, since FIG. 20 is a diagram for briefly explaining the outline of the relationship among the constant current source 41, the current source circuit 25, and the pixel 47, a detailed illustration of the structure is omitted.

In the current source circuit 25 of FIG. 20, the sizes of the transistor 43 and the transistor 44 are important. Hereinafter, using different reference symbols, a case where the sizes of the transistors 43 and 44 are identical and a case where the sizes are mutually different will be described. Referring to FIGS. 20(A) to 20(C), the case where the sizes of the transistors 43 and 44 are mutually identical will be described by using the signal current $I_{data}$. The case where the sizes of the transistors 43 and 44 are mutually different will be described by using a signal current $I_{data1}$ and a signal current $I_{data2}$. Note that the sizes of the transistors 43 and 44 are determined using the value of W (gate width)/L (gate length) of each transistor.

First, the case where the sizes of the transistors 43 and 44 are mutually identical will be described. To begin with, operation for retaining the signal current $I_{data}$ in the current source circuit 20 will be described by using FIGS. 20(A) and 20(B). Referring to FIG. 20(A), when the switch 42 is turned ON, the signal current $I_{data}$ is set in the reference constant current source 41, and flows from the constant current source 41 to the current source circuit 25. At this time, since the signal current $I_{data}$ is flowing from the reference constant current source 41, the current flows separately through current paths $I_1$ and $I_2$ in the current source circuit 25, as shown in FIG. 20(A). FIG. 20(D) shows the relationship at this time. Needless to say, the relationship is expressed as $I_{data}=I_1+I_2$.

The moment the current starts to flow from the constant current source 41, since no charge is yet accumulated in the capacitor device 46, the transistors 43 and 44 are OFF. Accordingly, $I_2=0$ and $I_{data}=I_1$ are established.

Then, charge is gradually accumulated into the capacitor device 46, and a potential difference begins to occur between both electrodes of the capacitor device 46 (FIG. 20(E)). When the potential difference of both the electrodes has reached $V_{th}$ (point A in FIG. 20(E)), the transistors 43 and 44 are turned ON, and $I_2>0$ is established. As described above, since $I_{data}=I_1+I_2$, while $I_1$ gradually decreases, the current keeps flowing. Charge accumulation is continuously performed in the capacitor device 46.

The potential difference between both the electrodes of the capacitor device 46 serves as the gate-source voltage of each of the transistors 43 and 44. Thus, charge accumulation in the capacitor device 46 continues until the gate-source voltages of the transistors 43 and 44 each reach a desired voltage, that is, a gate-source voltage that allows the transistor 44 to be flown with the current $I_{data}$ (VGS). When charge accumulation terminates (B point in FIG. 20(E)), the current $I_2$ stops flowing. Further, since the transistors 43 and 44 are fully ON, $I_{data}=I_2$ is established (FIG. 20(B)).

Next, an operation for inputting the signal current $I_{data}$ to the pixel will be described by using FIG. 20(C). First, the switch 42 is turned OFF. Since predetermined charge is retained in the capacitor device 46, the transistors 43 and 44 are ON. A current identical with the signal current $I_{data}$ flows from the pixel 47. Thus, the signal current $I_{data}$ is input to the pixel. At this time, when the transistor 44 is set to operate in a saturation region, even if the source-drain voltage of the transistor 44 varies, the current flowing in the pixel can be flown without variation.

In the case of a current mirror circuit shown in FIG. 6(C), even when the switch 42 is not turned OFF, a current can be flown to the pixel 47 by using the current supplied from the constant current source 41. That is, the setting operation for setting a signal for the current source circuit 20 can be implemented simultaneously with the operation (input operation) for inputting a signal to the pixel.

Next, a case where the sizes of the transistors 43 and 44 are mutually different will be described. An operation of the current source circuit 25 is similar to the above-described operation, therefore, a description thereof will be omitted here. When the sizes of the transistors 43 and 44 are mutually different, the signal current $I_{data1}$ set in the reference constant current source 41 is inevitably different from the signal current $I_{data2}$ that flows to the pixel 47. The difference therebetween depends on the difference between the values of W (gate width)/L (gate length) of the transistors 43 and 44.

In general, the W/L value of the transistor 43 is preferably set larger than the W/L value of the transistor 44. This is because the signal current $I_{data1}$ can be increased when the W/L value of the transistor 43 is set large. In this case, when the current source circuit is set with the signal current $I_{data1}$, loads (cross capacitances, wiring resistances) can be charged. Thus, the setting operation can be completed quickly.

The transistors 43 and 44 of the current source circuit 25 in each of FIGS. 20(A) to 20(C) are of n-channel type, but the transistors 43 and 44 of the current source circuit 25 may be of p-channel type. Here, FIG. 21 shows a circuit diagram in which the transistors 43 and 44 are of p-channel type.

Figure 21:
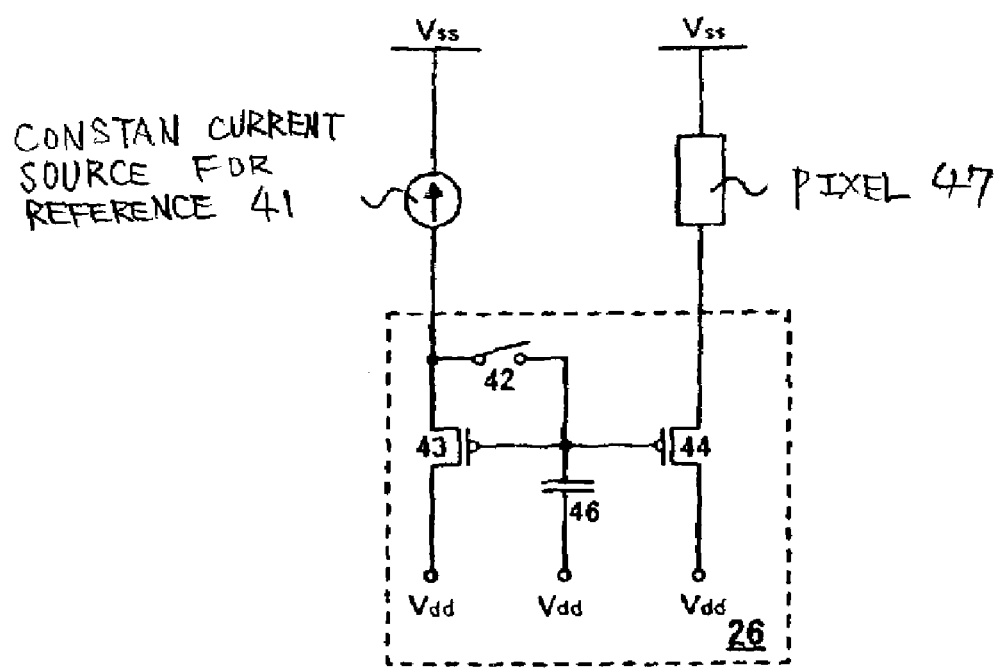
FIG. 21 is an explanatory view of operations of a current source circuit.

Referring to FIG. 21, numeral 41 denotes a constant current source, a switch 42 is a semiconductor device having a switching function, numerals 43 and 44 denote transistors (p-channel type), numeral 46 denotes a capacitor device, and numeral 47 denotes a pixel. In this embodiment, the switch 42, the transistors 43 and 44, and the capacitor device 46 form an electric circuit corresponding to a current source circuit 26.

A source region of the p-channel transistor 43 is connected to Vdd, and a drain region thereof is connected to the constant current source 41. A source region of the p-channel transistor 44 is connected to Vdd, and a drain region thereof is connected to a terminal 48 of the pixel 47. One of electrodes of the capacitor device 46 is connected to Vdd (source), and the other electrode is connected to the gate electrodes of the transistors 43 and 44. The capacitor device 46 plays a role of holding gate-source voltages of the transistors 43 and 44.

Operation of the current source circuit 24 of FIG. 21 is similar to that shown in each of FIGS. 20(A) to 20(C) except for the current-flow direction, and thus, a description thereof will be omitted here. In the case of designing the current source circuit in which the polarities of the transistors 43 and 44 are changed without changing the current flow direction, the circuit diagram of FIG. 7(B) may be referenced.

In addition, the transistor polarity can be changed without changing the current-flow direction. This conforms to the operation illustrated in FIG. 36, so that a description thereof will be omitted here.

In summary, in the current source circuit of FIG. 19, the current having the same magnitude as that of the signal current $I_{data}$ set in the current source flows to the pixel. In other words, the signal current $I_{data}$ set in the constant current source is identical in value with the current flowing to the pixel. The current is not influenced by variation in characteristics of the transistors provided in the current source circuit.

In each of the current source circuits of FIG. 19 and FIG. 6(B), the signal current $I_{data}$ cannot be output to the pixel from the current source circuit in a period during which the setting operation is performed. Thus, two current source circuits are preferably provided for each signal line, in which an operation (setting operation) for setting a signal is performed to one of the current source circuits, and an operation (input operation) for inputting $I_{data}$ to the pixel is performed using the other current source circuit.

Incidentally, in the case where the setting operation and the input operation are not performed at the same time, only one current source circuit may be provided for each column. The current source circuit of each of FIGS. 32(A) and 33(A) is similar to the current source circuit of FIG. 19, except for the connection and current-flow paths. The current source circuit of FIG. 35(A) is similar to the current source circuit of FIG. 19, except for the difference in magnitude between the current supplied from the constant current source and the current flowing from the current source circuit. The current source circuits of FIGS. 6(B) and 33(B) are similar to the current source circuit of FIG. 19, except for the difference in magnitude between the current supplied from the constant current source and the current flowing from the current source circuit. Specifically, in the structure of FIG. 35(A), only the gate width W of the transistor is different between the setting operation and the input operation; in the structure of each of FIGS. 6(B) and 33(B), only the gate length L is different between the setting operation and the input operation; and others are similar to those of the structure of the current source circuit in FIG. 19.

On the other hand, in each of the current source circuits of FIGS. 20 and 21, the signal current $I_{data}$ set in the constant current source and the value of the current flowing to the pixel are dependent on the sizes of the two transistors provided in the current source circuit. In other words, the signal current $I_{data}$ set in the constant current source and the current flowing to the pixel can be arbitrarily changed by arbitrarily designing the sizes (W (gate width)/L (gate length)) of the two transistors provided in the current source circuit. However, output of precise signal current $I_{data}$ to the pixel is difficult in the case where variation is caused in the characteristics of the two transistors, such as threshold values and mobility.

Further, in each of the current source circuits of FIGS. 20 and 21, the signal can be input to the pixel in the period during which the setting operation is performed. That is, the operation (setting operation) for setting the signal can be performed simultaneously with the operation (input operation) for inputting the signal to the pixel. Thus, unlike the current source circuit of FIG. 19, two current source circuits do not need to be provided in a single signal line.

There are three general classifications for providing the current source circuit in the signal line driver circuit. First, the current source circuit of FIG. 19 is provided in each signal line. Second, two current source circuits of FIG. 19 are provided in each signal line. And third, the current source lines of FIGS. 20 and 21 are formed in each signal lines.

In one case among above three for providing one current source circuit of FIG. 19 in each signal line, the operation of the first shift register needs to be performed during the period that the second shift register is not operating. During other periods, the first shift register and the second shift register maybe operated at same frequencies, and also operated at different frequencies. It results from the fact that the setting operation and the input operation can not be performed simultaneously in the case of providing the current source circuit of FIG. 19 in each signal line. When the second shift register is used when the input operation is performed, and the first shift register is used when the setting operation is performed. Namely, the first shift register can not perform during the period that the second shift register is operated, since the input operation is performed through that period.

The present invention with the above structure can suppress the influence of variation in the TFT characteristics and supply a desired current to the outside.

Embodiment 2

The above has described that, for the current source circuit shown in FIG. 19 (or, FIG. 6(B), 33(B), 35(A), or the like), preferably, two current source circuits are provided for each signal line (each column), in which one of the current source circuits is used to perform the setting operation, and the other current source circuit is used to perform the setting operation. This is because the setting operation and the input operation cannot be performed simultaneously. In this embodiment, the structure and operation of either the first current source circuit 421 or the second current source circuit 422 shown in FIG. 2 will be described with reference to FIG. 8.

Note that the signal line driver circuit includes the current source circuit 420, the shift register, the latch circuits, and the like. The signal line driver circuit of the present invention includes the first shift register that controls the current source circuit 420 and the second shift register that controls the latch circuit.

In the present invention, a setting signal input from a terminal a corresponds to a sampling pulse supplied from a first shift register. That is, the setting signal in FIG. 2 corresponds to the sampling pulse supplied from the first shift register. The present invention performs setting of the current source circuit 420 in accordance with the timing of the sampling pulse supplied from the first shift register and the control line.

In the present invention, independent operations of the first shift register and the second shift register can be fully conducted by means of providing the first shift register that controls the current source circuit 420 and the second shift register that controls the latch circuit. That is, the first shift register can be operated at a low speed while the second shift register is operated at a high speed. Accordingly, it is possible that the setting of the current source circuit 420 spend as much as time as it is conducted precisely.

Note that a shift register has a structure including, for example, flip-flop circuits (FFs) in a plurality of columns. A clock signal (S-CLK), a start pulse (S-SP), and an inverted clock signal (S-CLKb) are input to the shift register, and signals serially output according to the timing of the input signals are referred to as sampling pulses.

Note that a shift register includes a flip-flop circuit, a decoder circuit, or the like. In the case where the shift register includes the flip-flop circuit, in general, a plurality of wirings are sequentially selected from the first column to the last column. On the other hand, in the case where the shift register includes the decoder circuit or the like, a plurality of wirings are sequentially selected from the first column to the last column or selected at random. The shift register may select properly according to the usage. In the case of selecting the structure having a function capable of selecting a plurality of wirings at random, setting can be output randomly. Therefore, the setting operation of the current source circuit is not performed sequentially from the first column to the last column, and can be performed randomly. When the setting operation of the current source circuit can be performed at random as described above, in the case where there exists a defect accompanied with the setting operation of the current source circuit, the defect can be made inconspicuous. The shift register may select properly according to the usage.

The current source circuit 420 is controlled by a setting signal input via the terminal a and a signal input via the terminal d, is supplied with a current (reference current) from the terminal b, and outputs a current proportional to the current (reference current) from the terminal c.

Figure 8A:
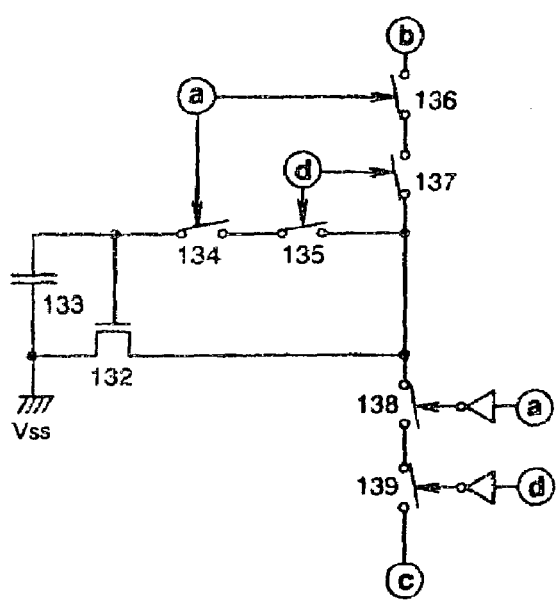
FIG. 8 is circuit diagrams of current source circuits.

Referring to FIG. 8(A), a circuit including switches 134 to 139, a transistor 132 (n-channel type), and a capacitor device 133 for retaining a gate-source voltage VGS of the transistor 132 corresponds to the first current source circuit 421 or the second current source circuit 422.

In the first current source circuit 421 or the second current source circuit 422, the switch 134 and the switch 136 are turned ON by the signal input via the terminal a. Further, the switch 135 and the switch 137 are turned ON by the signal input from the control line via the terminal d. Then, a current (reference current) is supplied via the terminal b from the reference constant current source 109 connected to the current line, and a predetermined charge is retained in the capacitor device 133. The charge is retained in the capacitor device 133 until the current (reference current) that flows from the constant current source 109 becomes identical with a drain current of the transistor 132.

Subsequently, the switches 134 to 137 are turned OFF by the signals input through the terminals a and d. As a result, since the predetermined charge is retained in the capacitor device 133, the transistor 132 has a capability of flowing a current having a magnitude corresponding to that of the signal current $I_{data}$. If the switch 101 (signal current control switch), the switch 138, and the switch 139 are turned to the conductive state, current flows to a pixel connected to the signal line via a terminal c. At this time, since the gate voltage of the transistor 132 is maintained at a predetermined gate voltage by the capacitor device 133, a drain current corresponding to the signal current $I_{data}$ flows to the drain region of the transistor 132. Thus, the magnitude of the current flown through the pixel can be controlled without being influenced by the variation in characteristics of the transistors constituting the signal line driver circuit.

In the case where the switch 101 (signal current control switch) is not disposed, when the switches 138 and 139 are turned to the conductive state, current flows to the pixel connected to the signal line via the terminal c.

Figure 8B:
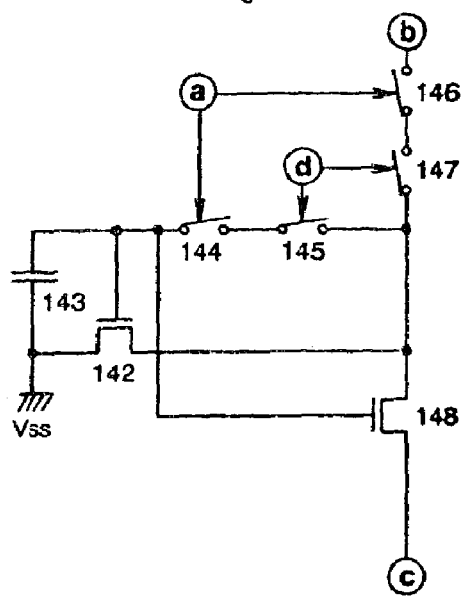

Referring to FIG. 8(B), a circuit including switches 144 to 147, a transistor 142 (n-channel type), a capacitor device 143 for retaining a gate-source voltage VGS of the transistor 142, and a transistor 148 (n-channel type) corresponds to the first current source circuit 421 or the second current source circuit 422.

In the first current source circuit 421 or the second current source circuit 422, the switch 144 and the switch 146 are turned ON by the signal input via the terminal a. Further, the switch 145 and the switch 147 are turned ON by the signal input from the control line via the terminal d. Then, a current (reference current) is supplied via the terminal b from the constant current source 109 connected to the current line, and a charge is retained in the capacitor device 143. The charge is retained in the capacitor device 143 until the current (reference current) that is flown from the constant current source 109 becomes identical with a drain current of the transistor 142. When the switch 144 and the switch 145 are turned ON, since a gate-source voltage VGS of the transistor 148 is set to 0 V, the transistor 148 is automatically turned OFF.

Subsequently, the switches 144 to 147 are turned OFF by the signals input via the terminals a and d. As a result, since the predetermined charge is retained in the capacitor device 143, the transistor 142 has a capability of flowing a current having a magnitude corresponding to that of the signal current. If the switch 101 (signal current control switch) is turned to the conductive state, current is supplied to a pixel connected to the signal line via the terminal c. At this time, the gate voltage of the transistor 142 is previously set to a predetermined gate voltage by the capacitor device 143, and a drain current corresponding to the signal current $I_{data}$ flows to the drain region of the transistor 142. Thus, the magnitude of the current flown through the pixel can be controlled without being influenced by the variation in characteristics of the transistors constituting the signal line driver circuit.

When the switches 144 and 145 are turned OFF, a gate and a source of the transistor 142 do not have the same potential. As a result, since the charge retained in the capacitor device 143 is distributed also to the transistor 148, and the transistor 148 is automatically turned ON. Here, the transistors 142 and 148 are coupled in series, and the gates thereof are connected to each other. Therefore, the transistors 142 and 148 each operate as a multi-gate transistor. That is, a gate length L of the transistor differs between the setting operation and the input operation. Thus, the value of current supplied from the terminal b in the setting operation can be made larger than the value of current supplied from the terminal c in the input operation. Thus, various loads (such as wiring resistance and cross capacitance) disposed between the terminal b and the reference constant current source can be charged even faster. Consequently, the setting operation can be completed quickly. In the case where the switch 101 (signal current control switch) is not disposed, when the switches 144 and 145 are turned OFF, current flows to the pixel connected to the signal line via the terminal c.

Note that FIG. 8(A) corresponds to a structure in which the terminal d is added to the structure of FIG. 6(A). FIG. 8(B) corresponds to a structure in which the terminal d is added to the structure of FIG. 6(B). Thus, the structures of FIGS. 6(A) and 6(B) are added with switches arranged in series, thereby being modified to those of FIGS. 8(A) and 8(B) each of which is added with the terminal d. The structure of the current source circuit shown in, for example, FIG. 6, 7, 33, 32, or 35 can be arbitrarily used by arranging two switches in series in the first current source circuit 421 or the second current source circuit 422.

Figure 2:
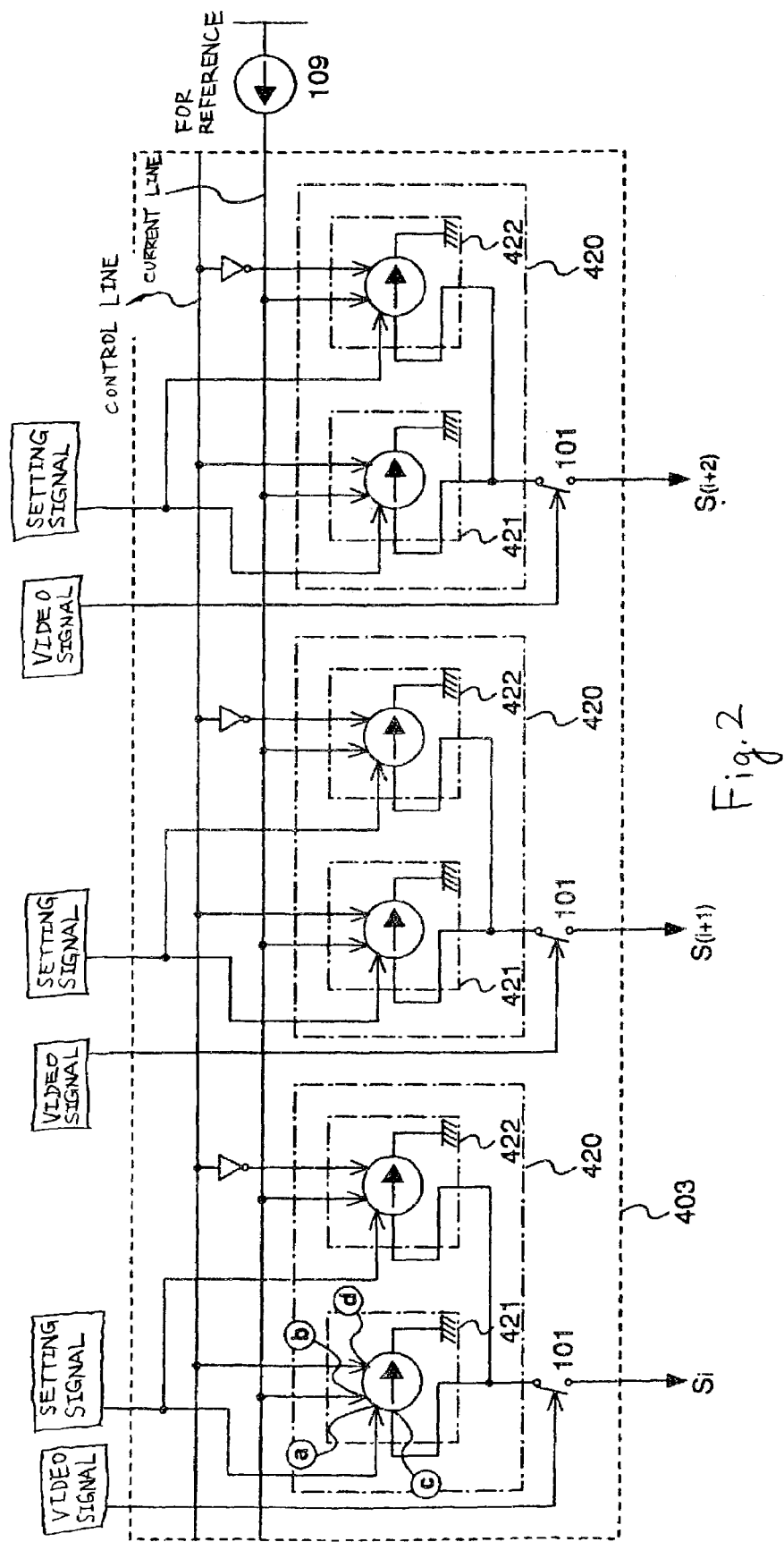
FIG. 2 is a view of a signal line driver circuit.

The structure in which the current source circuit 420 including for each signal line the two current source circuits, namely, the first and second current source circuits 421 and 422, is shown in FIG. 2. However, the present invention is not limited to this. The number of current source circuits per one signal line is not particularly limited, and can be set arbitrarily. A plurality of current source circuits may be set such that constant current sources are provided corresponding thereto, and that signal currents are set to the current source circuits by the constant current sources. For example, three current source circuits 420 may be provided for each signal line. Then, a signal current may be set by different reference constant current sources 109 for the respective current source circuits 420. For example, it may be such that a 1-bit reference constant current source is used to set a signal current for one of the current source circuits 420, a 2-bit reference constant current source is used to set a signal current for one of the current source circuits 420, and a 3-bit reference constant current source is used to set a signal current for one of the current source circuits 420. Thus, 3-bit display can be performed.

The present invention with the above structure can suppress the influence of variation in TFT characteristics and supply a desired current to the outside.

This embodiment may be arbitrarily combined with Embodiment 1.

Embodiment 3

In this embodiment, the structure of a light emitting device including the signal line driver circuit of the present invention will be described using FIG. 15.

Referring to FIG. 15(A), the light emitting device includes a pixel portion 402 including a plurality of pixels arranged in matrix on a substrate 401, and includes a signal line driver circuit 403 and first and second scanning line driver circuits 404 and 405 in the periphery of the pixel portion 402. While the signal line driver circuit 403 and the two scanning line driver circuits 404 and 405 are provided in FIG. 15(A), the present invention is not limited to this. The number of driver circuits may be arbitrarily designed depending on the pixel structure. Signals are supplied from the outside to the signal line driver circuit 403 and the first and second scanning line driver circuits 404 and 405 via FPCs 406.

The structures and operations of the first and second scanning line driver circuits 404 and 405 will be described using FIG. 15(B). The first and second scanning line driver circuits 404 and 405 each include a shift register 407 and a buffer 408. The shift register 407 sequentially outputs sampling pulses in accordance with a clock signal (G-CLK), a start pulse (S-SP), and an inverted clock signal (G-CLKb). Thereafter, the sampling pulses amplified in the buffer 408 are input to scanning lines, and the scanning lines are set to be in a selected state for each line. Signals are sequentially written to pixels controlled by the selected signal lines.

Note that the structure may be such that a level shifter circuit is disposed between the shift register 407 and the buffer 408. Disposition of the level shifter circuit enables the voltage amplitude to be increased.

This embodiment may be arbitrarily combined with Embodiments 1 and 2.

Embodiment 4

In the present invention, the configuration of the signal line drive circuit 403 and its operation shown in FIG. 15A will be described below. In the present Embodiment, the signal line drive circuit 403 which is used in the case where the digital tone display of one bit is conducted will be described below with reference to FIG. 3.

First, the case corresponding to FIG. 1 will be described below. Moreover, here, the case of line sequential drive will be described below.

Figure 3A:
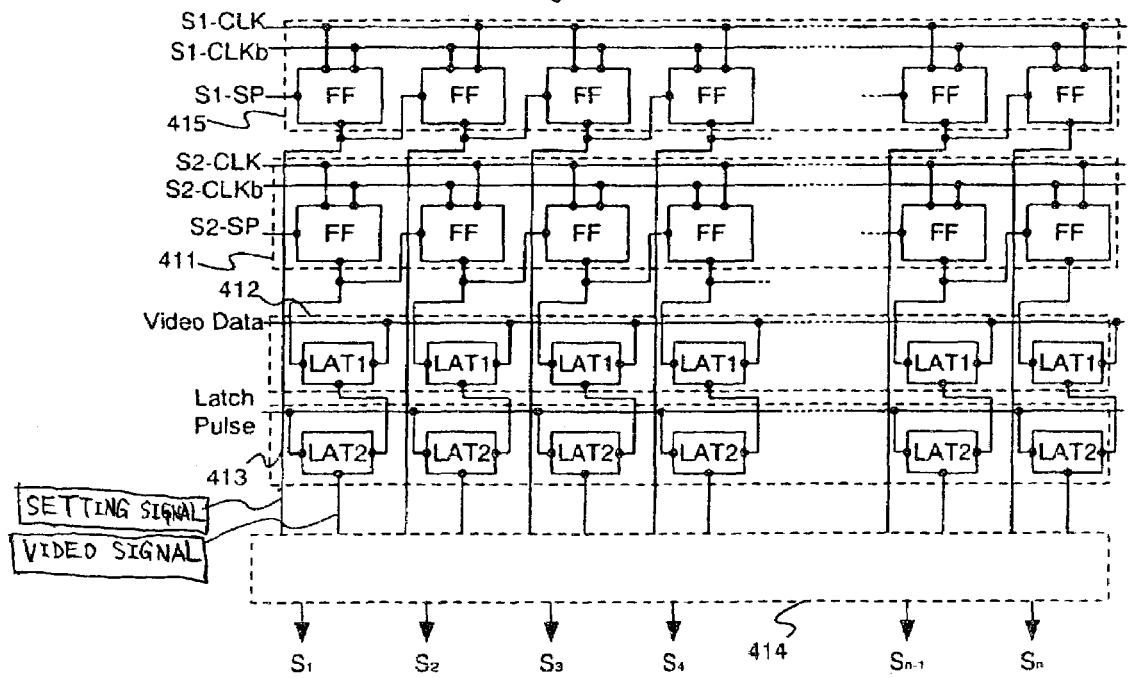
FIG. 3 is views of a signal line driver circuit (1-bit).

In FIG. 3A, the schematic diagram of the signal line drive circuit 403 in the case where the digital tone display of one bit is carried out is shown. The signal line drive circuit 403 has a first shift register 415, a second shift register 411, first latch circuit 412, a second latch circuit 413, and a constant current circuit 414.

As briefly describing the operation, the first shift register 415 and the second shift register 411 are configured with a plurality of columns such as flip-flop circuit (FF) or the like, according to the timing of clock signal (S-CLK, (S1-CLK, S2-CLK)), start pulse (S-SP (S1-SP, S2-SP)), and clock reverse signal (S-CLKb (S1-CLKb, S2-CLKb)), in turn outputs sampling pulses.

The sampling pulse outputted from the first register 415 is inputted into the constant current circuit 414. The sampling pulse outputted from the second shift register 411 is inputted into the first latch circuit 412. In the first latch circuit 412, a digital video signal is inputted, according to the timing of the sampling pulse being inputted, the video signal is kept on each column.

In the first latch circuit 412, when keeping of the video signals is completed up to the final column, a latch pulse is inputted in the second latch circuit 413 during the horizontal retrace, the video signals kept in the first latch circuit 412 are transferred to the second latch circuit 413 at the same time. Then, the video signals kept in the second latch circuit 413 are inputted to the constant current circuit 414 by one line at the same time.

While the video signals kept in the second latch circuit 413 are inputted into the constant current circuit 414, in the shift register 411, again, the sampling pulse is outputted. Hereinafter, this operation is repeated, the processing of the video signal is carried out by one frame. It should be noted that the constant current circuit 414 might have the role of converting a digital signal into an analog signal.

Then, in the present invention, the sampling pulse outputted from the first shift register 415 is inputted into the constant current circuit 414.

Figure 3B:
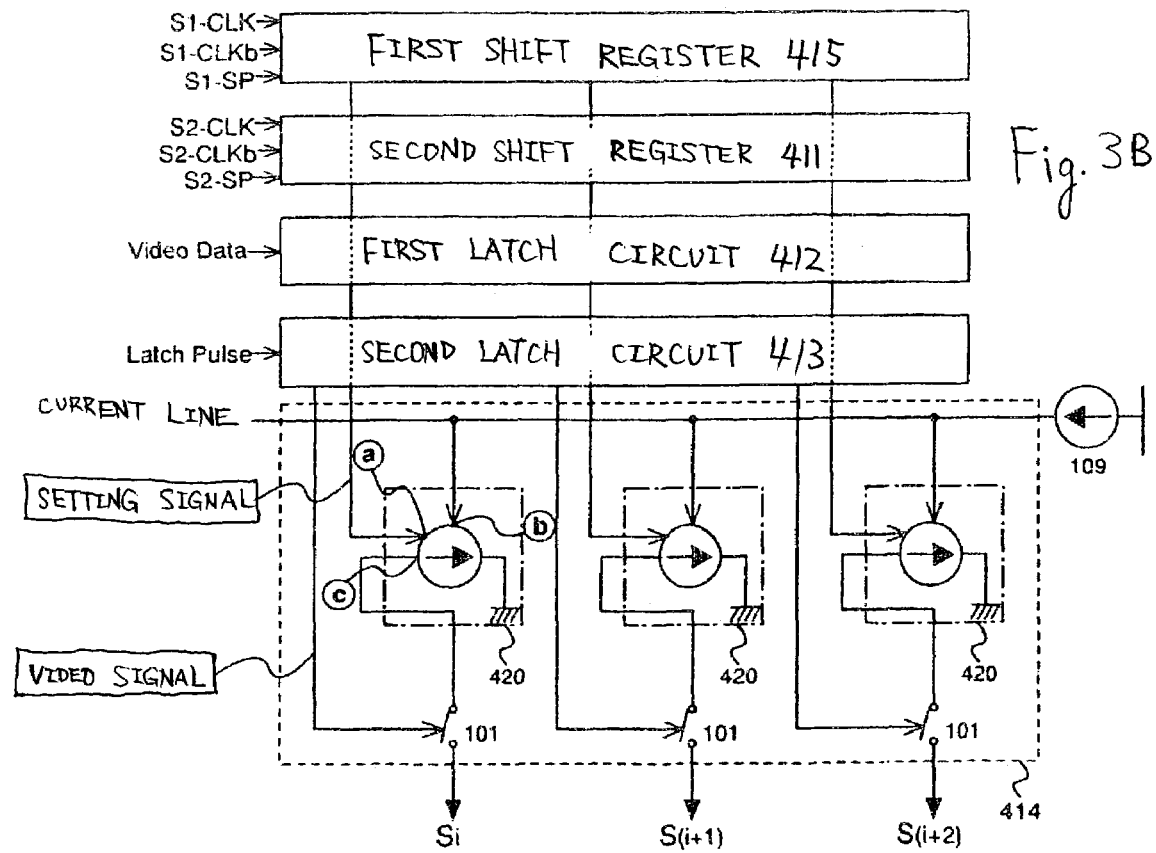

Moreover, a plurality of the current source circuits 420 are provided in the constant current circuit 414. In FIG. 3(B), the outline signal line drive circuits around three signal lines from the i th column to the (i+2) th column is shown.

The current source circuit 420 is controlled by a signal inputted via the terminal a. Moreover, via the terminal b, the current is supplied from the constant current source for reference 109 which has been connected to the current line. The switch 101 (signal current control switch) is provided between the current source circuit 420 and the pixel connected to the signal line Sn, the foregoing switch 101 (signal current control switch) is controlled by a video signal. In the case where the video signal is bright signal, the signal current is supplied from the current source circuit 420 to the pixel. In the case where the video signal is dark signal, the switch 101 (signal current control switch) is controlled and the current is not supplied to the pixel. Specifically, the current source circuit 420 has the ability to pass the predetermined current, and whether or not the relevant current is supplied to the pixel is controlled by the switch 101 (signal current switch).

Then, for the configuration of the current source circuit 420, the configuration of the current source circuit 420 shown in FIG. 6, FIG. 7, FIG. 32, FIG. 33, FIG. 35 or the like is capable of being optionally employed. In the foregoing current source circuit 420, not only one configuration may be employed but also a plurality of configurations may be employed.

It should be noted that in the present invention, a setting signal inputted from the terminal a corresponds to a sampling pulse supplied from the first shift register 415. Specifically, the setting of the current source circuit 420 is carried out in accordance with the sampling pulse supplied from the first shift register 415.

It should be noted that in the case where the configuration shown in FIGS. 6A, 7A is employed in the current source circuit 420, during the input operation is carried out, the setting operation is not capable of being carried out. Therefore, during the input operation is not carried out, it is necessary to carry out the setting operation. However, since during the input operation is not carried out, there are some cases where these do not exist in series during one frame, but these may be interspersed, in these cases, the respective columns are not in turn selected, it is preferable that an optional column is capable of being selected. Therefore, it is preferable that a decoder circuit or the like capable of being selected at random is employed. As an example, in FIG. 37, a decoder circuit is shown. Moreover, in FIG. 38A, a shift register configured with a flip-flop circuit 221, a latch 222 in which a column selection signal is inputted and a logic operator 223 in which a selection control signal is inputted is shown, and in FIG. 38B, a shift register configured with a flip-flop circuit 224, a first latch 225 in which a column selection signal is inputted, and a second latch 226 in which a latch signal for selection is inputted is shown. The configuration of either FIG. 38A or B can select a plurality of signal lines at random. It should be noted that in the configurations shown in FIG. 38A and B, the number of wirings to be wired are capable of being reduced comparing to that of the decoder of FIG. 37.

Figure 38A:
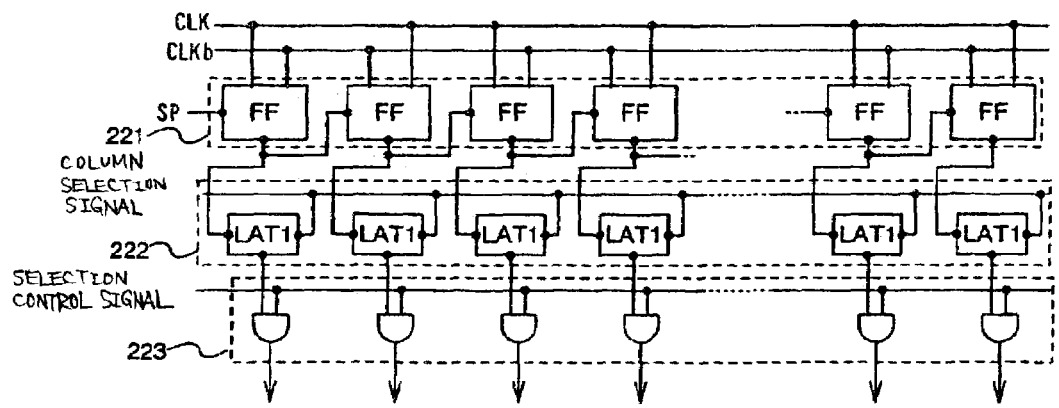
FIG. 38 is a view of a shift register.

Operations of the circuit shown in FIG. 38A will be briefly described below. The flip-flop circuit (FF) 221 in turn outputs the sampling pulse according to the timing of a clock signal (CLK), a start pulse (SP) and a clock reverse signal (CLKb). The sampling pulse outputted from the flip-flop circuit 221 is inputted into the latch (LAT1) 222. A column selection signal is inputted into the latch 222, the selection signal is kept only in the latch 222 of the columns which are desired to select according to the timing of the sampling pulse inputted.

During the time when the sampling pulse is outputted from the flip-flop circuit 221, the selection control signal is made L signal. Then, the selection signal is not outputted regardless of the state of the latch 222. Because the output of the latch (LAT1) 222 has been inputted into an AND circuit. In another input terminal of the AND circuit, a selection control signal has been inputted. Therefore, when a L signal is inputted for the selection control signal, L signal is always outputted from the AND circuit. Specifically, the selection signal is not outputted regardless of the state of the latch 222. Then, the sampling pulses are outputted to all the columns from the flip-flop circuit 221, after the selection signal is kept in the latch 222 of the rows which are desired to select by the row section signal, the selection control signal is made a H signal. Then, a signal of the latch 222 is outputted from the AND circuit. In the case where the signal of the latch 222 is a H signal, a H signal is outputted from the AND circuit, and in the case where the signal of the latch 222 is a L signal, a L signal is outputted from the AND circuit. As a result, the selection signal is outputted only in the columns which are desired to select. Because only the signals of the latch 222 of the columns which are desired to select have been H signals. Then, when the output of the selection signal is desired to stop, the selection control signal is made L signal. Then, the selection signal is not outputted. Therefore, the period during the wires are selected is capable of being freely controled.

Then, again, a start pulse (SP) is inputted, the sampling pulse is outputted from the flip-flop circuit (FF), and a similar operation is repeated. In this way, by controlling the timing of the row selection signal, an optional row is capable of being selected at random, and the row is capable of being also optionally changed even during the time when the row is selected. Specifically, the setting operation is capable of being carried out with respect to the current source circuit of an optional row, the period during the time when the setting operation is carried out is capable of being optionally changed. However, in the case of this circuit, during the time when the sampling pulse is outputted from the flip-flop circuit 221, it is not desirable that the selection signal is outputted. Since there is a possibility that the information inputted immediately before this information being inputted is not still kept in the latch 222.

Figure 38B:
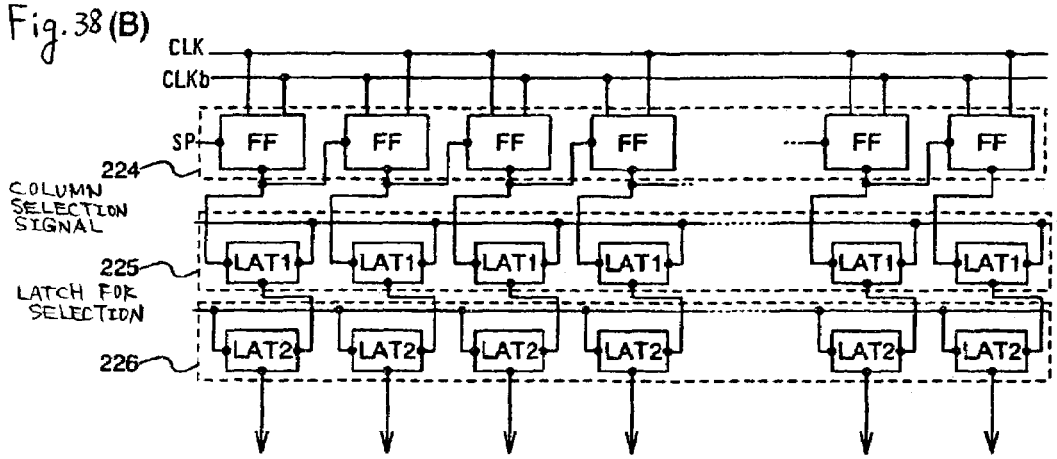

Then, a circuit which has been made so as to be capable of outputting the selection signal during the time when the sampling pulse is outputted from the flip-flop circuit 221 is the circuit shown in FIG. 38B. In FIG. 38B, the sampling pulse is outputted from the flip-flop circuit 224, and a column selection signal is inputted into the first latch 225. Then, the output of the sampling pulse is terminated, and after the column selection signal was inputted into all the first latch 225, signals of the first latch 225 are transferred to the second latch 226 using the latch for selection at the same time. Then, the selection signal is outputted from the second latch 226. Then, again, the sampling pulse is outputted from the flip-flop circuit 224, and the row selection signal is inputted into the first latch 225. However, at that time and at the same time, the selection signal continues to be outputted from the second latch 226. Therefore, each one is capable of being operated at the same time.

Figure 37:
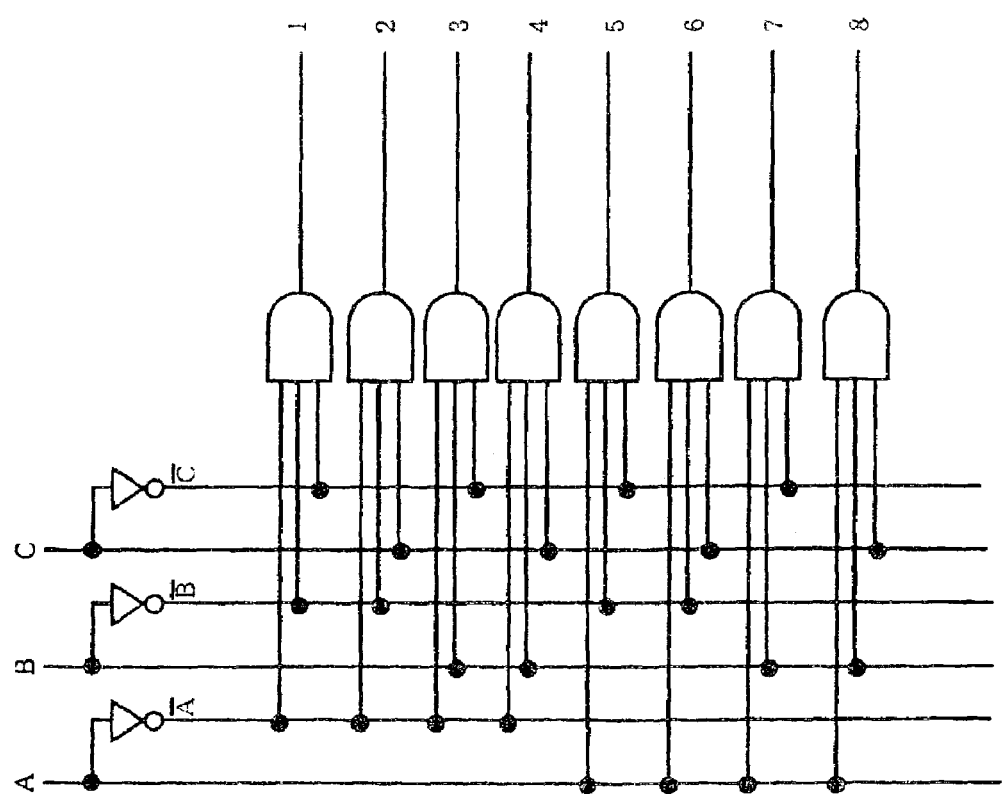
FIG. 37 is circuit diagrams of a decoder circuit.

Using the circuit indicated in the above-described FIGS. 37, 38, the setting operation of the current source circuit is also capable of being not in turn carried out, but carried out at random. Moreover, the time period during which the setting operation is carried out is also capable of being freely taken for a long time. When the setting operation of the current source circuit is capable of being carried out at random, a variety of advantages will occur. For example, in the case where the time periods during which the setting operation is capable of being carried out are interspersed in one frame, if an optional column is capable of being selected, the degree of freedom is raised, and the time period of the setting operation is capable of being taken for a long time. For example, in the time periods during which the setting operation is capable of being carried out and which are interspersed in one frame, the setting operation of the current source circuit is capable of being carried out by one column fully using the time period.

If the current source circuit of an optional column is not capable of being specified, and if the rows from the first row to the final row must be in turn specified, the time period of the setting operation per one column is shortened. This is the reason why the time period of the setting operation is shortened since in a certain determined time period, the setting operation must be carried out with respect to the current source circuit from the first column to the final column. As a result, the setting operation is not capable of being sufficiently carried out.

As the other advantages, the influence of the leak of the charge in a capacity element disposed within the current source circuit 420 (for example, in FIG. 6A, corresponding to a capacity element 103, in FIG. 6B, corresponding to a capacity element 123, in FIG. 6B, corresponding to a capacity element 107 or the like) is capable of being overshadowed. In the case where the leak of the charge in turn occurs column by column, the influence is easily seen, but in the case where it occurs at random, it is not easily seen to human eyes.

It should be noted that a capacity element is disposed in the current source circuit 420. However, a capacity element may be substituted with a gate capacity of a transistor. In the foregoing capacity element, the charge is accumulated by the setting operation of the current source circuit. Ideally, the setting operation of the current source circuit may be carried out only once at the time when the electric source is inputted. Specifically, when the signal line drive circuit is operated, during the first time period of the operation, it may be carried out once. Because the charge amount accumulated in a capacity element is not required to change by the operation state, the time and the like, and it is not changed. However, in reality, a variety of noises are entered into a capacity element or the leak current of the transistor connected to the capacity element flows. As a result, the charge amount accumulated in the capacity element may be changed accompanying with the time elapse. When the charge amount is changed, the current outputted from the current source circuit, that is, the current inputted into the pixel is also changed. As a result, the brightness of the pixel is also changed. Then, for the purpose that the charge accumulated in the capacity element does not vary, the setting operation of the current source circuit is carried out periodically in a certain cycle, the charge is refreshed, and the changed charge is again restored to the original, the necessity occurs that the correct amount of the charge must be again stored.

Supposing the case where the variation amount of the charge accumulated in a capacity element is large, the relevant charge is refreshed by carrying out the setting operation of the current source circuit, the changed charge is again restored to the original, and the correct amount of the charge is again stored, accompanying with this, the variation of the current amount that the current source circuit outputs becomes also large. Therefore, when the setting operation is in turn carried out from the first row, the variation of the current amount that the current source circuit outputs may cause the display disturbance to the extent that it is capable of being visibly recognized. Specifically, the change of the brightness of the pixel which in turn occurs from the first row may cause the display disturbance to the extent that it is capable of being visibly recognized. In this case, if the setting operation is not in turn carried out from the first row, but carried out at random, the variation of the current amount that the current source circuit outputs is capable of being overshadowed. In this way, by selecting a plurality of wirings at random, a variety of advantages will occur.

On the other hand, in the case where the configuration shown in FIGS. 6C–E is employed for the current source circuit 420, since the setting operation and the input operation are capable of being carried out at the same time, it is sufficient if the usual shift register capable of in turn selecting from the first column to the final column is disposed.

Figure 39:
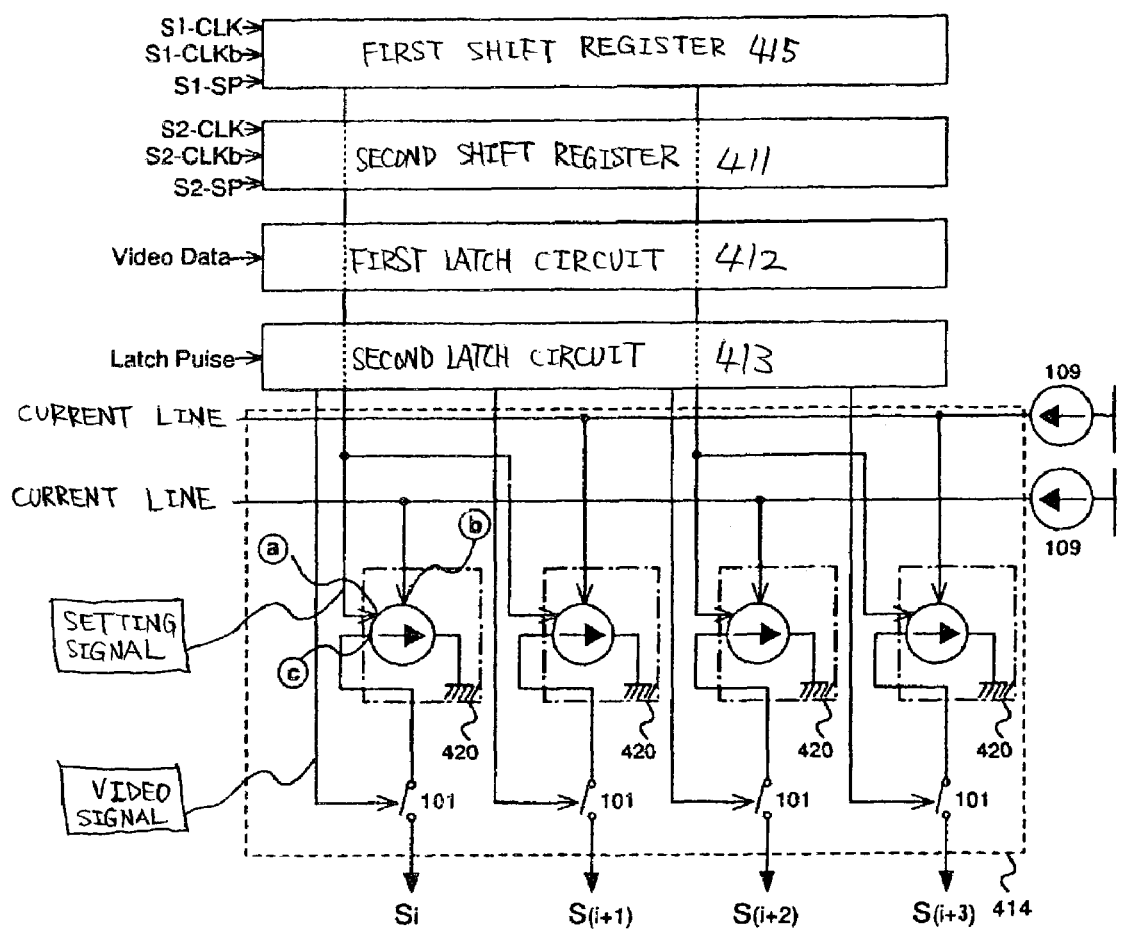
FIG. 39 is a view of a signal line driver circuit.

Moreover, in FIG. 3B, although the setting operation is carried out column by column, it is not limited by this. As shown in FIG. 39, the setting operation may be carried out on a plurality of columns at the same time. Here, that the setting operation is carried out on a plurality of columns at the same time is referred to as polyphasing. It should be noted that in FIG. 39, although two pieces of the constant current source for reference 109 are disposed, the setting operation might be carried out from the constant current source for reference separately disposed with respect to these two pieces of the constant current source for reference.

Figure 40:
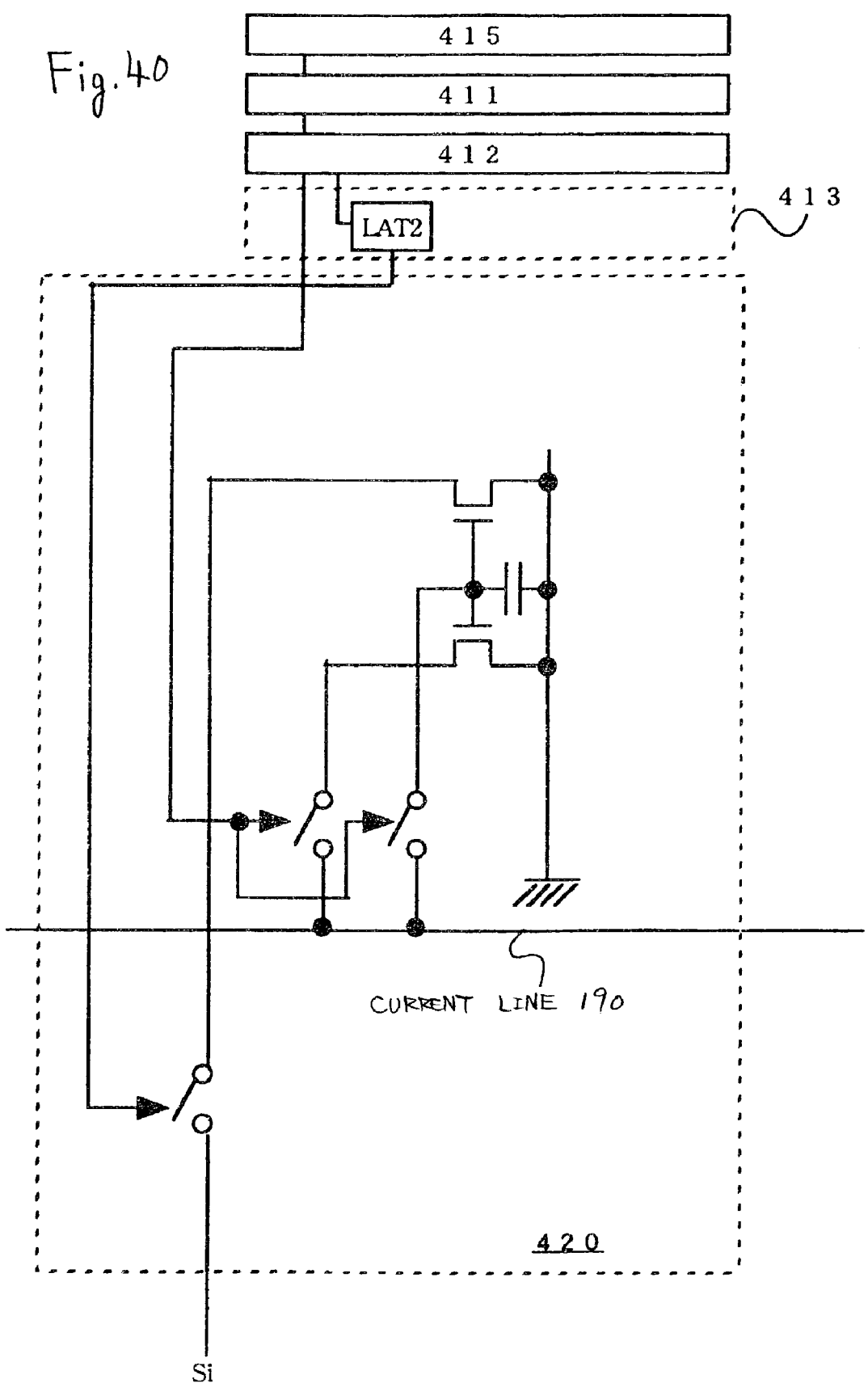
FIG. 40 is a view of a signal line driver circuit.

Now, the detailed configuration of the constant current circuit 414 shown in FIG. 3B is shown in FIG. 40, FIG. 41. FIG. 40 shows a circuit for applying that of FIG. 6C to the portion of the current source circuit. FIG. 41 shows a circuit for applying that of FIG. 6A to the portion of the current source circuit.

So far, the case of line sequential drive has been described. Subsequently, hereinafter, the case of dot sequential drive will be described.

In FIG. 42A, the sampling of a video signal supplied to the video line is carried out according to the timing of the sampling pulse supplied from the second shift register 411. Moreover, the setting of the current source circuit 420 is carried out according to the timing of the sampling pulse supplied from the first shift register 415. In this way, in the case where it has the configuration of FIG. 42A, the dot sequential drive is carried out.

It should be noted that in the case where only during the time when the sampling pulse is outputted and the video signal is supplied from the video line, the switch 101 (signal current control switch) is turned to be ON-state, and when the sampling pulse is not outputted and the video signal is not supplied from the video line, the switch 101 (signal current control switch) is turned to be OFF-state, it is not correctly operated. Because in the pixel, the switch for inputting the current remains to be ON-state. In this state, when the switch 101 (signal current control switch) is turned to be OFF-state, since the current is not inputted into the pixel, the signal is not correctly capable of being inputted.

Hence, in order to be capable of keeping the video signal supplied from the video line and maintaining the state of the switch 101 (signal current control switch), the latch circuit 452 is disposed. The latch circuit 452 may be configured only with a simple capacity element and a switch, or may be configured with a SRAM circuit. In this way, the sampling pulse is outputted, a video signal is in turn supplied column by column from the video line, the switch 101 (signal current control switch) is turned to be ON-state or to be OFF-state based on its video signal, and the dot sequential drive is capable of being realized by controlling the supply of the current to the pixel.

However, in the case where the columns from the first column to the final column are in turn selected, on the columns nearby the first column, the time period for inputting the signal to the pixel is long. On the other hand, on the columns nearby the final column, even when the video signal has been inputted, soon, the pixel of the next line is selected. As a result, the time period during which the signal is inputted into the pixel is shortened. In such a case, as shown in FIG. 42B, the time period during which the signal is inputted into the pixel is capable of being lengthened by dividing the scan line disposed in the pixel 402 at the center. In this case, one piece of scan line drive circuit is disposed on the left side and right side of the pixel section 402, respectively, and the pixel is driven using the relevant scan line drive circuit. If doing in such a way, even the pixels disposed on the same column, the pixel on the right side and the pixel on the left side are capable of shifting the time period that the signal is inputted. In FIG. 42C, the output waveform of the scan line drive circuits disposed on the right side and left side of the first line and second line and a start pulse (S2-SP) of the second shift register 411 is shown. By operating as the waveform described in FIG. 42C, even the pixel on the left side is capable of lengthening the time period during which the signal is inputted into the pixel, the dot sequential drive is facilitated to carry out.

It should be noted that the setting operation of the current source circuit 420 may be carried out by an optional times with an optional timing to a current source circuit disposed on an optional column regardless of whether it is the line sequential drive or the dot sequential drive. However, ideally, as far as the predetermined charge is kept in a capacity element connected between gate/source of the transistor disposed in the current source circuit 420, it may be carried out only once when the setting operation is carried out. Or, it may be carried out in the case where the predetermined charge kept in a capacity element has been discharged (varied). Moreover, as for the setting operation of the current source circuit 420, the setting operation of the current source circuit 420 of all the columns may be carried out even if it takes for any long time period. Specifically, the setting operation of the current source circuit 420 of all the columns may be carried out within one frame time period. Or, within one frame time period, the setting operation is carried out to the several columns of the current source circuits 420, as a result of this, taking for over several frame time period, the setting operation of all the columns of the current source circuits 420 may be carried out.

Moreover, in the present embodiment, the case where one current source circuit is disposed on each column has been described above, but the present invention is not limited to this, and a plurality of current source circuit may be disposed.

Figure 43:
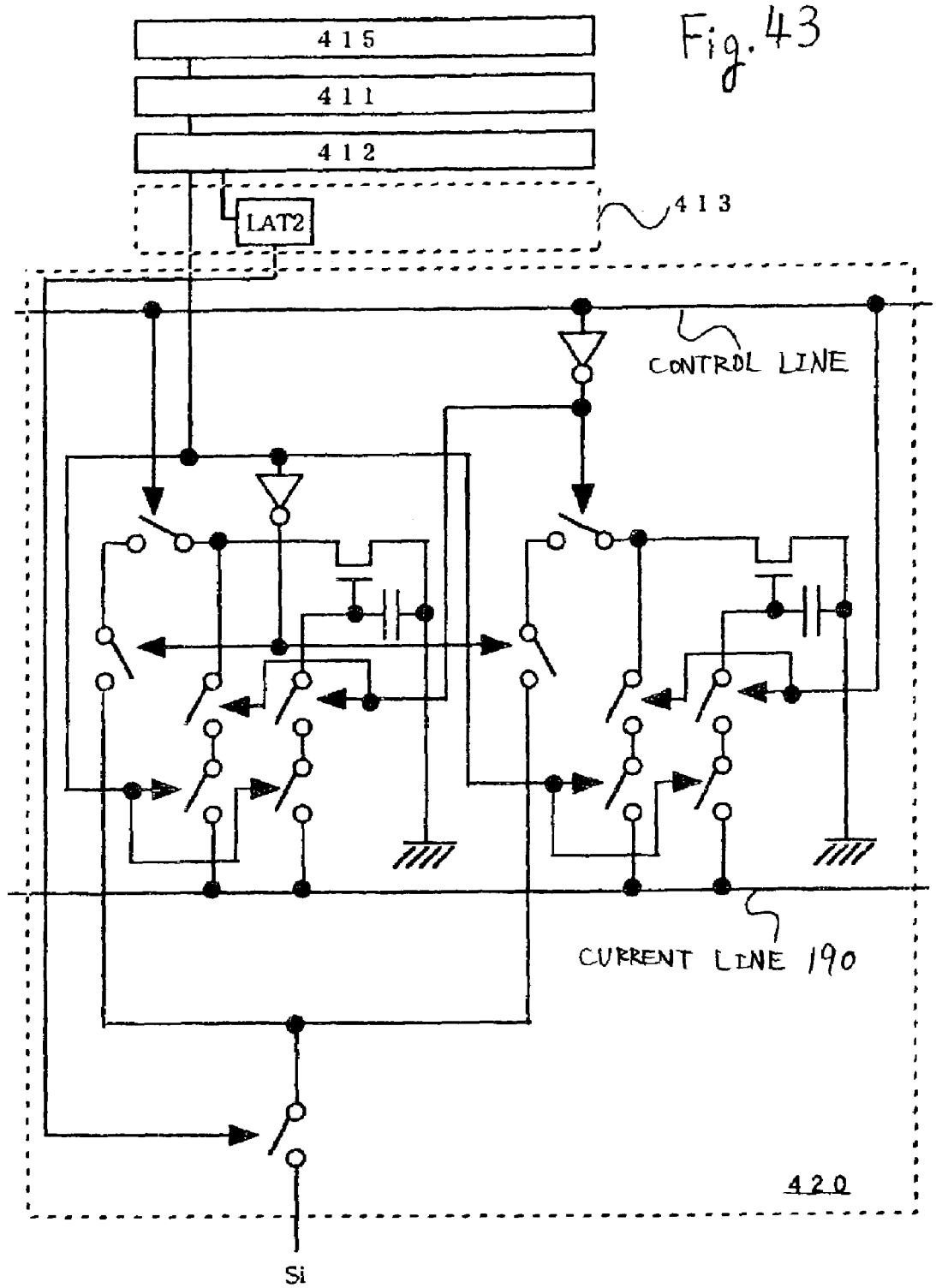
FIG. 43 is a view of a signal line driver circuit.

Then, as an example, the case where that of FIG. 2 is applied to the portion of the current source circuit of FIG. 3B is considered. The detailed configuration of the constant current circuit 414 in that case is shown in FIG. 43. Here, FIG. 43 shows a circuit for applying that of FIG. 6A to the portion of the current source circuit. In the configuration shown in FIG. 43, the setting operation can be carried out to one of the current source, and at the same time, the other current source can carry out the input operation, by controlling the control line.

Moreover, the present invention provides a signal line drive circuit in which two shift registers (first and second shift registers) are provided. As for these first and second shift registers, one is a current source circuit, the other is a circuit for controlling the video signal, that is, a circuit for making an image display, controlling, for example, a latch circuit, a sampling switch and the switch 101 (signal current control switch) and the like. Then, it is possible that the operation of the first and second shift registers are independently carried out, necessarily it is possible that the setting operation of the current source circuit and the operation of the image display are independently carried out. Since the setting operation of the current source circuit is capable of being precisely carried out when it is carried out by taking an enough time, a configuration of the present invention in which the current source circuit and the latch circuit are capable of being independently operated is very effective.

Figure 57:
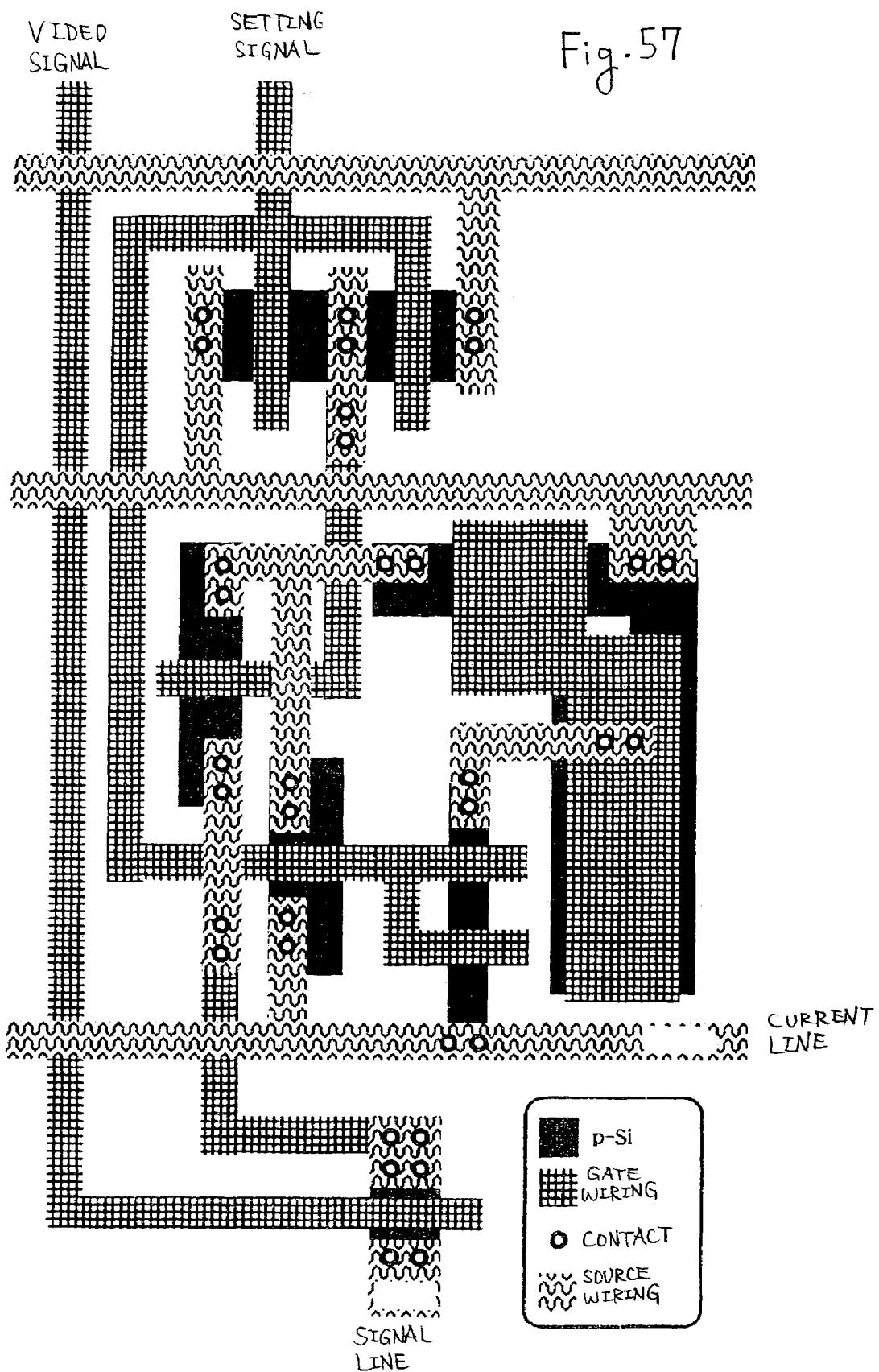
FIG. 57 is a layout view of a current source circuit.
Figure 58:
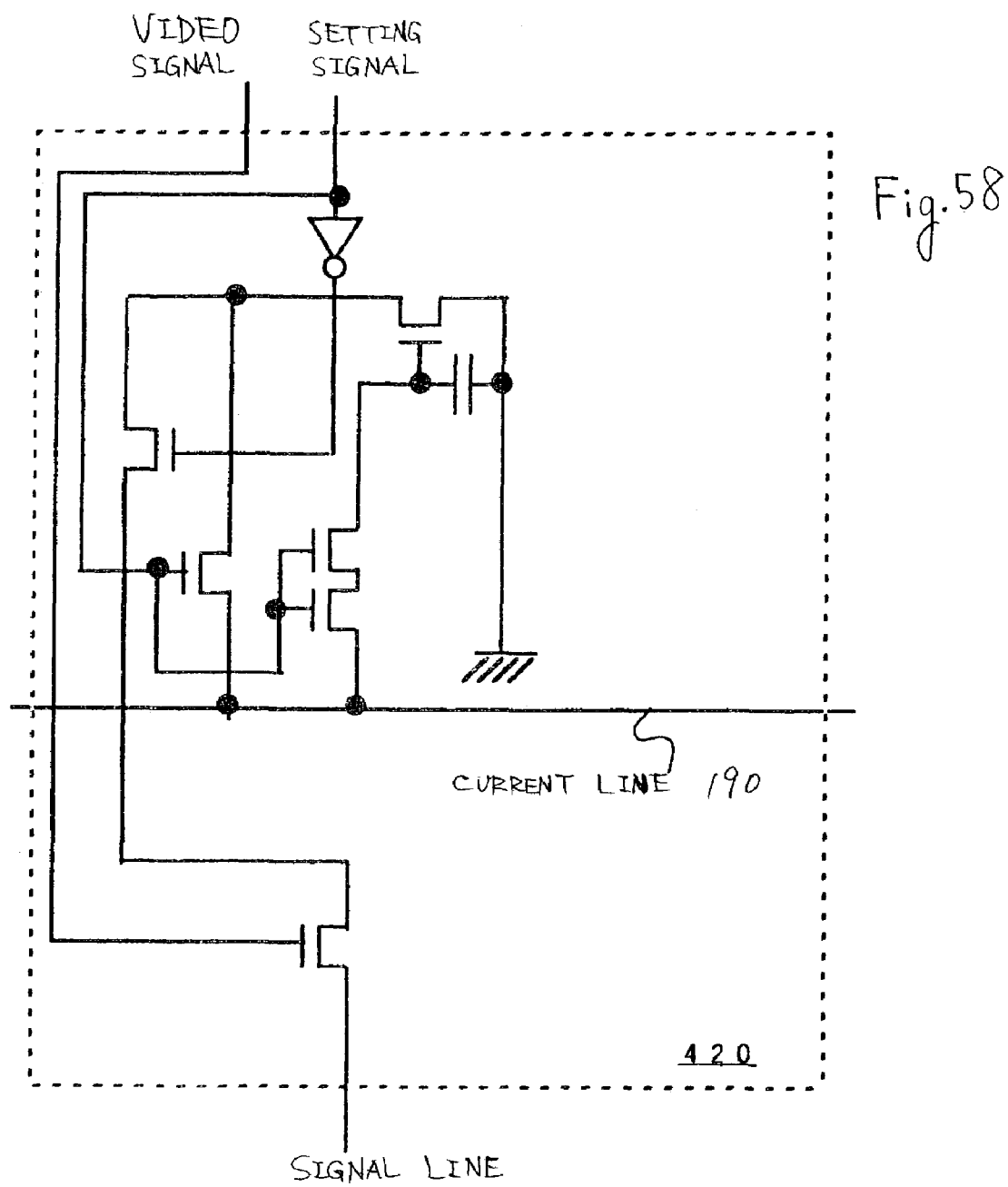
FIG. 58 is a circuit diagram of a current source circuit.

Moreover, as for a current source circuit in a signal line drive circuit of the present invention, the layout diagram is shown in FIG. 57, and corresponding circuit diagram is shown in FIG. 58.

It should be noted that the present embodiment is capable of being optionally combined with Embodiments 1–3.

Embodiment 5

In this embodiment, the detailed structure and operation of the signal line driver circuit 403 shown in FIG. 15(A) will be described. In this embodiment, a description is made of the signal line driver circuit 403 used in the case of performing 3-bit digital gradation display.

Figure 4:
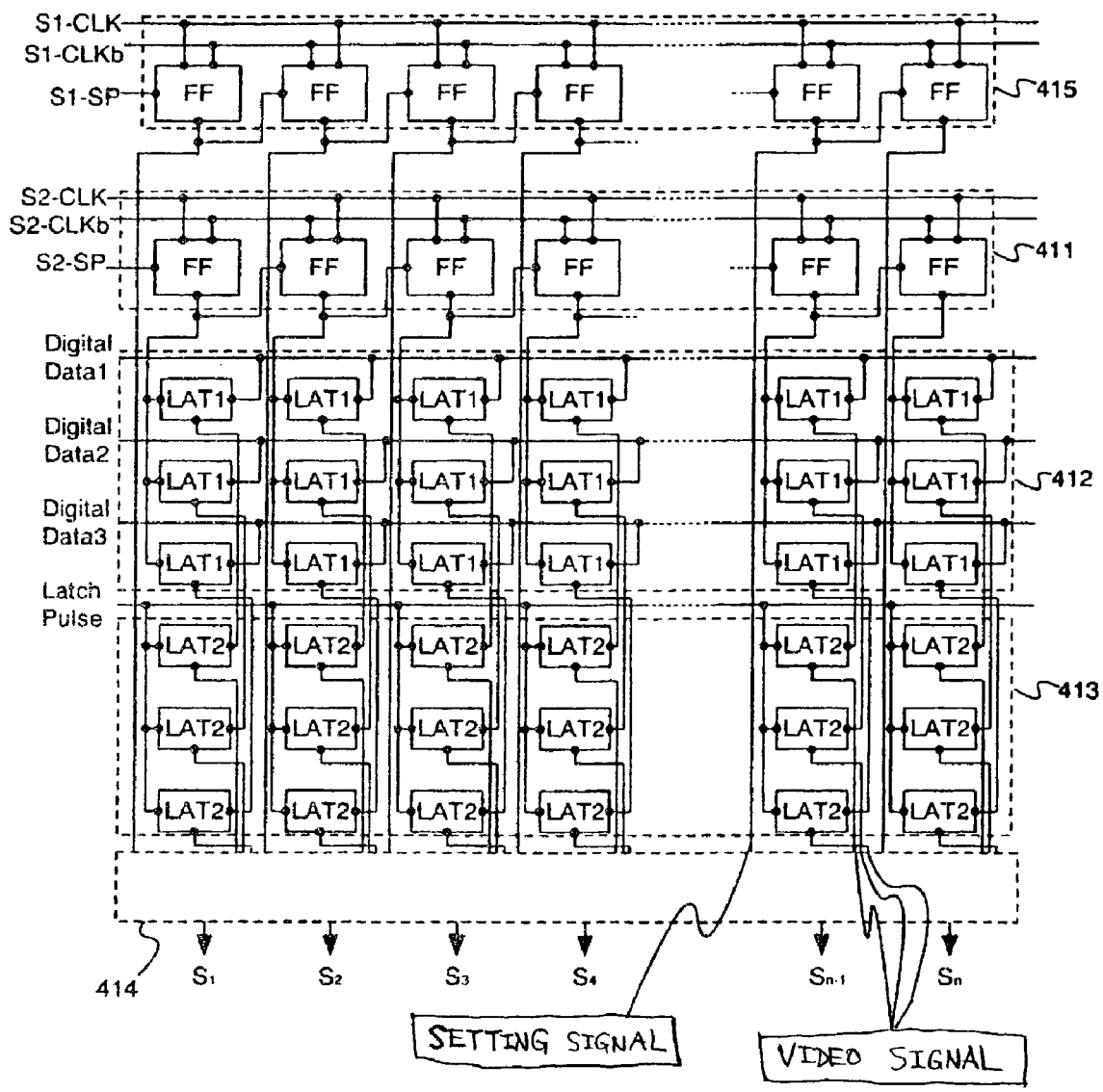
FIG. 4 is a view of a signal line driver circuit (3-bit).

FIG. 4 is a schematic view of the signal line driver circuit 403 in the case of performing the 3-bit digital gradation display. The signal line driver circuit 403 includes a first shift register 415, a second shift register 411, a first latch circuit 412, a second latch circuit 413, and a constant current circuit 414.

The operation will be briefly described below. The first shift register 415 and the second shift register 411 are formed using a plurality of flip-flop circuits (FF), and is input with a clock signal (S-CLK, (S1-CLK, S2-CLK)), a start pulse (S-SP (S1-SP, S2-SP)), and an inverted clock signal (S-CLKb (S1-CLKb, S2-CLKb)). In accordance with the timing of these signals, sampling pulses are sequentially output therefrom.

The sampling pulses, which have been output from the first shift register 415, are input to the constant current circuit 414. The sampling pulses, which have been output from the shift register 411, are input to the first latch circuit 412. 3-bit digital video signals (Digital Data 1 to Digital Data 3) have been input to the first latch circuit 412, and a video signal is retained in each column in accordance with the timing at which the sampling pulse is input.

In the first latch circuit 412, upon completion of video-signal retaining in columns to the last column, during a horizontal return period, a latch pulse is input to the second latch circuit 413, and the 3-bit digital video signals (Digital Data 1 to Digital Data 3) retained in the first latch circuit 412 are transferred in batch to the second latch circuit 413. Then, the 3-bit digital video signals (Digital Data 1 to Digital Data 3) for one line, which are retained in the second latch circuit 413, are input to the constant current circuit 414 at a time.

While the 3-bit digital video signals (Digital Data 1 to Digital Data 3) retained in the second latch circuit 413 are input to the constant current circuit 414, sampling pulses are again output in the shift register 411. Thereafter, the operation is iterated, and video signals for one frame are thus processed.

There is a case where the constant current circuit 414 plays a role of converting a digital signal into an analog signal. In the constant current circuit 414, a plurality of current source circuits 420 are provided. FIG. 5 is a schematic view of the signal line driver circuit related to the three signal lines in i-th to (i+2)-th columns.

Note that FIG. 5 shows the case where a reference constant current source 109 corresponding to each bit is arranged.

Each current source circuit 420 has a terminal a, a terminal b, and a terminal c. The current source circuit 420 is controlled by a signal input from the terminal a. Further, current is supplied via a terminal b from a reference constant current source 109 connected to a current line. Switches (signal current control switches) 111 to 113 are provided between the current source circuit 420 and a pixel connected to a signal line Sn, and the switches (signal current control switches) 111 to 113 are controlled by 1-bit to 3-bit video signals. In the case where the video signal is a bright signal, a current is supplied from the current source circuit to the pixel. On the contrary, in the case where the video signal is a dark signal, the switches (signal current control switches) 111 to 113 are controlled not to supply current to the pixel. That is, the current source circuit 420 has a capability of flowing a predetermined current, and the switches (signal current control switches) 111 to 113 control whether the current is supplied to the pixel or not.

Referring to FIG. 5, the current lines and the reference constant current sources are disposed in correspondence with respective bits. The sum of the values of currents supplied from the current sources of the respective bits is supplied to the signal lines. That is, the constant current circuit 414 also has a function of digital-analog conversion.

Note that the setting signal input from the terminal a corresponds to the sampling pulse supplied from the first shift register 415. In the present invention, setting of the current source circuit 420 is performed in accordance with the sampling pulse supplied from the first shift register. In this embodiment, because of a description with reference to an example of the case of performing 3-bit digital gradation display, three current source circuits 420 are provided for each column. When signal currents supplied from the three current source circuits 420 connected to one signal line are set to a ratio of 1:2:4, the current magnitude can be controlled at $2^3=8$ levels.

Figure 44:
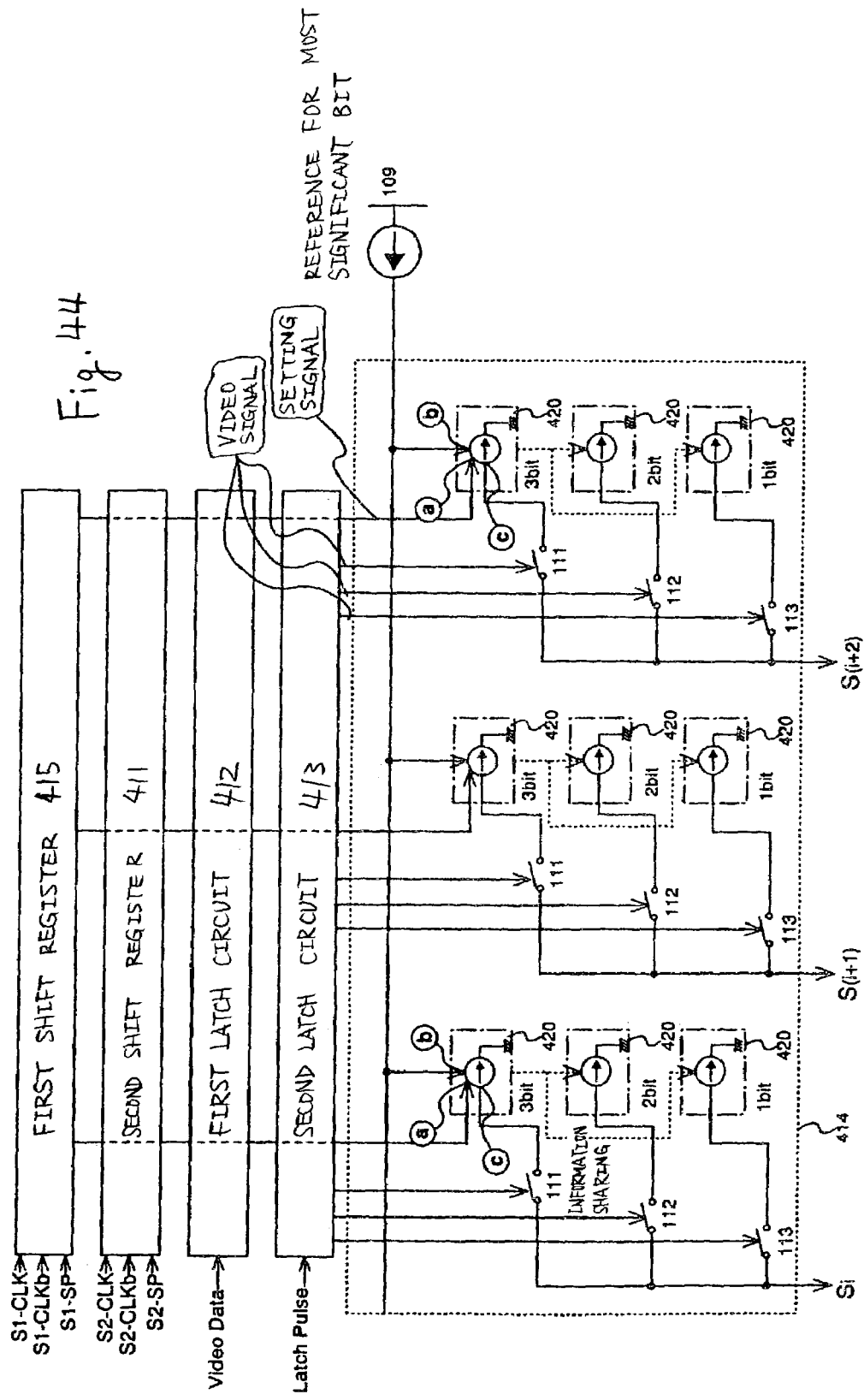
FIG. 44 is a view of a signal line driver circuit.

In the signal line driver circuit shown in FIG. 5, although dedicated reference constant current sources 109 are respectively disposed for the 1-bit to 3-bit, the present invention is not limited to this. As shown in FIG. 44, reference constant current sources 109 the number of which is smaller than the number of bits may be disposed. For example, it may be such that only the reference constant current source 109 for the most significant bit (3-bit in this case) is disposed; one current source circuit selected from a plurality of current source circuits disposed in one column is set; and using the current source circuit for which the setting operation has already been performed, the operation is performed for other current source circuits. In other words, the current source circuit for which the setting operation has already been performed may be used to share setting information.

For example, a setting operation is performed only for a 3-bit current source circuit 420. Then, using the current source circuit 420 for which the setting operation has been performed, information is shared among other 1-bit and 2-bit current source circuits 420. More specifically, among current source circuits 420, the gate terminal of each current-supplying transistor (corresponding to a transistor 102 in FIG. 6(A)) is connected, and also the source terminal is connected. As a result, gate-source voltages of information-sharing transistors (current-supplying transistors) become identical.

Referring to FIG. 44, the setting operation is performed not for the current source circuits of the least significant bit (1-bit in this case), but for the current source circuits of the most significant bit (3-bit in this case). Thus, when the setting operation is performed for the current source circuits of a greater-value bit, the influence of variation in characteristics of inter-bit current source circuits can be reduced. Suppose the setting operation is performed for the current source circuits of the least significant bit (1-bit in this case), information related to the setting operation performed for the current source circuits of the least significant bit is shared among the current source circuits of the upper bits. In this case, when the characteristics of the respective current source circuits vary, the values of currents of the upper bits lack precision. This is because since upper-bit current source circuits produce outputs having great current values, even when a small variation has occurred in their characteristics, the influence of the variation is magnified, and also output current values are also varied great. In contrast, in the case where the setting operation is performed for the current source circuits of the most significant bit (3-bit in this case), information related thereto is shared among the current source circuits of the lower bits. Even when the characteristics of the respective current source circuits have varied, since output current values are small, differences in the current value due to variation are small, and the influence is small.

The structure of the current source circuit 420 may be arbitrarily adopted among structures shown in FIGS. 6, 7, 32, 33, and 35. The current source circuit 420 can be adopted not only single structure but also plural structures.

Figure 23:
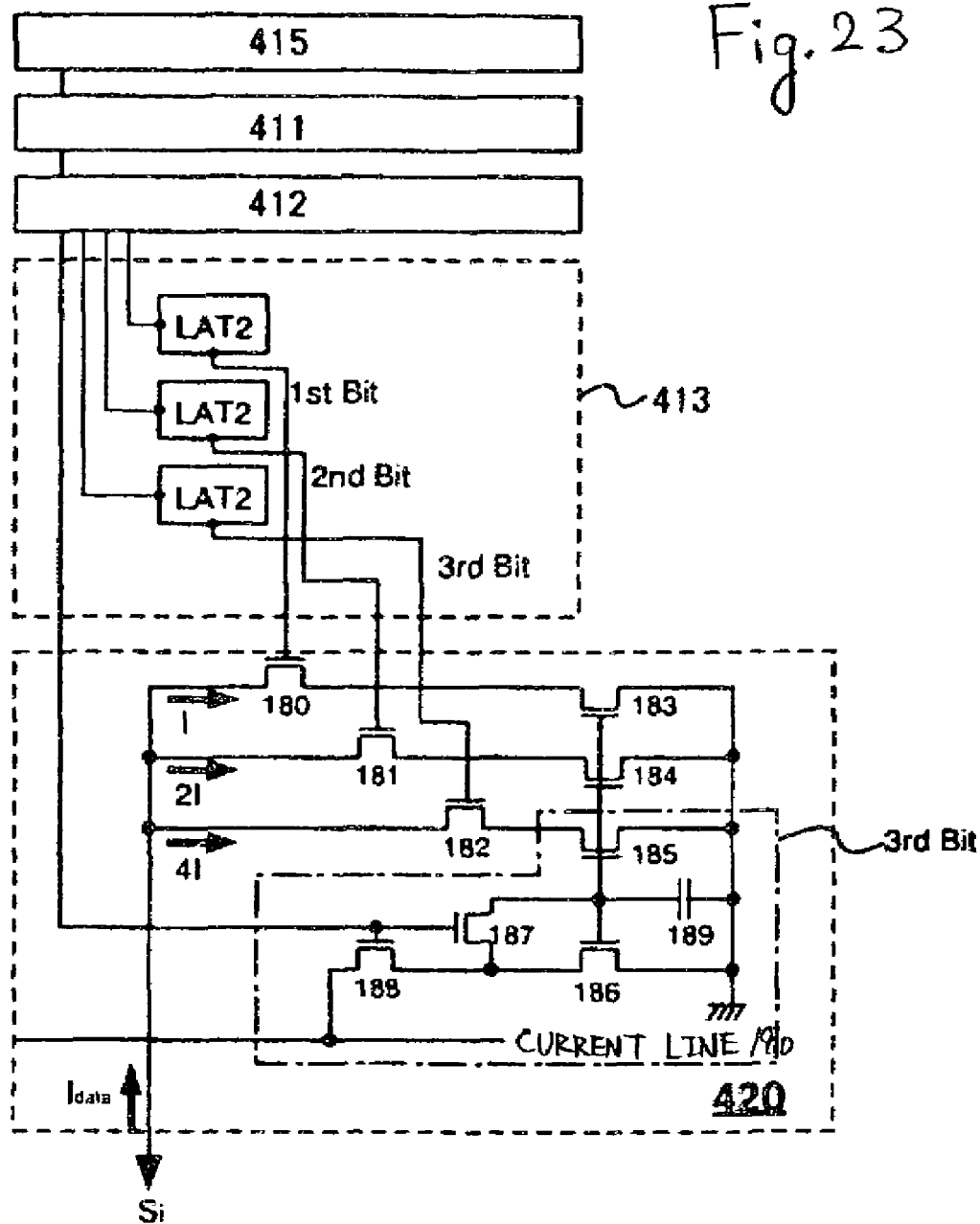
FIG. 23 is a view of a signal line driver circuit (3-bit).
Figure 24:
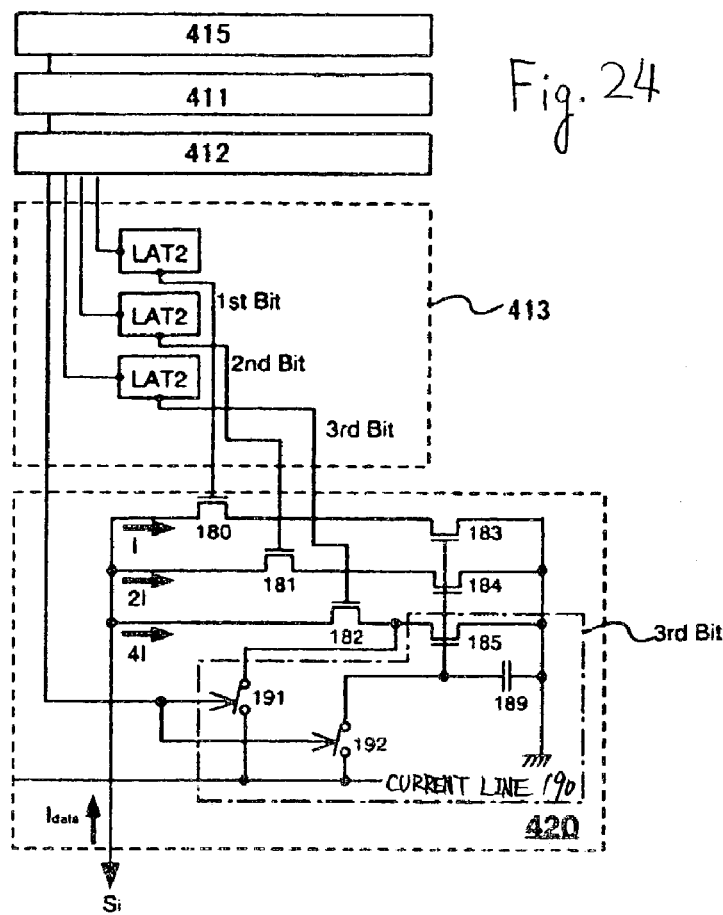
FIG. 24 is a view of a signal line driver circuit (3-bit).

Meanwhile, as shown in FIG. 6(C), when the current source circuit 420 includes the structure having a current mirror circuit, the structure may be alternatively such that the gate electrodes of transistors in the current source circuit 420 are commonly connected, as shown in FIGS. 23 and 24.

Figure 45:
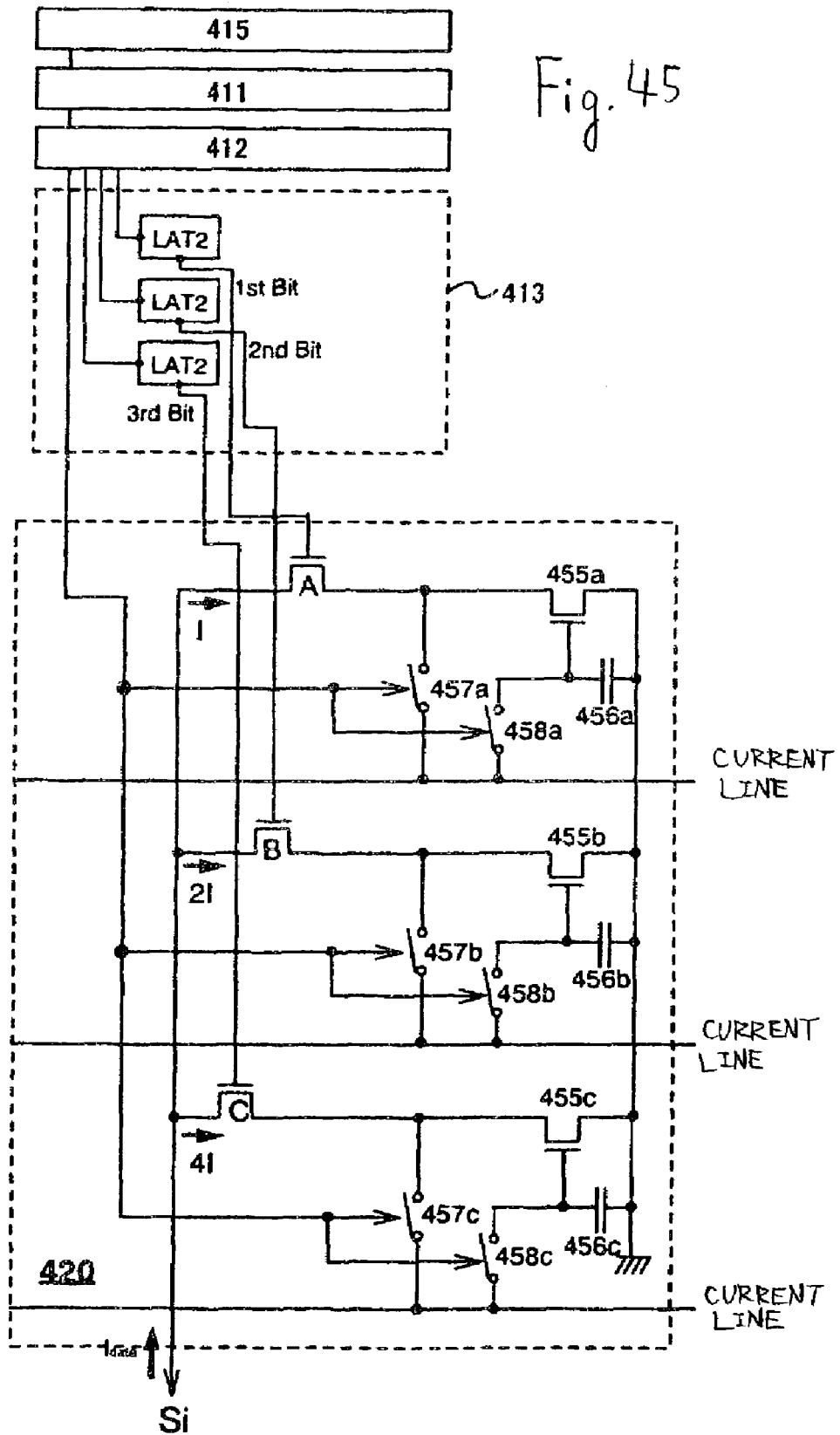
FIG. 45 is a view of a signal line driver circuit.

Hereinafter, the structure of the constant current circuit 414 shown in FIGS. 4, 5, and 44 are illustrated in FIGS. 23, 24, and 45 in detail.

In a current source circuit 420 provided in each column shown in FIGS. 23, 24, and 45, whether or not a predetermined signal current $I_{data}$ is output to the signal line Si ($1 \leq i \leq n$) is controlled according to High or Low information contained in a 3-bit digital video signal (Digital Data 1 to Digital Data 3) input from a second latch circuit 413.

FIG. 45 is a circuit diagram in the case where the current source circuit of FIG. 6(A) is disposed in the signal line driver circuit shown in FIG. 5. In FIG. 45, the setting operation is performed with transistors A to C being turned OFF. This is for preventing a current leakage. Alternatively, switches may be disposed in series with the transistors A to C, in which the switches are turned OFF in the setting operation.

Illustrated in FIGS. 23 and 24 are cases where the reference constant current sources 109 the number of which is fewer than the number of bits are disposed. FIG. 23 is a circuit diagram in the case where the current source circuit of FIG. 6(C) is disposed in the signal line driver circuit shown in FIG. 44. FIG. 24 is a circuit diagram in the case where the current source circuit of FIG. 6(A) is disposed in the signal line driver circuit of FIG. 44.

In FIG. 23, the current source circuit 420 includes transistors 180 to 188 and a capacitor device 189. In this embodiment, the transistors 180 to 188 are all of n-channel type.

A 1-bit digital video signal is input to a gate electrode of the transistor 180 from the second latch circuit 413. One of a source region and a drain region of the transistor 180 is connected to the source signal line (Si), and the other is connected to one of a source region and a drain region of the transistor 183.

A 2-bit digital video signal is input to a gate electrode of the transistor 181 from the second latch circuit 413. One of a source region and a drain region of the transistor 181 is connected to the source signal line (Si), and the other is connected to one of a source region and a drain region of the transistor 184.

A 3-bit digital video signal is input to a gate electrode of the transistor 182 from the second latch circuit 413. One of a source region and a drain region of the transistor 182 is connected to the source signal line (Si), and the other is connected to one of a source region and a drain region of the transistor 185.

One of the source region and the drain region of each of the transistors 183 to 185 is connected to Vss, and the other is connected to one of the source region and the drain region of each of the transistors 180 to 182. One of a source region and a drain region of the transistor 186 is connected to Vss, and the other is connected to one of a source region and a drain region of the transistor 188.

A sampling pulse is input from the first shift register 415 to the gate electrodes of the transistors 187 and 188. One of the source region and the drain region of the transistor 187 is connected to one of the source region and the drain region of the transistor 186, and the other is connected to one of electrodes of a capacitor device 189. One of the source region and the drain region of the transistor 188 is connected to a current line 190, and the other is connected to one of the source region and the drain region of the transistor 186.

One of the electrodes of the capacitor device 189 is connected to the gate electrodes of the transistors 183 to 186, and the other electrode is connected to Vss. The capacitor device 189 plays a role of retaining the gate-source voltages of the transistors 183 to 186.

In the current source circuit 420, when the transistor 187 and the transistor 188 are turned ON, a current flows to the capacitor device 189 from a reference constant current source (not shown) connected to the current line 190. At this time, the transistors 180 to 182 are OFF.

Charge is then gradually accumulated in the capacitor device 189, and an potential difference begins to occur between both the electrodes. When the potential difference between both the electrodes has reached $V_{th}$, the transistors 183 to 186 are turned ON.

The charge accumulation continues until the potential difference between both the electrodes, that is, each gate-source voltage of the transistors 183 to 186 increases up to a desired voltage. In other words, the charge accumulation continues until the transistors 183 and 186 each reach a voltage that allows to the signal current to flow.

Upon completion of the charge accumulation, the transistors 183 and 186 are fully turned ON.

Subsequently, in the current source circuit 420, conductivity/non-conductivity of the transistors 180 to 182 is selected according to the 3-bit digital video signal. For example, when all the transistors 180 to 182 are turned to the conductive state, the current supplied to the signal line (Si) corresponds to the sum of the drain current of the transistor 183, the drain current of the transistor 184, and the drain current of the transistor 185. When only the transistor 180 has been turned to the conductive state, only the drain current of the transistor 183 flows to the signal line (Si).

As described above, the gate terminals of the transistors 183 to 185 are connected, whereby setting-operation information can be shared. Here, the setting-operation information is shared among the transistors disposed in the same column, but the present invention is not limited to this. For example, the setting-operation information may be shared also with transistors in a different column. That is, the transistor gate terminals may be connected to the different column transistors. Thus, the number of current source circuits to be set can be reduced. Consequently, time required for the setting operation can be reduced. In addition, since the number of circuits can be reduced, the layout area can be made small.

Figure 46:
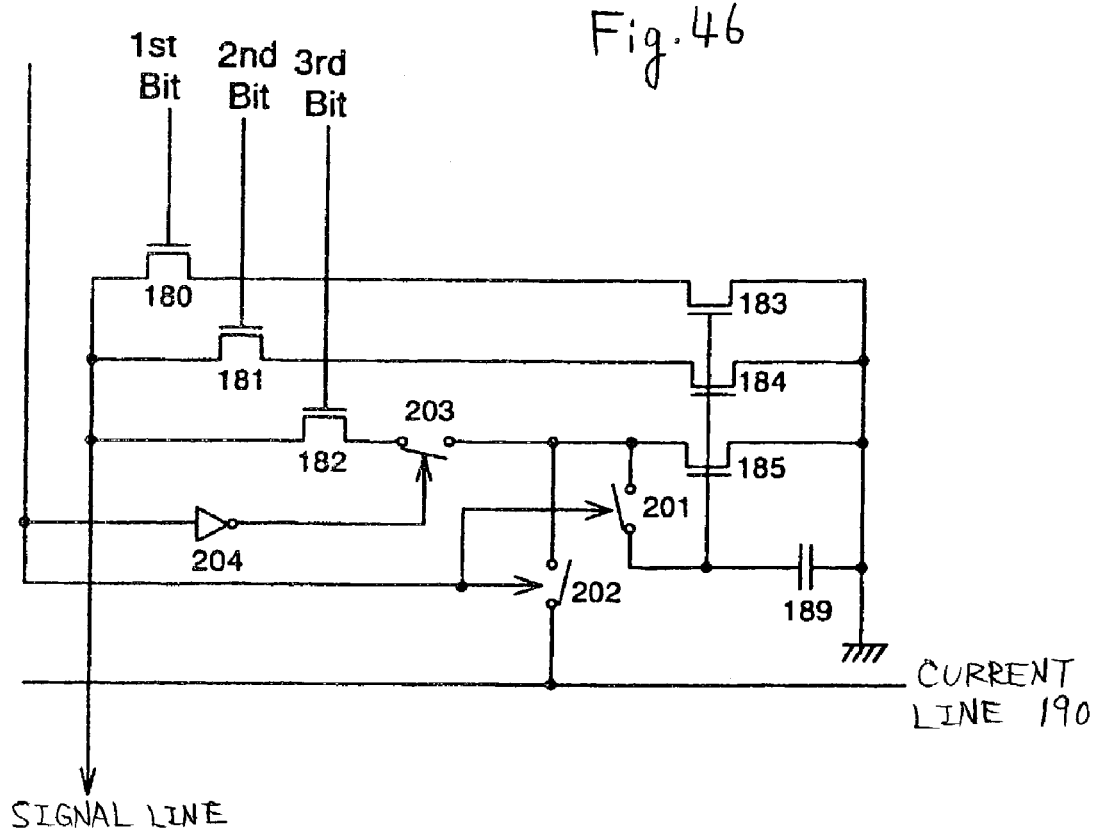
FIG. 46 is a view of a signal line driver circuit.

In FIG. 24, the setting operation is performed for the current source circuit with the transistors 182 being turned OFF. This is for preventing a current leakage. Further, FIG. 46 is a circuit diagram of a current source circuit in the case where a switch 203 is disposed in series with the transistor 182 in the structure of FIG. 24. Referring to FIG. 46, the switch 203 is turned OFF in the setting operation, and is turned ON in other time.

At this event, in FIGS. 23, 24, and 46, when the drain current of the transistor 183, the drain current of the transistor 184, and the drain current of the transistor 185 are set to a ratio of 1:2:4, the current magnitude can be controlled at $2^3=8$ levels. Thus, when design is performed with the values of W (channel width)/L (channel length) of the transistors 183 to 185 set to 1:2:4, the respective ON currents are set to 1:2:4.

FIG. 24 shows the current source circuit 420 having a circuit structure different from that of FIG. 23. The current source circuit 420 in FIG. 24 is structured such that a switch 191 and a switch 192 are disposed to replace the transistors 186 to 188.

The current source circuit 420 shown in FIG. 24 is similar in operation to the current source circuit 420 shown in FIG. 23 except the point in that when the switches 191 and 192 are turned ON, a current flows to the capacitor device 189 via the transistor 185 from the reference constant current source (not shown) connected to the current line 190. Thus, a description thereof will be omitted in this embodiment.

Meanwhile, in this embodiment, while all the transistors contained in the current source circuit 420 shown in FIG. 23, 24, or 46 are of n-channel type, the present invention is not limited to this. P-channel transistors may also be used. Operation of the current source circuit 420 in the case of using the p-channel transistors is similar to the operation described above except the point in that the direction in which a current flows is changed and the point in that the capacitor device is connected to not Vss but Vdd. Thus, a description thereof will be omitted.

When using the p-channel transistors, the case where Vss is not replaced with Vdd, that is, the case where the current-flow direction is not changed can be easily applied with the comparison between FIG. 6 and FIG. 7.

Figure 47:
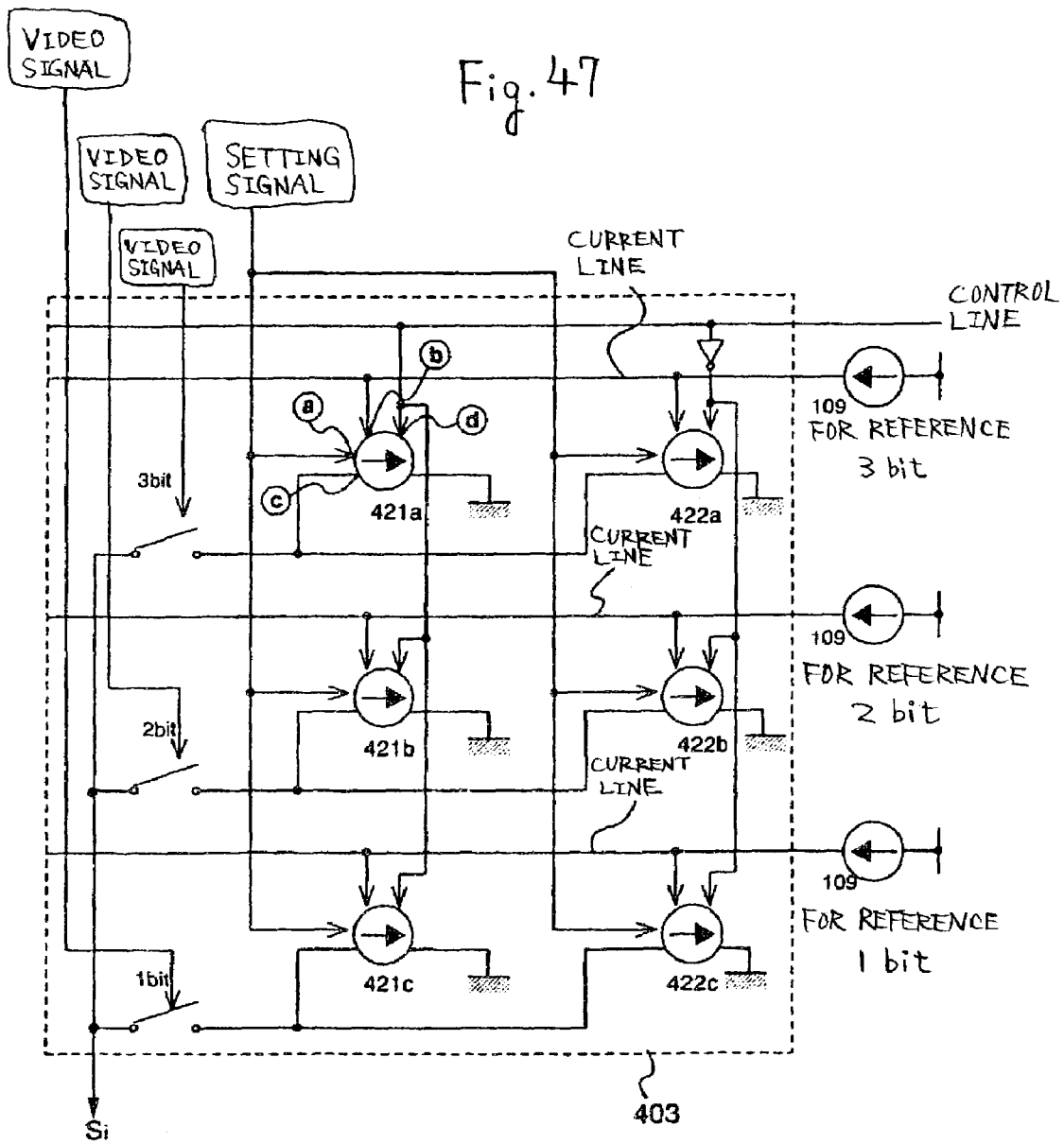
FIG. 47 is views of a signal line driver circuit.

One current source circuit for each bit is disposed for each signal line in FIG. 5. However, as shown in FIG. 2, a plurality of current source circuits may be disposed for each signal line. The diagram at this time is shown in FIG. 47. Similarly, although one constant current source 109 is disposed for each bit in the structure of FIG. 44, the constant current source 109 may be shared by the plurality of bits, as shown in FIG. 48.

Note that, in this embodiment, the description has been made of the structures and operations of the signal line driver circuits in the case where the 3-bit digital gradation display is carried out. However, the present invention is not limited to the 3-bit. It is possible that signal line driver circuits corresponding to arbitrary number of bits are designed with reference to this embodiment, thereby performing display with an arbitrary number of bits. In addition, this embodiment may be arbitrarily combined with Embodiments 1 to 4.

Further, with reference to this embodiment, for example, multi phases and dot-sequential drive can be easily realized when performing display with an arbitrary number of bits. The setting operation is not necessary sequentially performed for the current source circuits in the columns from the first column, and the setting operation can be performed at random for the current source circuit. In that case, the decoder circuit shown in FIG. 37 and circuits shown in FIGS. 38(A), 38(B) can be used.

Embodiment 6

The constant current source for reference 109 for supplying the current to the current source circuit may be integrally formed with a signal line drive circuit on the substrate, or is disposed to the exterior of the substrate using IC or the like. In the case where these are integrally formed on the substrate, it may be formed with any one of the current source circuits shown in FIG. 6-FIG. 8 and FIG. 31-FIG. 35. Or, simply one piece of transistor is disposed, which may control the current value corresponding to the voltage applied to the gate. In the present Embodiment, an example of the current source for reference 109 will be described below.

Figure 25:
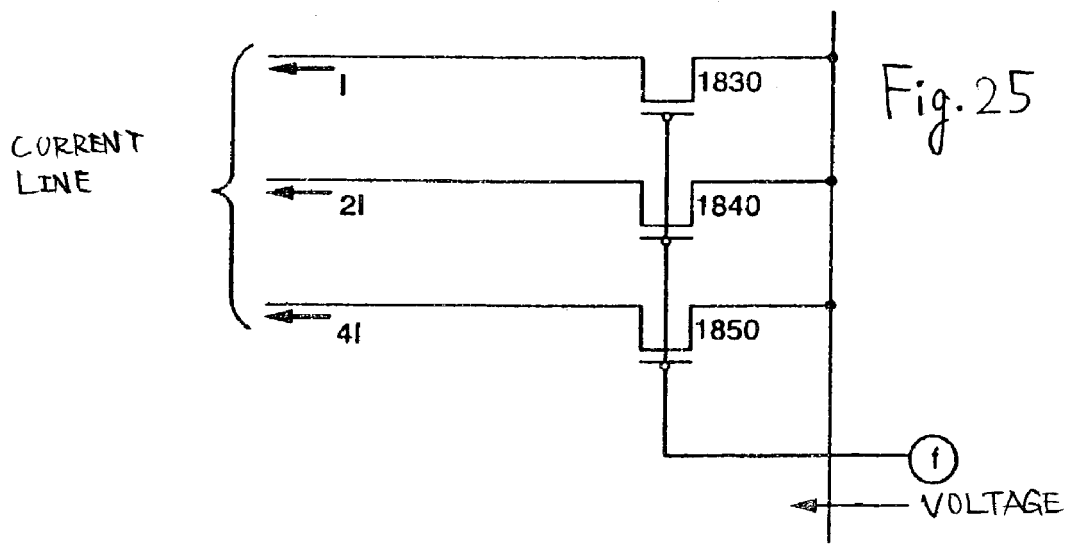
FIG. 25 is a circuit diagram of a reference constant current source.

In FIG. 25, as an example, the simplest case is shown. Specifically, this is a method in which the voltage of the gate is adjusted by applying the voltage to the gate of the transistor, and the case where 3 pieces of current line are required is shown. If only one piece of the current line is required, the current lines corresponding to the transistors 1840, 1850 may be simply deleted from the configurations shown in FIG. 25. In FIG. 25, the largeness of the current is controlled by adjusting the gate voltage applied to the transistors 1830, 1840 and 1850 from the exterior via the terminal f. It should be noted that at this time, when it is designed by making W/L values of the transistors 1830, 1840 and 1850 into the ratio of 1:2:4, the ratio of the ON-state current becomes 1:2:4.

Figure 26A:
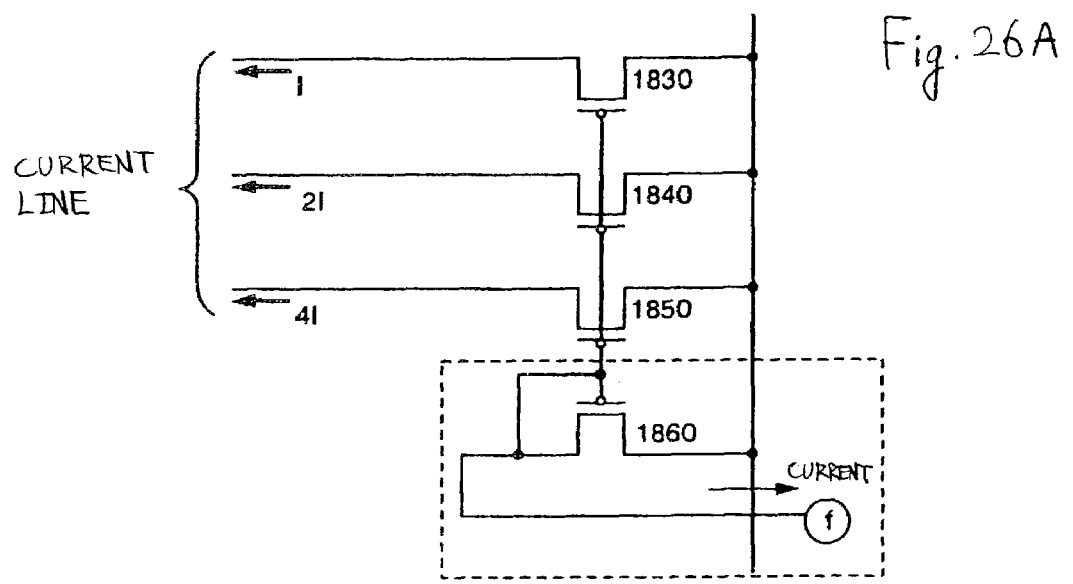
FIG. 26 is a circuit diagram of a reference constant current source.

Next, in FIG. 26A, the case where the current is supplied from the terminal f is illustrated. As shown in FIG. 25, in the case where it is adjusted by applying the voltage to the gate, the current value of the transistor may vary by the temperature characteristics or the like. However, as in FIG. 26A, when it is inputted by means of the current, its influence is capable of being suppressed.

It should be noted that in the case of the configurations shown in FIG. 25, FIG. 26A, during the time when the current is passed through the current line, it is necessary to continue to input the voltage or current from the terminal f. However, in the case where it is not necessary to pass the current through the current line, it is not necessary to input the voltage or current from the terminal f.

Figure 26B:
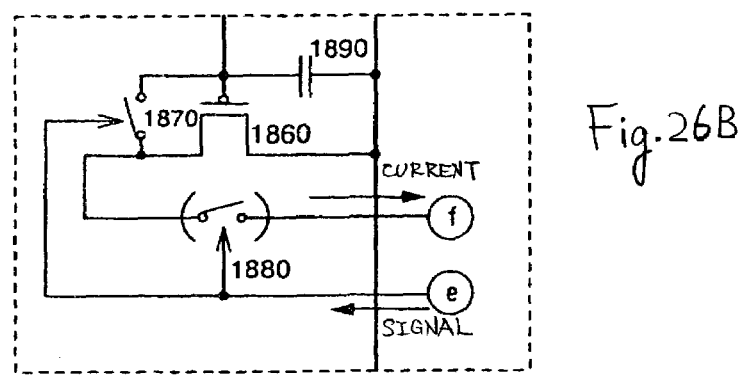

Moreover, as shown in FIG. 26B, switches 1870, 1880, and a capacity element 1890 may be added to the configuration of FIG. 26A. Then, even when the current is supplied to the current line, it is possible to stop the supply (supply of the current or voltage inputted from the terminal f) from the IC for reference, the consuming power becomes smaller. It should be noted that in FIG. 25, FIG. 26, it has shared the information with the other transistor for current source disposed at the constant current source for reference. Specifically, the gates of transistors 1830, 1840 and 1850 were connected to each other.

Hence, in FIG. 27, the case where the setting operation is carried out to the respective current source circuits is shown. In FIG. 27, the current is inputted from the terminal f, and the timing is controlled by the signal supplied from the terminal e. It should be noted that the circuit shown in FIG. 27 is an example to which the circuit of FIG. 6A is applied. Therefore, the setting operation and the input operation are not carried out at the same time. Therefore, in the case of this circuit, it is necessary that the setting operation with respect to the constant current source for reference is carried out at the timing when the current is not required to pass the current through the current line.

Figure 28:
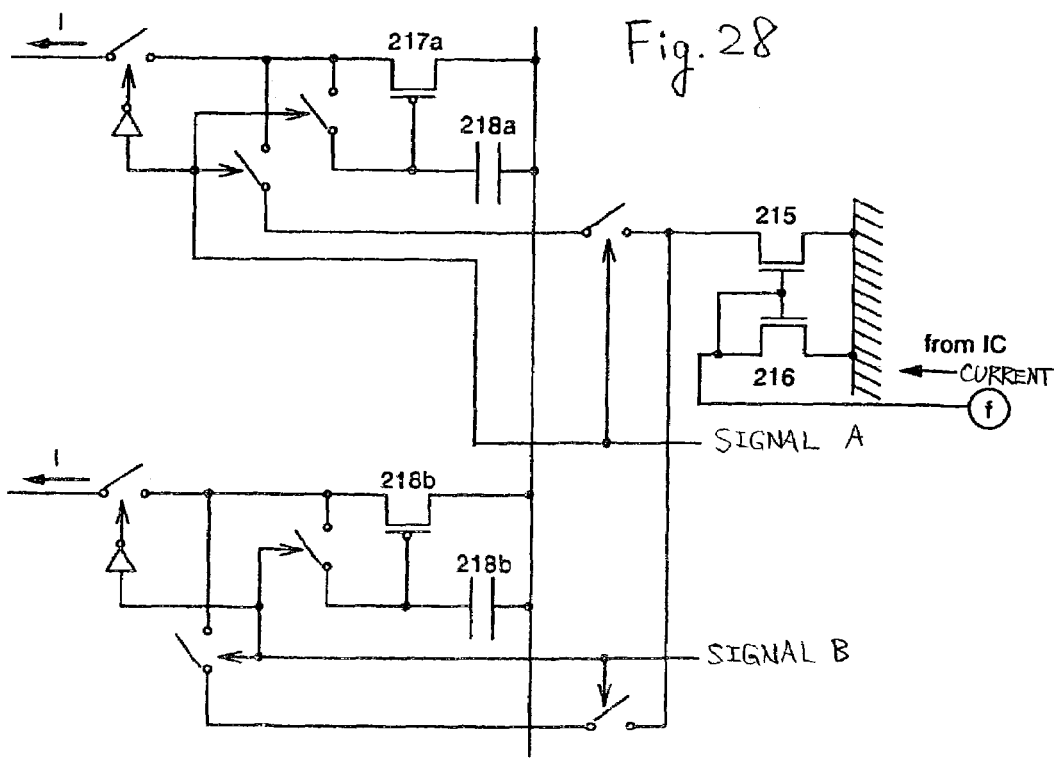
FIG. 28 is a circuit diagram of a reference constant current source.

In FIG. 28, an example of the constant current source for reference 109 which has been polyphased is shown. Specifically, it corresponds to the current source for reference 109 to which the configuration shown in FIG. 39 is applied. In the case of being polyphased, the circuits of FIG. 25, FIG. 26 and FIG. 27 may be applied. However, since the current values supplied to the current lines are the same, as shown in FIG. 28, when the setting operation is carried out with respect to the respective current source circuits using one current, the number of currents inputted from the exterior can be reduced.

It should be noted that the present Embodiment is capable of being optionally combined with Embodiments 1–5.

Embodiment 7

In the above embodiments, primarily, the case where the signal current control switch exist has been described. In this embodiment, a description will be made of a case where the signal current control switch is not provided, that is, a case where a current (constant current) disproportional to a video signal is supplied to a wiring different from a signal line. In this case, the switch 101 (signal current control switch) does not need to be disposed.

Note that the case where the signal current control switch does not exist is similar to the case where the signal current control switch exists, except for the absence of the signal current control switch. Thus, the case will be briefly described, and descriptions of the similar portions will be omitted here.

Figure 29:
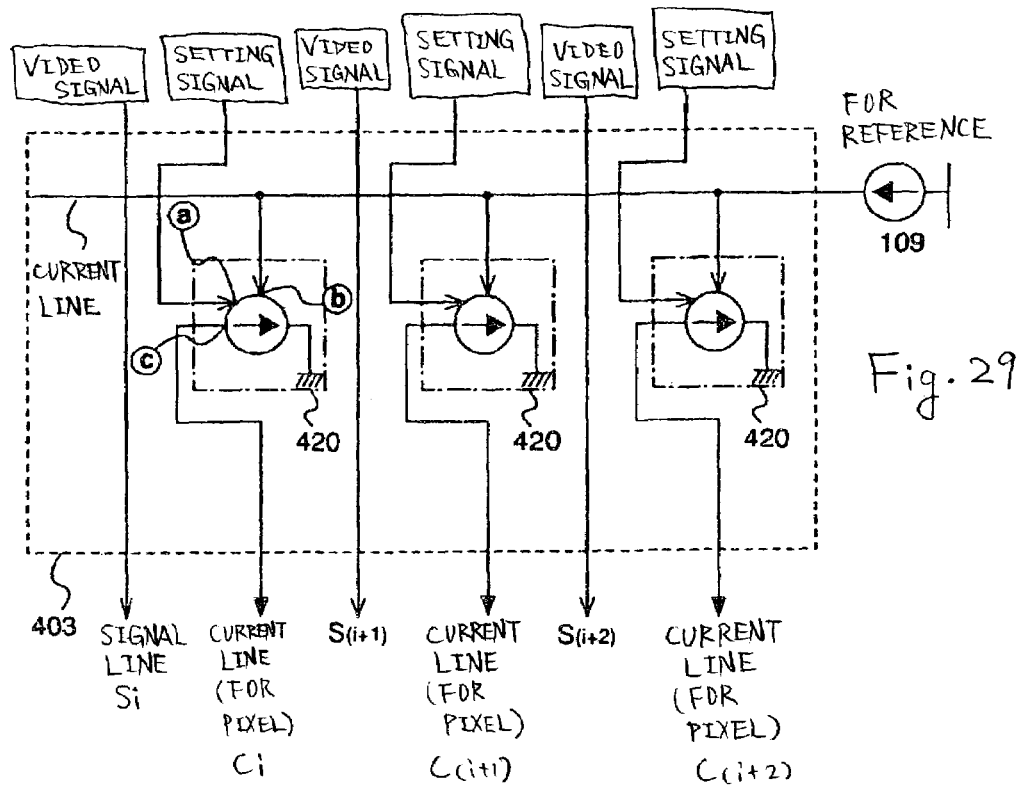
FIG. 29 is a view of a signal line driver circuit.
Figure 30:
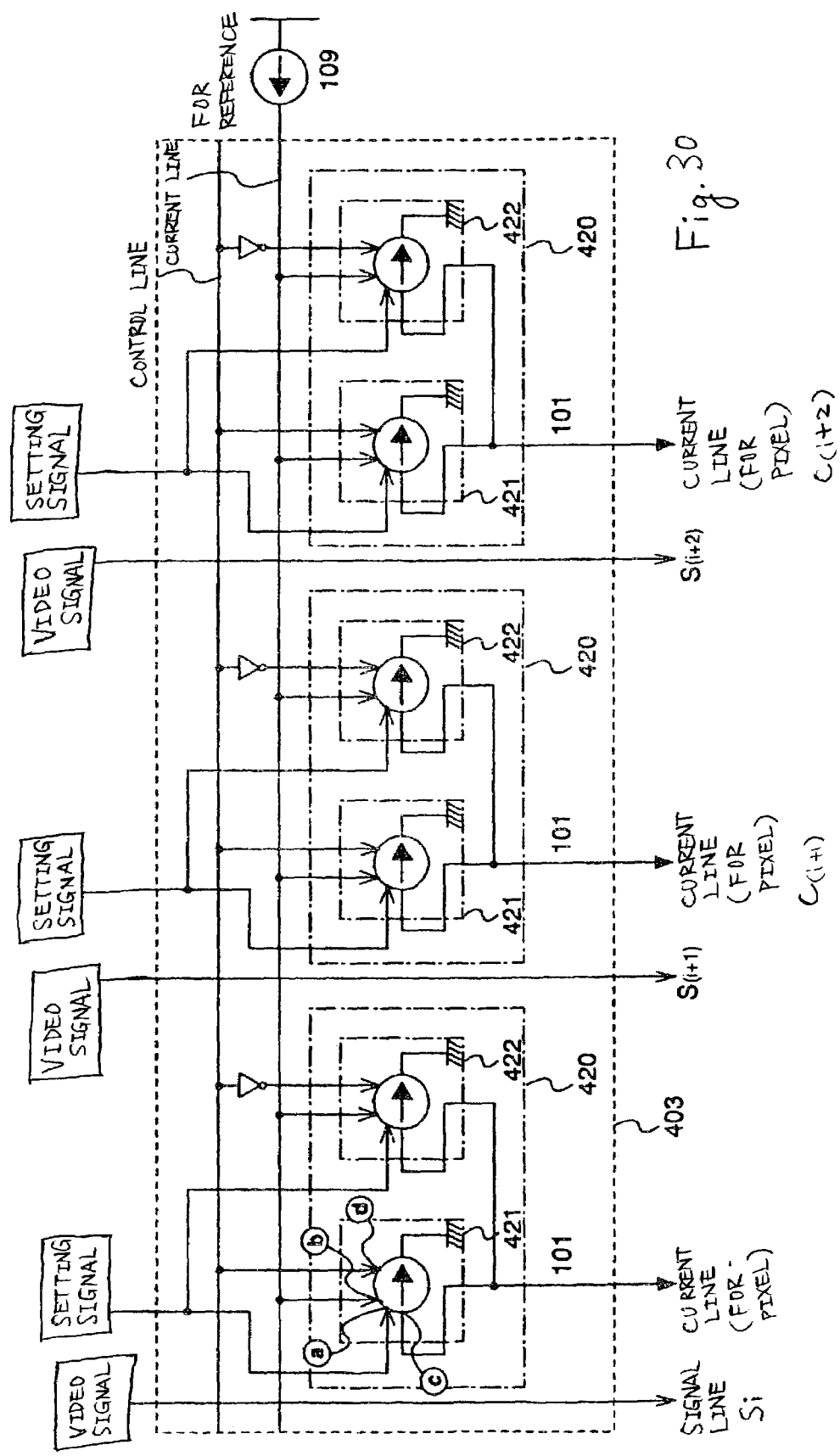
FIG. 30 is a view of a signal line driver circuit.
Figure 49A:
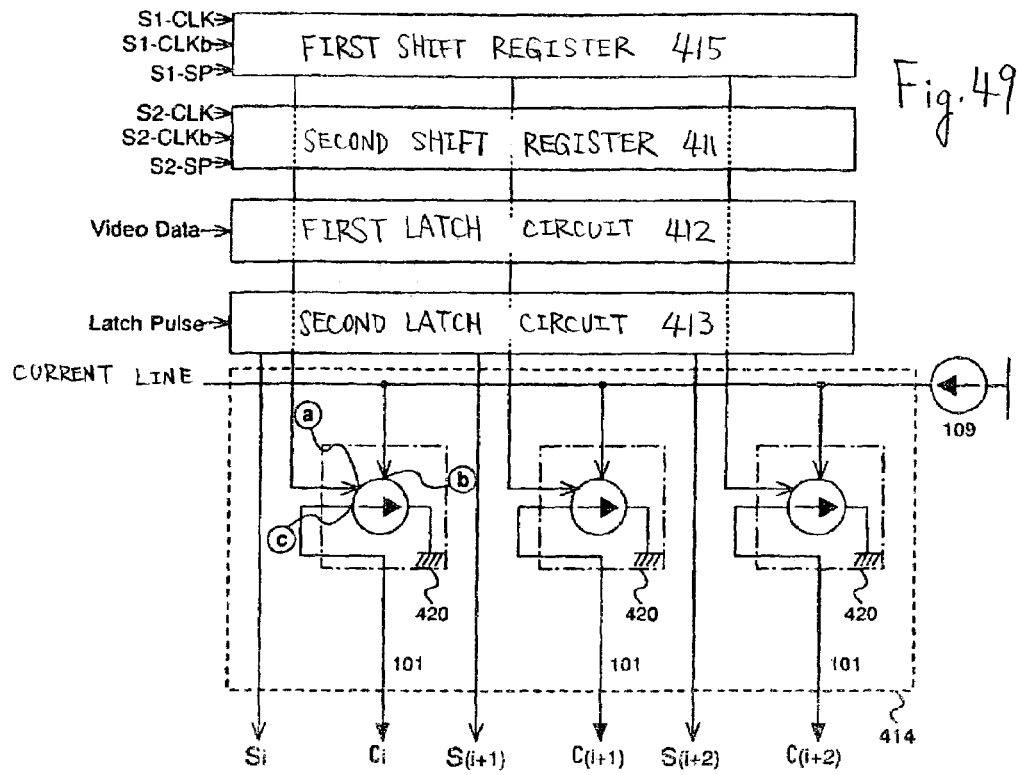
FIG. 49 is a view of a signal line driver circuit.

For comparison with the case where the signal current control switch is disposed, FIG. 29 shows a structure corresponding to FIG. 1, and FIG. 30 shows a structure corresponding to FIG. 2. FIG. 49(A) shows a structure corresponding to FIG. 3(B). According to the structures shown in FIGS. 1, 2, and 3B, the signal current control switch is controlled by the video signal to output the current to the signal line. In the structure shown in FIGS. 29, 30, and 49A, however, the current is output to a pixel current line, and the video signal is output to the signal line.

Figure 49B:
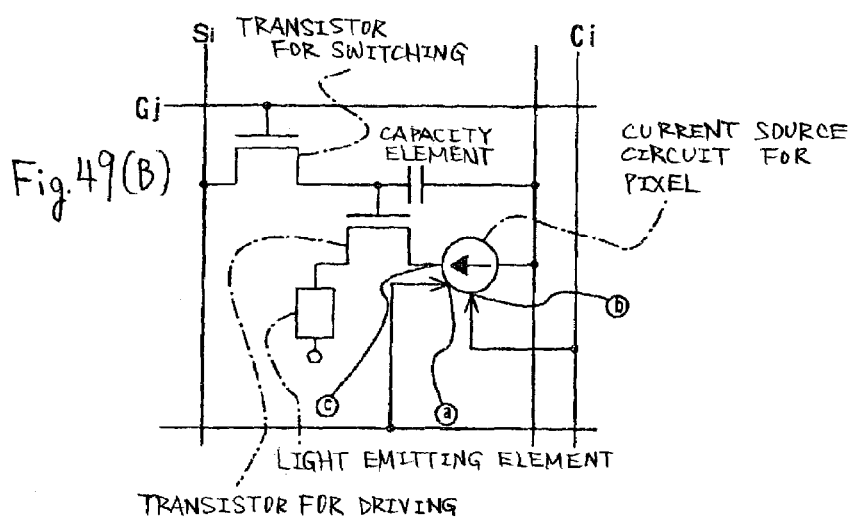

A schematic view of the pixel structure in the above case is shown in FIG. 49(B). Next, a pixel operating method will be briefly described. First, when a switching transistor is ON, a video signal is passed through a signal line, is input to a pixel, and is then stored into a capacitor device. A driving transistor is turned ON or OFF depending on the value of the video signal. On the other hand, a current source circuit has a capability of flowing a constant current. Hence, when the driving transistor is ON, the constant current flows to a light emitting device, and the light emitting device emits light. When the driving transistor is OFF, since no current flows to the light emitting device, the light emitting device does not emit light. In this manner, an image is displayed. In this case, however, only two states, namely, emission or non-emission, can be displayed. For this reason, multi-gradation is implemented using, for example, a time gradation method and area gradation method.

Note that, for the portion of the current source circuit, any one of circuits of, for example, FIGS. 6 to 8, and 31 to 35 is used. The setting operation may be performed to enable the current source circuit to be flown with a constant current. When performing the setting operation for the current source circuit of the pixel, the operation is performed by inputting the current through a pixel current line. The setting operation for the current source circuit of the pixel may be performed an arbitrary number of times at arbitrary time and an arbitrary timing. The setting operation for the current source circuit of the pixel can be performed completely independent of an operation for displaying an image. Preferably, the setting operation is performed when charge stored in the capacitor device provided in the current source circuit leaks.

Figure 50:
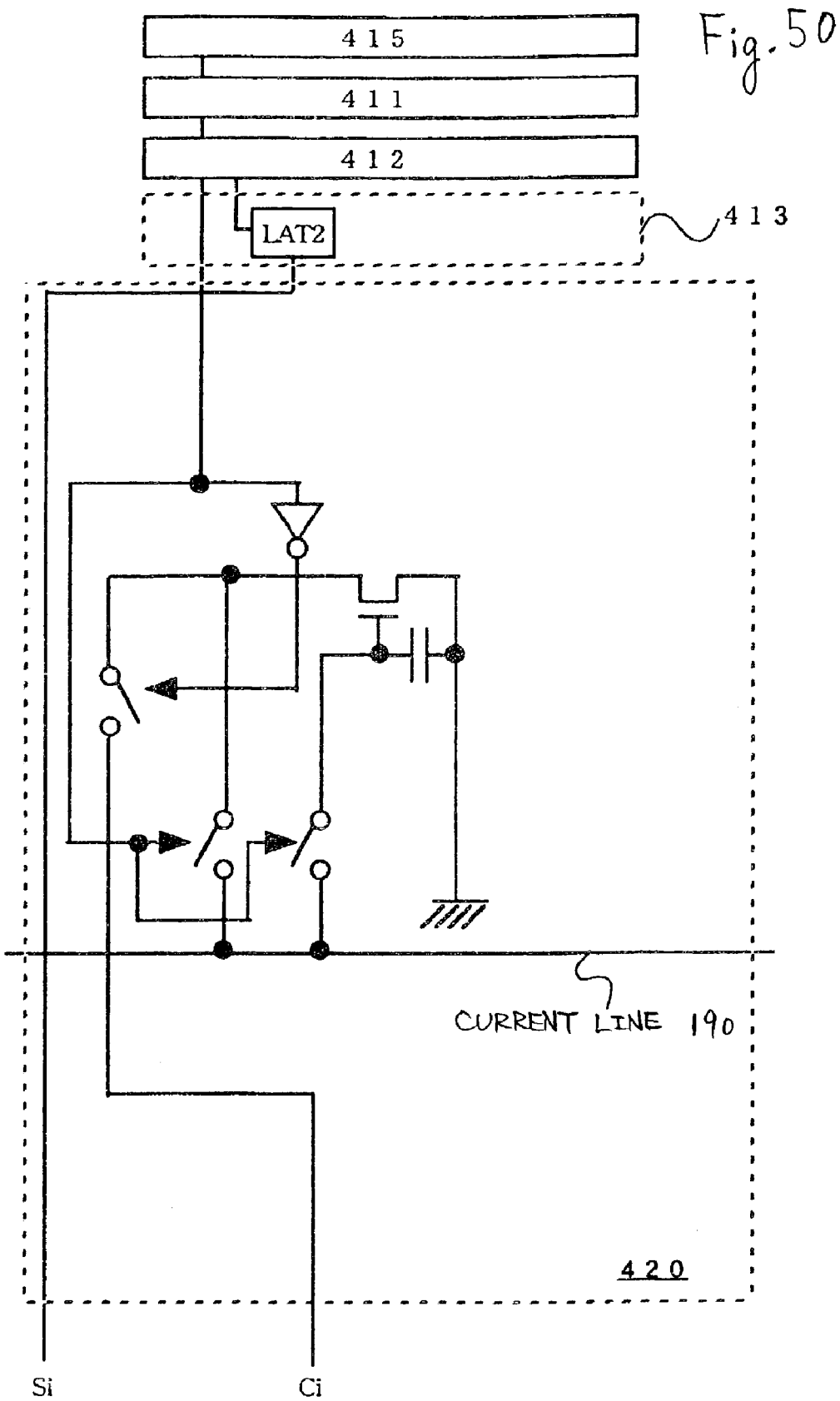
FIG. 50 is a view of a signal line driver circuit.
Figure 51:
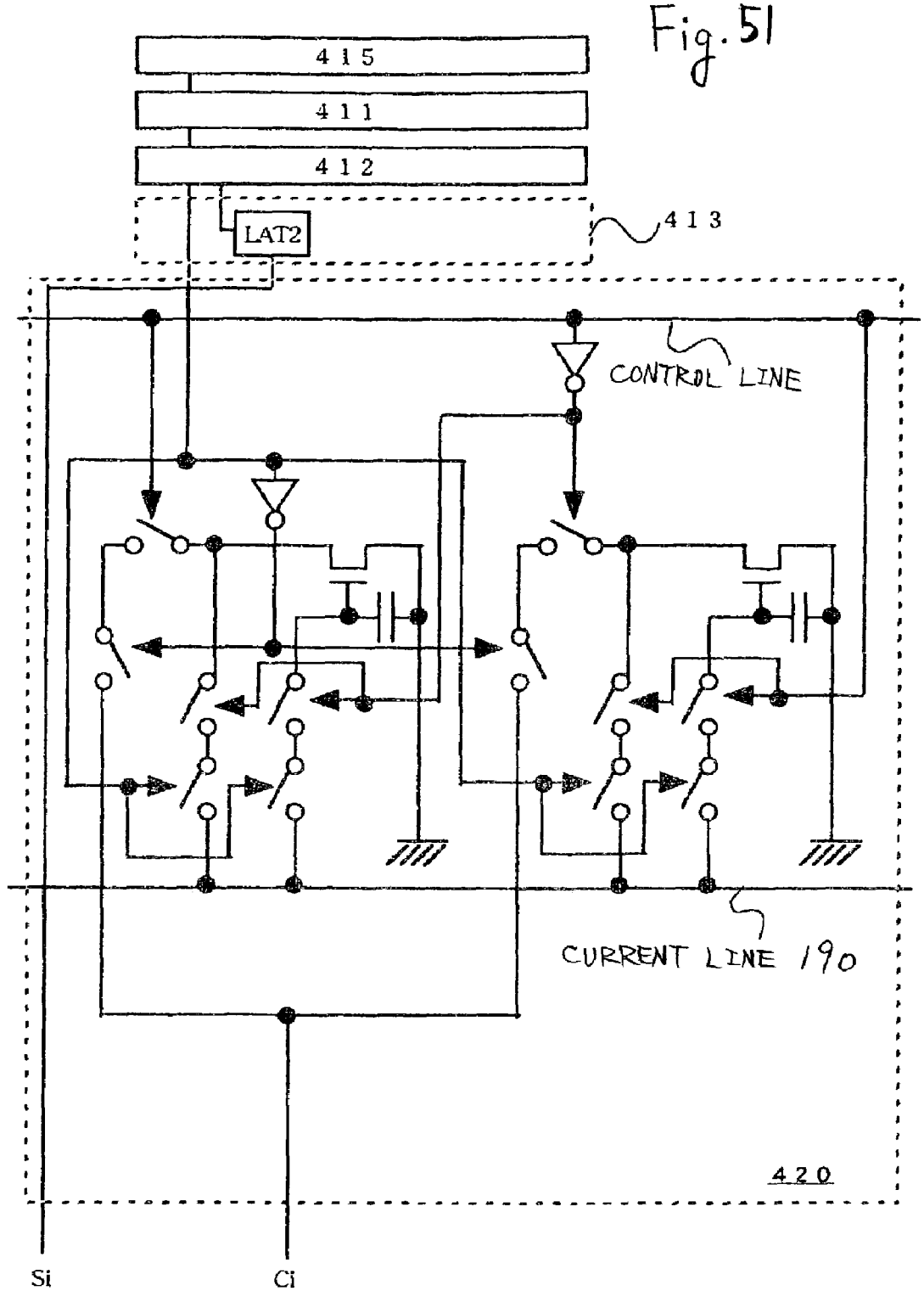
FIG. 51 is a view of a signal line driver circuit.

Next, the detailed structure of a constant current circuit 414 of FIG. 49(A) is shown in FIG. 50. Shown in FIG. 50 is the circuit in the case where FIG. 6(A) is applied to the portion of a current source circuit. In addition, a case is considered in which FIG. 30 is applied to the portion of the current source circuit of FIG. 49(A). The detailed structure of the constant current circuit 414 in the above case is shown in FIG. 51. Here, FIG. 51 shows a circuit in the case where FIG. 6(A) is applied to the portion of the current source circuit. In the structure shown in FIG. 51, the setting operation is performed for one of the current sources by controlling a control line, and the input operation can be simultaneously performed with the other current source.

Note that the case where the signal current control switch does not exist is similar to the case where the signal current control switch exists, except for the absence of the signal current control switch. Thus, a detailed description thereof will be omitted.

This embodiment maybe arbitrarily combined with Embodiments 1 to 6.

Embodiment 8

Figure 52A:
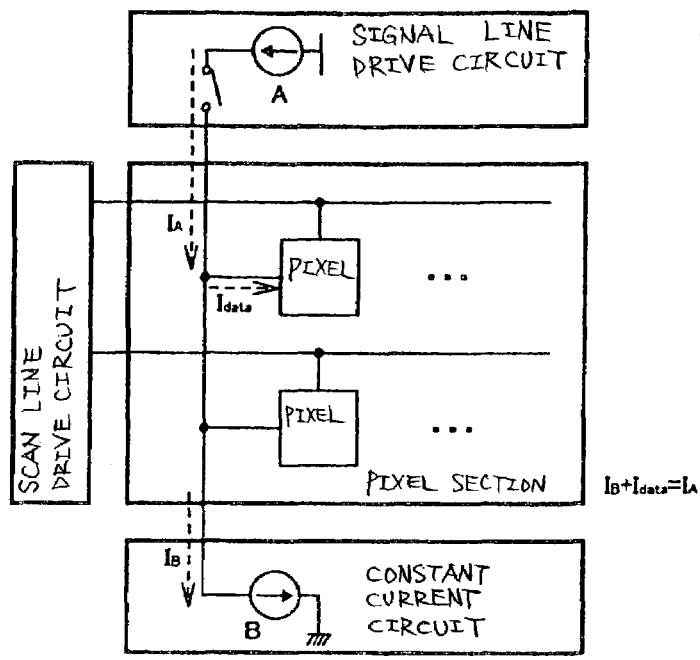
FIG. 52 is views of a light emitting device.

The present Embodiment of the present invention will be described below with reference to FIG. 52. In FIG. 52A, the signal line drive circuit is disposed above the pixel section, the constant current circuit is disposed below the pixel section, the current source A is disposed in the foregoing signal line drive circuit, and the current source B is disposed in the constant current circuit. Supposing that the currents supplied form the current sources A, B are IA, IB, and the signal current supplied to the pixel is I data, the equation IA=IB+I data is held. Then, when the signal current is written into the pixel, it is set so that the current is supplied from both the current sources A and B. At this time, when IA and IB are enlarged, thereby capable of accelerating the writing speed of the signal current with respect to the pixel.

At this time, the setting operation of the current source B is carried out using the current source A. The current that the current of the current source B has subtracted from the current of the current source A flows through the pixel. Therefore, a variety of influences such as noise or the like can be reduced by carrying out the setting operation of the current source B using the current source A.

Figure 52B:
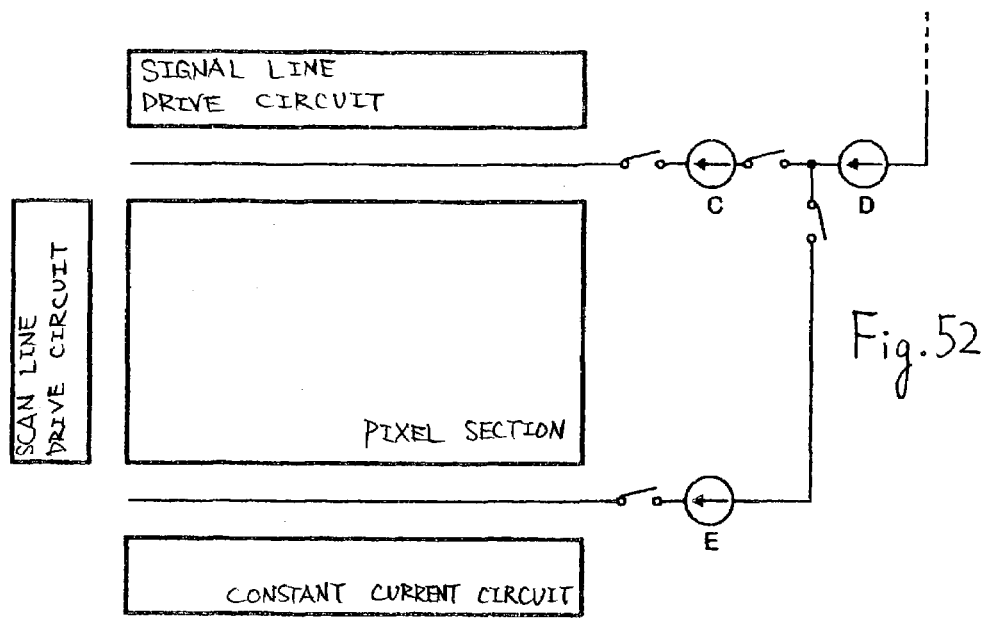

In FIG. 52B, the constant current source for reference (hereinafter, referred to as constant current source) C, E is disposed above and below the pixel section. Then, the setting operation of the current source circuit disposed in the signal line drive circuit and constant current circuit is carried out using the current sources C, E. The current source D corresponds to the current source setting the current sources C, E, and the current for reference is supplied from the exterior.

It should be noted that in FIG. 52B, the constant current circuit disposed below the pixel section may be made a signal line drive circuit, thereby capable of disposing the signal line drive circuits at both above and below. Then, each of them takes charge of control of the upper portion and lower portion of the screen (the whole of the pixel section) in half. By doing it in this way, the pixels can be controlled by two lines simultaneously. Therefore, it is possible that it takes a long time to carry out the setting operation (signal input operation) to the current source of the signal line drive circuit, the pixel, the current source of the pixel and the like. Therefore, the setting is capable of being more precisely carried out.

The present Embodiment is capable of being optionally combined with Embodiments 1–7.

EXAMPLE 1

In this example, the time gradation method will be described in detail by using FIG. 14. In display devices such as liquid crystal display devices and light emitting devices, a frame frequency is normally about 60 Hz. That is, as shown in FIG. 14(A), screen rendering is performed about 60 times per second. This enables flickers (flickering of a screen) not to be recognized by the human eye. At this time, a period during which screen rendering is performed once is called one frame period.

As an example, in this example, a description will be made of a time gradation method disclosed in the publication as Patent Document 1. In the time gradation method, one frame period is divided into a plurality of subframe periods. In many cases, the number of divisions at this time is identical to the number of gradation bits. For the sake of a simple description, a case where the number of divisions is identical to the number of gradation bits is shown. Specifically, since the 3-bit gradation is employed in this example, an example is shown in which one frame period is divided into three subframe periods SF1 to SF3 (FIG. 14(B)).

Each of the subframe periods includes an address (writing) period Ta and a sustain (light emission) period (Ts). The address period is a period during which a video signal is written to a pixel, and the length thereof is the same among respective subframe periods. The sustain period is a period during which the light emitting device emits light or does not emit light in response to the video signal written in the address period. At this time, the sustain periods Ts1 to Ts3 are set at a length ratio of Ts1:Ts2:Ts3=4:2:1. More specifically, the length ratio of n sustain periods is set to $2^{(n-1)}:2^{(n-2)}: \ldots :2^1:2^0$. Depending on which one of the sustain periods a light emitting device performs emission or non-emission in, the length of the period during which each pixel emits light in one frame period is determined, and the gradation representation is thus performed.

Figure 16A:
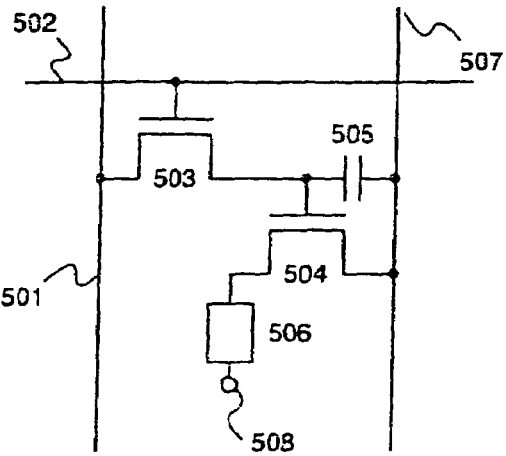
FIG. 16 is circuit diagrams of pixels of a light emitting device.
Figure 16B:
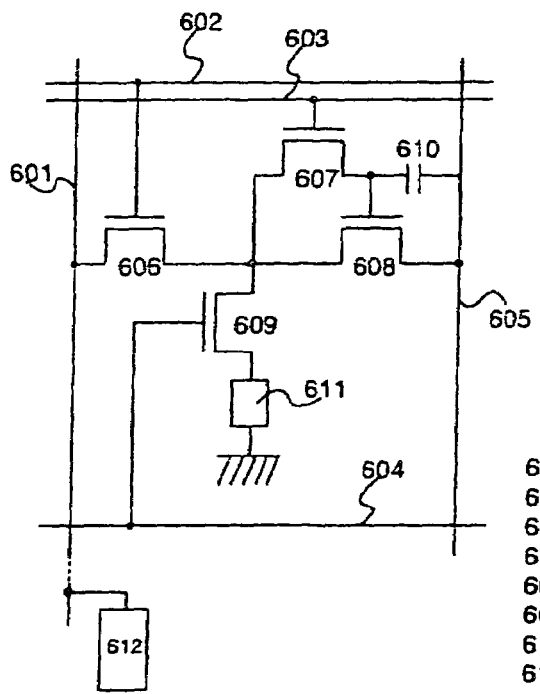
Figure 18A:
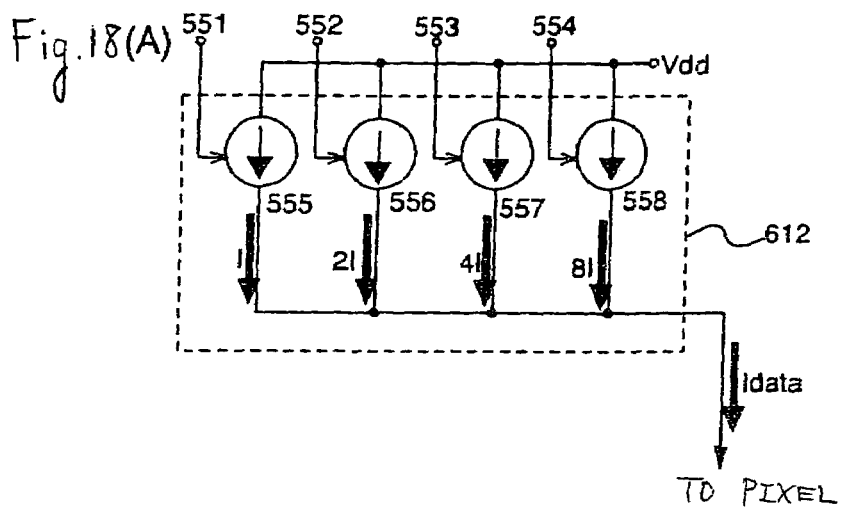
FIG. 18 is views of a current source circuit.
Figure 18B:
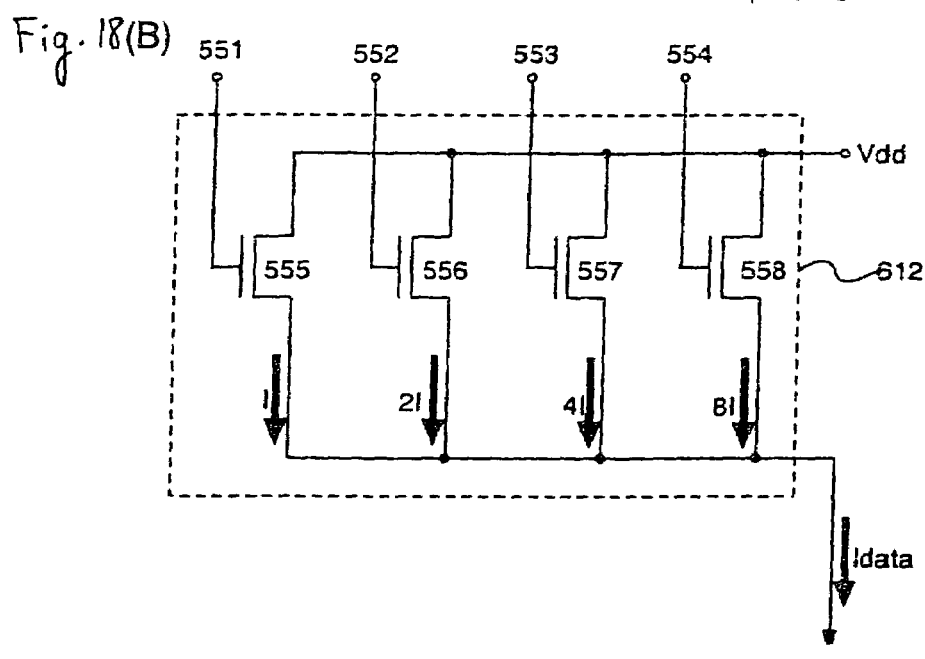

Next, a specific operation of a pixel employing the time gradation method will be described. In this example, a description thereof will be made referring to the pixel shown in FIG. 16(B). A current input method is applied to the pixel shown in FIG. 16(B).

First, the following operation is performed during the address period Ta. A first scanning line 602 and a second scanning line 603 are selected, and TFTs 606 and 607 are turned ON. A current flowing through a signal line 601 at this time is used as a signal current $I_{data}$. Then, when a predetermined charge has been accumulated in a capacitor device 610, selection of the first scanning line 602 and the second scanning line 603 is terminated, and the TFTs 606 and 607 are turned OFF.

Subsequently, the following operation is performed in the sustain period Ts. A third scanning line 604 is selected, and a TFT 609 is turned ON. Since the predetermined charge that has been written is stored in the capacitor device 610, the TFT 608 is already turned ON, and a current identical with the signal current $I_{data}$ flows thereto from a current line 605. Thus, a light emitting device 611 emits light.

The operations described above are performed in each subframe period, thereby forming one frame period. According to this method, the number of divisions for subframe periods may be increased to increase the number of display gradations. Also, the order of the subframe periods does not necessarily need to be the order from an upper bit to a lower bit as shown in FIGS. 14(B) and 14(C), and the subframe periods may be disposed at random within one frame period. In addition, the order may be variable within each frame period.

Further, a subframe period SF2 of an m-th scanning line is shown in FIG. 14(D). As shown in FIG. 14(D), in the pixel, upon termination of an address period Ta2, a sustain period Ts2 is immediately started.

Next, the portion related to the current source circuit of the signal driver circuit, especially a driving method of the portion related to the setting operation will be described.

Note that it is described in the above embodiments that the current source circuit has the method in which a setting operation and an input operation can be simultaneously performed and the method in which these operations cannot be simultaneously performed.

In the former current source circuit capable of simultaneously performing the setting operation and the input operation, the timing of conducting each operation is not particularly limited. This is also the same in the case where a plurality of current source circuits are arranged in one column as shown in FIG. 2, FIG. 44, or the like. However, in the latter current source circuit not capable of simultaneously performing the setting operation and the input operation, the timing of conducting the setting operation needs to be devised. In the case of adopting the time gradation method, the setting operation needs to be performed while the output operation is not performed. For example, in the case of the structure of the driver portion of FIG. 1 and the pixel with the structure of FIG. 16(B), the setting operation needs to be conducted in the period except the address period Ta in any scanning line in a pixel portion. Further, in the case of the structure of the driver portion of FIG. 30 and the pixel with the structure of FIG. 49(B), the setting operation of the current source circuit arranged in the driver portion needs to be conducted in the period during which the setting operation is not conducted for the current source circuit arranged in the pixel.

Note that, at this time, a frequency of a shift register that controls the current source circuit may be set at a low speed in some cases. Thus, the setting operation of the current source circuit can be performed for an enough time with accuracy.

Alternatively, the setting operation of the current source circuit may be performed at random by using the circuit shown in FIGS. 37 to 39 or the like as the circuit (the first shift register) for controlling the current source circuit. Then, even if the periods during which the setting operation can be performed are dotted about one frame, the periods are effectively utilized, thereby being capable of performing the setting operation. Further, it may be such that the setting operation for all the current source circuits is not conducted in one frame period but conducted in several frame periods or more. From the above, the setting operation of the current source circuit can be performed for an enough time with accuracy.

In the present invention, independent operations of the first shift register and the second shift register can be fully conducted by means of providing the first shift register that controls the current source circuit 420 and the second shift register that controls the image display circuit. The second shift register is used when the input operation is performed, and the first shift register is used when the setting operation is performed. Then, the first shift register can be operated at a low speed while the second shift register is operated at a high speed. Accordingly, it is possible that the setting of the current source circuit 420 spend as much as time as it is conducted precisely. Note that in the case of the structure of the driver portion of FIG. 1 and the pixel with the structure of FIG. 16(B), the input operation may be conducted in the period during which the scanning line in the pixel portion is selected (address period Ta). Further, in the case of the structure of the driver portion of FIG. 1 and the pixel with the structure of FIG. 49(B), the setting operation of the current source circuit arranged in the driver portion may be conducted in the period during which the setting operation is not conducted for the current source circuit arranged in the pixel.

This example can be arbitrarily combined with Examples 1 to 8.

EXAMPLE 2

In the present Example, an example of the configuration of the circuit of the pixel provided in the pixel section will be described below with respect to FIG. 13 and FIG. 53.

It should be noted that if the pixel has the configuration including the portion into which the current is inputted, it can be applied to any kind of pixel configurations.

The pixel of FIG. 13A has a signal line 1101, a first and second scan lines 1102, 1103, a current line (electric source line) 1104, a TFT for switching 1105, a TFT for maintaining 1106, a TFT for driving 1107, a TFT for converting and driving 1108, a capacity element 1109 and a light emitting device 1110. The signal line 1101 is connected to the current source circuit 1111.

It should be noted that the current source circuit 1111 corresponds to the current source circuit 420 disposed in the signal line drive circuit 403.

As for the pixel of FIG. 13A, the gate electrode of the TFT for switching 1105 is connected to the first scan line 1102, the first electrode is connected to the signal line 1101, the second electrode is connected to the first electrode of the TFT for driving 1107, and the first electrode of the TFT for converting and driving 1108. The gate electrode of the TFT for maintaining 1106 is connected to the second scan line 1103, the first electrode is connected to the signal line 1102, and the second electrode is connected to the gate electrode of the TFT for driving 1107 and the gate electrode of the TFT for converting and driving 1108. The second electrode of the TFT for driving 1107 is connected to the current line (electric source line) 1104, the second electrode of the TFT for converting and driving 1108 is connected to one of the electrodes of the light emitting device 1110. The capacity element 1109 is connected between the gate electrode and the second electrode of the TFT for converting and driving 1108, and maintains the voltage between the gate/source of the TFT for converting and driving 1108. The predetermined potentials are inputted to the current line (electric source line) 1104 and the other electrode of the light emitting device 1110, respectively, and each has a potential different from each other.

It should be noted that the case of the pixel of FIG. 13A corresponds to the case where the circuit of FIG. 33B is applied to the pixel. However, since the directions that the currents flow are different, the polarities of the transistor are contrary. The TFT for driving 1107 of FIG. 13A corresponds to the TFT 126 of FIG. 33B, the TFT for converting and driving 1108 of FIG. 13A corresponds to the TFT 122 of FIG. 33B and the TFT for maintaining 1106 of FIG. 13A corresponds to the TFT 124 of FIG. 33B.

The pixel of FIG. 13B has a signal line 1151, a first and second scan lines 1142, 1143, a current line (electric source line) 1144, a TFT for switching 1145, a TFT for maintaining 1146, a TFT for converting and driving 1147 a TFT for driving 1148, a capacity element 1149 and a light emitting device 1140. The signal line 1151 is connected to the current source circuit 1141.

It should be noted that the current source circuit 1141 corresponds to the current source circuit 420 disposed in the signal line drive circuit 403.

As for the pixel of FIG. 13B, the gate electrode of the TFT for switching 1145 is connected to the first scan line 1142, the first electrode is connected to the signal line 1151, the second electrode is connected to the first electrode of the TFT for driving 1148, and the first electrode of the TFT for converting and driving 1148. The gate electrode of the TFT for maintaining 1146 is connected to the second scan line 1143, the first electrode is connected to the first electrode of the TFT for driving 1148, and the second electrode is connected to the gate electrode of the TFT for driving 1148 and the gate electrode of the TFT for converting and driving 1147. The second electrode of the TFT for converting and driving 1147 is connected to the current line (electric source line) 1144, the second electrode of the TFT for converting and driving 1147 is connected to one of the electrodes of the light emitting device 1140. The capacity element 1149 is connected between the gate electrode and the second electrode of the TFT for converting and driving 1147, and maintains the voltage between the gate/source of the TFT for converting and driving 1147. The predetermined potentials are inputted to the current line (electric source line) 1144 and the other electrode of the light emitting device 1140, respectively, and each has a potential different from each other.

It should be noted that the case of the pixel of FIG. 13B corresponds to the case where the circuit of FIG. 6B is applied to the pixel. However, since the directions that the currents flow are different, the polarities of the transistor are contrary. The TFT for converting and driving 1147 of FIG. 13B corresponds to the TFT 122 of FIG. 6B, the TFT for driving 1148 of FIG. 13B corresponds to the TFT 126 of FIG. 6B and the TFT for maintaining 1146 of FIG. 13B corresponds to the TFT 124 of FIG. 6B.

The pixel of FIG. 13C has a signal line 1121, a first scan line 1122, a second scan line 1123, a third scan line 1135, a current line (electric source line) 1124, a TFT for switching 1125, a current line for pixel 1138, a TFT for deleting 1126, a TFT for driving 1127, a capacity element 1128, a TFT for current source 1129, a TFT for mirror 1130, capacity element 1131, a TFT for current input 1132, a TFT for maintaining 1133, and a light emitting device 1136. The current line for pixel 1138 is connected to the current source circuit 1137.

As for the pixel of FIG. 13C, the gate electrode of the TFT for switching 1125 is connected to the first scan line 1122, the first electrode of the TFT for switching 1125 is connected to the signal line 1121, the second electrode of the TFT for switching 1125 is connected to the gate electrode of the TFT for driving 1127, and the first electrode of the TFT for deleting 1126. The gate electrode of the TFT for deleting 1126 is connected to the second scan line 1123, the second electrode of the TFT for deleting 1126 is connected to the current line (electric source line) 1124. The first electrode of the TFT for driving 1127 is connected to one of the electrode of the light emitting device 1136, and the second electrode of the TFT for driving 1127 is connected to the first electrode of the TFT for current source 1129. The second electrode of the TFT for current source 1129 is connected to the current line 1124. One of the electrodes of the capacity element 1131 is connected to the gate electrode of the current source TFT 1129 and the gate electrode of the mirror TFT 1130, and the other electrode is connected to the current line (electric source line) 1124. The first electrode of the mirror TFT 1130 is connected to the current line 1124, and the second electrode of the mirror TFT 1130 is connected to the first electrode of the current input TFT 1132. The second electrode of the current input TFT 1132 is connected to the current line (electric source line) 1124, and the gate electrode of the current input TFT 1132 is connected to the third scan line 1135. The gate electrode of the current maintaining TFT 1133 is connected to the third scan line 1135, and the first electrode of the current maintaining TFT 1133 is connected to the current line for pixel 1138, and the second electrode of the current maintaining TFT 1133 is connected to the gate electrode of the current source TFT 1129 and the gate electrode of the mirror TFT 1130. The predetermined potentials are inputted into the current line (electric source line) 1124 and the other electrode of the light emitting device 1136, respectively, and each has a potential different from each other.

It should be noted that the current source circuit 1137 corresponds to the current source circuit 420 disposed in the signal line drive circuit 403.

It should be noted that the case of the pixel of FIG. 13C corresponds to the case where the circuit of FIG. 6E is applied to the pixel of FIG. 49B. However, since the directions that the currents flow are different, the polarities of the transistors are contrary. It should be noted that the TFT for deleting 1126 has been added to the pixel of FIG. 13C. The length of the lighting time period is capable of being controlled by the TFT for deleting 1126.

The TFT for switching 1125 is in charge of controlling the supply of the video signal to the pixel. The TFT for deleting 1126 is in charge of discharging the charge maintained in the capacity element 1131. As for the TFT for driving 1127, the conduction or non-conduction is controlled according to the charge maintained in the capacity element 1131. The current source TFT 1129 and the mirror TFT 1130 form a current mirror circuit. The predetermined potentials are inputted into the other electrode of the current line 1124 and the light emitting device 1136, and each has a potential different from each other.

Specifically, when the TFT for switching 1125 is turned ON, the video signal is inputted into the pixel through the signal line 1121 and stored in capacity element 1128. Then, the TFT for driving 1127 is turned ON or OFF depending on the value of the video signal. Hence, in the case where the TFT for driving 1127 is turned ON, a certain current flows through the light emitting device and the light emitting device emits the light. In the case where the TFT for drive 1127 is turned OFF, the current does not flow through the light emitting device, and the light emitting device does not emit the light. In this way, an image is displayed.

It should be noted that the current source circuit of FIG. 13C is configured with a current source TFT 1129, a mirror TFT 1130, a capacity element 1131, a current input TFT 1132 and a maintaining TFT 1133. The current source circuit has the ability of passing a certain current. Into this current source circuit, the current is inputted through the current line for pixel 1138, and the setting operation is carried out. Therefore, even if the characteristics of the transistors configuring the current source circuit varies, the variation of the largeness of the current supplied from the current source circuit to the light emitting device will not occur. The setting operation to the current source circuit of the pixel can be carried out regardless of the operations of the TFT for switching 1125 and the TFT for driving 1127.

Figure 53A:
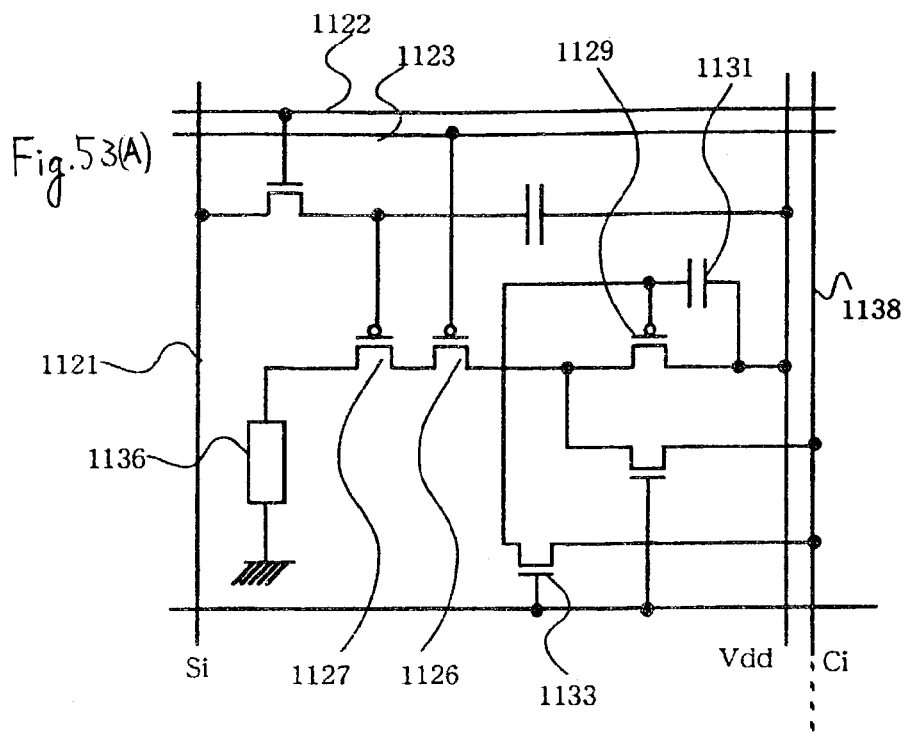
FIG. 53 is circuit diagrams of a pixel of a light emitting device.

The case of the pixel shown in FIG. 53A corresponds to the case where the circuit of FIG. 6A is applied to a pixel of FIG. 49B. However, since the directions that the currents flow are different, the polarities of the transistors are contrary. The pixel shown in FIG. 53A has the current source TFT 1129, the capacity element 1131, the maintaining TFT 1133, the current line for pixel 1138 (Ci) and the like. The current line for pixel 1138 (Ci) is connected to the current source circuit 1137. It should be noted that the current source circuit 1137 corresponds to the current source circuit 420 disposed in the signal line drive circuit 403.

Figure 53B:
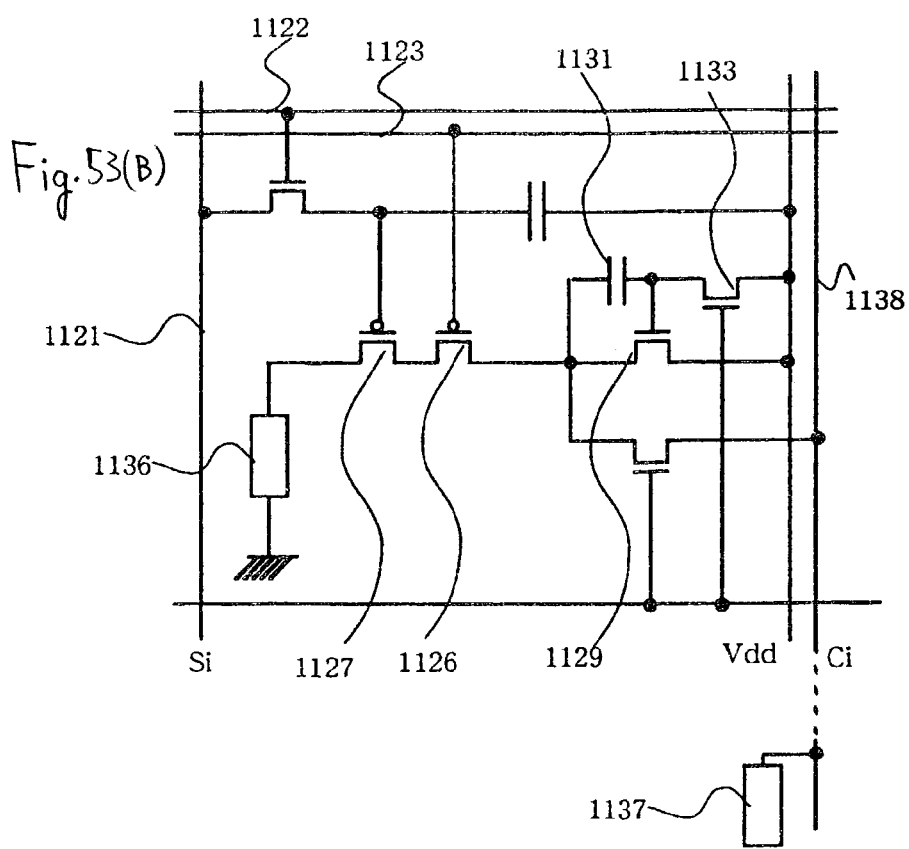

The case of the pixel shown in FIG. 53B corresponds to the case where the circuit of FIG. 7A is applied to a pixel of FIG. 49B. However, since the directions that the currents flow are different, the polarities of the transistors are contrary. The pixel shown in FIG. 53B has the current source TFT 1129, the capacity element 1131, the maintaining TFT 1133, the current line for pixel 1138 (Ci) and the like. The current line for pixel 1138 (Ci) is connected to the current source circuit 1137. It should be noted that the current source circuit 1137 corresponds to the current source circuit 420 disposed in the signal line drive circuit 403.

The polarities of the current source TFT 1129 are different between the pixel shown in FIG. 53A and the pixel shown in FIG. 53B. Then, the connections of the capacity element 1131 and the maintaining TFT 1133 are different due to the fact that the polarities are different. In this way, a variety of pixels having different configurations exist. By the way, the pixels described so far can be largely classified into two types. One of the types is a type in which the current is inputted into the signal line according to the video signal. This corresponds to those of FIG. 13A, FIG. 13B and the like. In this case, the signal line drive circuit has a signal current control switch as shown in FIG. 1 and FIG. 2.

Then, the other type is a type in which a video signal is inputted into the signal line and a constant current having no relation to the video signal is inputted into the current line for pixel, that is, corresponding to the case of the pixel as shown in FIG. 49B. This type corresponds to those of FIG. 13C, FIG. 53A, FIG. 53B and the like. In this case, the signal line drive circuit does not have a signal current control switch as those of FIG. 29 and FIG. 30 does not.

Subsequently, a method of driving according to the respective pixel types will be described with reference to a timing chart. First, the case where the digital tone and the time tone are combined will be described below. However, this is changed depending upon the types of the pixels and the configurations of the signal line drive circuits. Specifically, as already described, in the case where the setting operation of the signal line drive circuit to the current source circuit is carried out at the same time with the input operation, the timing of the setting operation of the signal line drive circuit to the current source circuit is not particularly limited. Hence, a method of driving in the case where the timing of the setting operation of the signal line drive circuit to the current source circuit and the input operation cannot be carried out simultaneously will be described below with reference to the timing chart.

Figure 54:
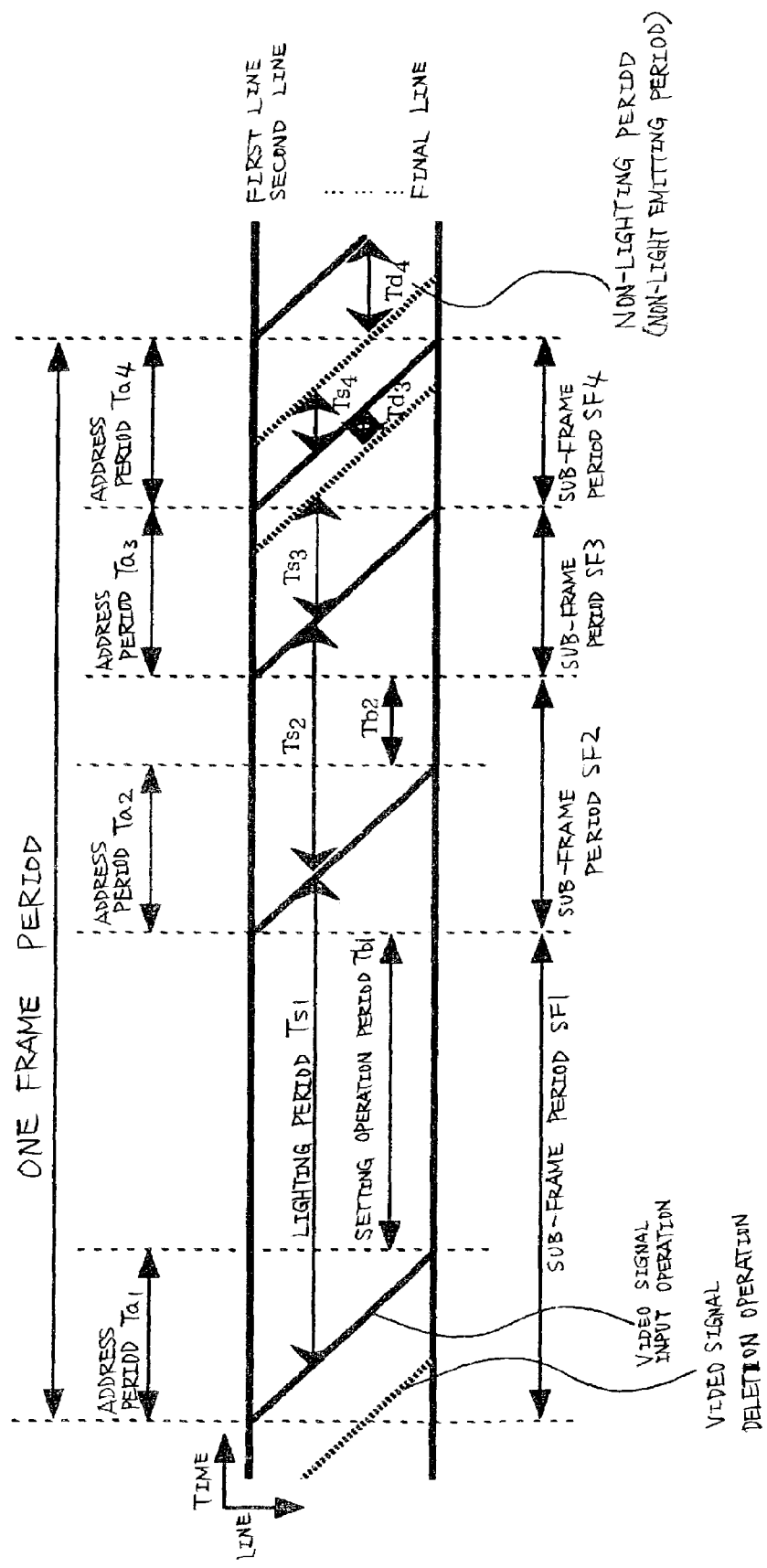
FIG. 54 is a timing chart.

First, the case of the pixel type in which the current is inputted into the signal line according to the video signal will be described below. Suppose that the pixel is that of FIG. 13A or FIG. 13B. Suppose that the signal line drive circuit has the configuration of FIG. 3B. The timing chart of this time is shown in FIG. 54.

Defining that tones of 4 bits are expressed, and for simplifying it, suppose that the number of sub-frames is made 4. First, the first sub-frame period SF1 is initiated. The scan line (first scan line 1102 shown in FIG. 13A, or first scan line 1132 shown in FIG. 13B) is selected line by line, the current is inputted from the signal line (reference numeral 1101 shown in FIG. 13A or reference numeral 1131 shown in FIG. 13B). This current is the value according to the video signal. Then, when the lighting period Ts1 is terminated, the next sub-frame period SF2 is initiated, it is made scan the same as SF1. Subsequently, the next sub-frame period SF3 is initiated, and it is made scan the same as SF2. However, since the length of the lighting period Ts3 is shorter than the length Ta3 of the address period, forcibly making it not emit. Specifically, the inputted video signal is deleted. Or, it is made not pass the current through the light emitting device. In order to delete, the second scan line (the second scan line 1103 shown in FIG. 13A or the second scan line 1133 shown in FIG. 13B) is selected line by line. Then, the video signal is deleted and the light emitting device is made in a non-light emitting state. Subsequently, the next sub-frame SF4 is initiated. Here, it is also made scan the same as SF3, and similarly it is made in a non-light emitting state.

Hereinbefore, an image display operation, that is, the timing chart concerning with the operation of the pixel has been described. Next, the timing of the setting operation of the current source circuit disposed in the signal line drive circuit will be described below. As for the current source circuit described here, it is defined that the setting operation and the input operation cannot be carried out at the same time. The input operation of the current source circuit disposed in the signal line drive circuit is carried out during the address periods (Ta1, Ta2 and the like) in the respective sub-frame periods. Therefore, the setting operation of the current source circuit disposed in the signal line drive circuit may be carried out during the time except for the address periods. Hence, as shown in FIG. 54, during the setting operation periods Tb1, Tb2 as the time except for the address period, the setting operation of the current source circuit disposed in the signal line drive circuit may be carried out. It should be noted that the setting operation of the current source circuit disposed in the signal line drive circuit might be carried out only during either of Tb1 or Tb2, or the setting operation may be carried out by utilizing both of the periods.

Next, the type of a pixel which inputs a video signal into the signal line and inputs a constant current not relating to the video signal into the current line for pixel will be described below. It is defined that the signal line drive circuit is the configuration of FIG. 49A. It is defined that the pixel is that of FIG. 13C, FIG. 49B, FIG. 53A, FIG. 53B or the like. However, in the case of this pixel configuration, it is necessary to carry out the setting operation with respect to the current source circuit of the pixel, too. Therefore, a method of driving, that is, the timing chart becomes different depending upon whether the setting operation of the current source circuit of the pixel and the input operation are capable of being carried out at the same time or not. First, the case where the setting operation of the current source circuit of the pixel and the input operation can be carried out at the same time, that is to say, a method of driving in the case of the pixel of FIG. 13C is shown in the timing chart of FIG. 55.

First, an image display operation, that is, the operation concerning with a transistor for switching and a transistor for driving of the pixel or the like will be described below. However, since it is almost the same as the case of FIG. 54, it will be briefly described.

First, the first sub-frame period SF1 is initiated. The scan line (first scan line 1122 of FIG. 13C) is selected line by line, and the video signal is inputted from the signal line (reference numeral 1121 in FIG. 13C). This video signal is usually represented by voltage, but it may be represented by current. Then, when the lighting period Ts1 is terminated, the next sub-frame period SF2 is initiated, and it is made scan the same as SF1. Subsequently, the next sub-frame period SF3 is initiated, and it is made scan the same as the prior one. However, since the length of the lighting period Ts3 is shorter than the length of the address period Ta3, forcibly making it not emit. Specifically, the inputted video signal is deleted. Or, it is made not pass the current through the light emitting device. In order to delete, the second scan line (second scan line 1123 in FIG. 13C) is selected line by line. Then, the video signal is deleted, the TFT for driving 1127 becomes in an OFF-state and the light emitting device is made in a non-light emitting state. Subsequently, the next sub-frame SF4 is initiated. Here, it is also made scan the same as the sub-frame period SF3, and similarly it is made in a non-light emitting state.

Next, the setting operation to the current source circuit of the pixel will be described below. In the case of the current source circuit shown in FIG. 13C, the setting operation of the current source circuit of the pixel and the input operation can be carried out at the same time. Therefore, the setting operation of the current source circuit of the pixel may be carried out at any time, that is, may be carried out at an optional timing.

Moreover, the setting operation of the current source circuit disposed in the signal line drive circuit may be carried out during the time except for the period during the setting operation of the current source circuit of the pixel being carried out. Specifically, for example, largely dividing the one frame period into the first and second setting operation periods, in the first setting operation period, the setting operation of the current source circuit of the pixel may be carried out, and in the second setting operation period, the setting operation of the current source circuit of the signal line drive circuit may be carried out.

From the description described above, as far as it is taken care of the fact that both of the setting operation to the current source circuit of the pixel and the setting operation of the current source circuit of the signal line drive circuit cannot be carried out at the same time, these may be carried out at any time. Specifically, in a certain period, the setting operation to the current source circuit of the pixel may be carried out, and in another period, the setting operation of the current source circuit of the signal line drive circuit may be carried out. Here, the setting operation to the current source circuit of the pixel may be carried out at any time. Then, in FIG. 55, a method of driving in the case where the setting operation to the current source circuit of the pixel is carried out in the sub-frame period SF1 and the setting operation of the current source circuit disposed in the signal line drive circuit is carried out during the period except for the sub-frame period SF1 is shown in the timing chart.

Figure 56:
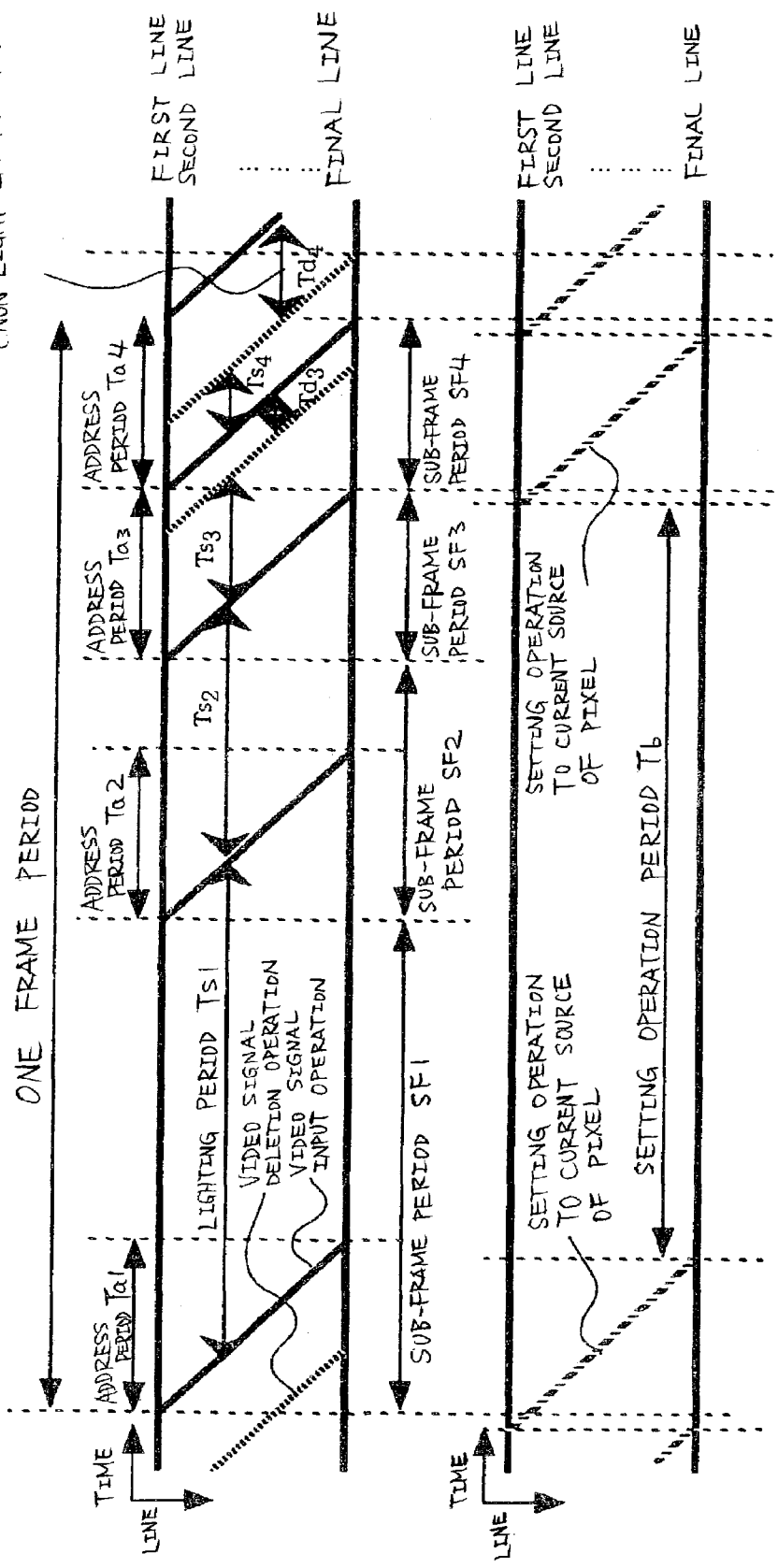
FIG. 56 is a timing chart.

Next, the case where the pixel is the type of a pixel which inputs a video signal to the signal line and inputs a constant current not relating to the video signal into the current line for pixel, and the setting operation of the current source circuit of the pixel and the input operation cannot be carried out at the same time, that is, a timing chart on a method of driving in the case of the pixel shown in FIGS. 53A, 53B is shown in FIG. 56.

Figure 55:
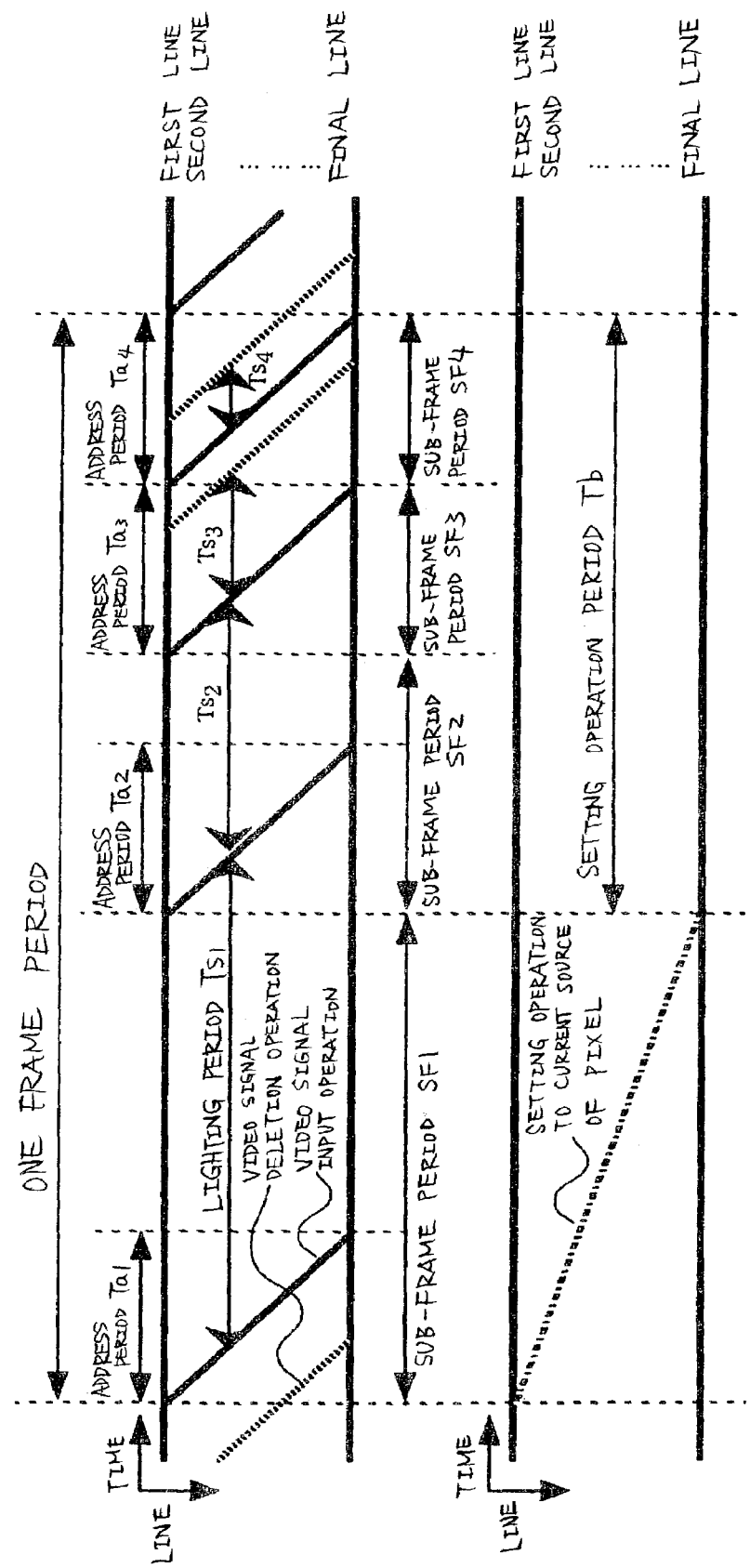
FIG. 55 is a timing chart.

First, an image display operation, that is, the operation concerning with a transistor for switching and a transistor for driving of the pixel or the like will be briefly described below since it is almost the same as the case of FIG. 55.

First, the first sub-frame period SF1 is initiated. The scan line (first scan line 1122 of FIG. 53B) is selected line by line, and the video signal is inputted from the signal line (reference numeral 1121 in FIG. 53A, FIG. 53B). This video signal is usually represented by voltage, but it may be represented by current. Then, when the lighting period Ts1 is terminated, the next sub-frame period SF2 is initiated, and it is made scan the same as in the sub-frame period SF1. Subsequently, the next sub-frame period SF3 is initiated, and it is made scan the same as in the prior period. However, since the length of the lighting period Ts3 is shorter than the length of the address period Ta3, forcibly making it not emit. Specifically, the inputted video signal is deleted. Or, it is made not pass the current through the light emitting device. In order not to pass the current through the light emitting device, the second scan line (second scan line 1123 in FIG. 13C) is made line by line in a non-selection state. Then, the TFT for deleting 1127 becomes in an OFF-state, the pathway where the current flows is cut off and it can be made in a non-light emitting state. Subsequently, the next sub-frame SF4 is initiated. Here, it is also made scan the same as the sub-frame period SF3, and similarly it is made in a non-light emitting state.

Next, the setting operation to the current source circuit of the pixel will be described below. In the cases of FIGS. 53A, 53B, the setting operation of the current source circuit of the pixel and the input operation cannot be carried out at the same time. Therefore, the setting operation of the current source circuit of the pixel may be carried out during the time when the current source circuit of the pixel does not carry out the input operation, that is, it may be carried out during the time when the current does not flow through the light emitting device.

The setting operation of the current source circuit disposed in the signal line drive circuit may be carried out during the time except for the period during the setting operation of the current source circuit of the pixel being carried out. Specifically, for example, largely dividing the one frame period into the first and second setting operation periods, in the first setting operation period, the setting operation of the current source circuit of the pixel may be carried out, and in the second setting operation period, the setting operation of the current source circuit of the signal line drive circuit may be carried out.

From the description described above, the setting operation to the current source circuit of the pixel may be carried out during the non-lighting periods (Td3, Td4), and during the time except for that time, the setting operation of the current source circuit of the signal line drive circuit may be carried out. Then, in FIG. 56, a method of driving in the case where the setting operation to the current source circuit of the pixel is carried out in the non-lighting periods (Td3, Td4) of the sub-frame periods SF3 and SF4, and the setting operation of the current source circuit disposed in the signal line drive circuit is carried out during the period except for these periods is described with reference to the timing chart.

Figure 9:
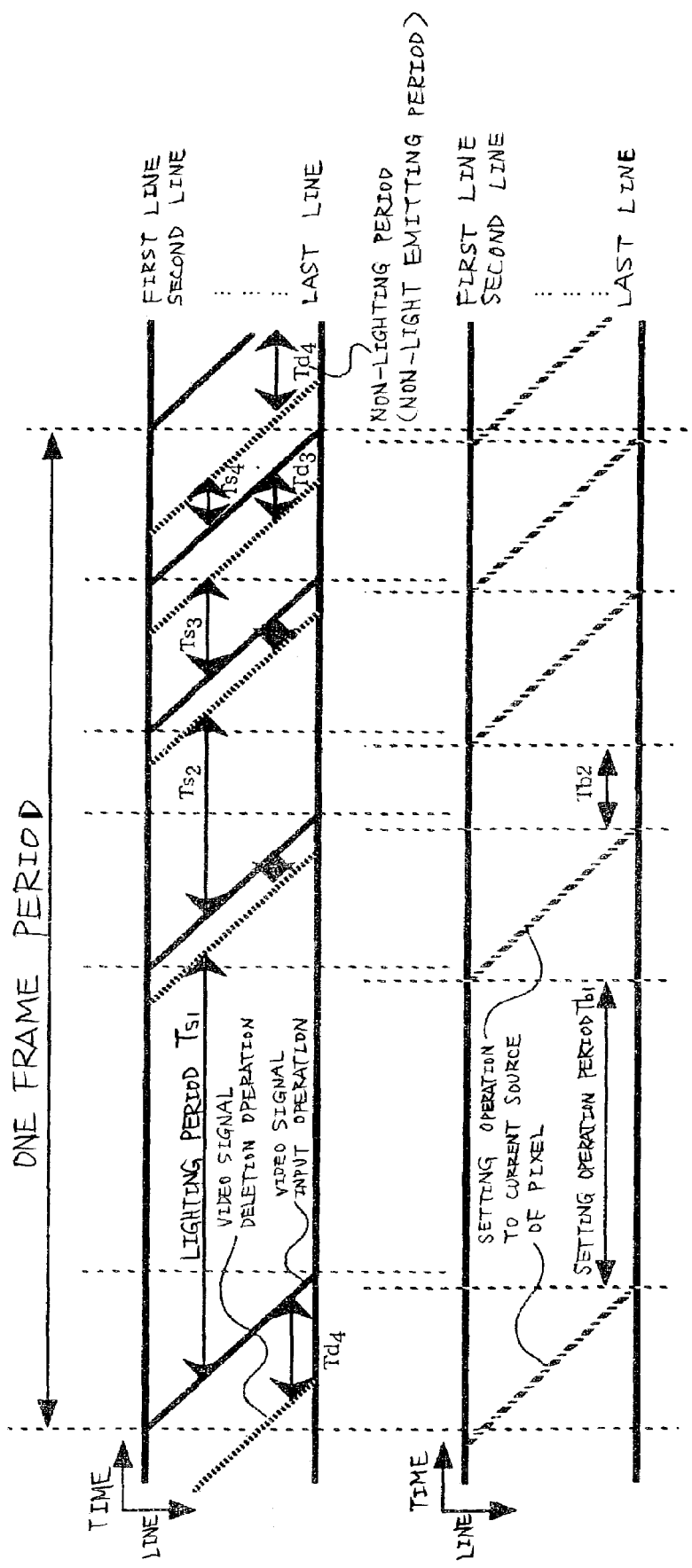
FIG. 9 is a timing chart.

It should be noted that it might be not sufficient for the setting operation with respect to the current source circuit of the pixel to carry out the setting operation only during the non-lighting period. Specifically, there are cases such as the case where it is desired that the setting operation with respect to the current source circuit of the pixel is sufficiently and precisely carried out by taking a long time, and the case where it is desired that the period during which the setting operation is carried out is increased. In such cases, as shown in FIG. 9, prior to the respective address periods, the non-lighting period is forcibly provided, and then, the setting operation with respect to the current source circuit of the pixel may be carried out.

So far, a method of driving in the case where the digital tone and the time tone were combined has been described with reference to the timing chart. Next, a method of driving in the case of an analog tone will be described below with reference to the timing chart. Here, a method of driving in the case where the setting operation with respect to the current source circuit of the signal line drive circuit and the input operation cannot be carried out at the same time will be also described below with reference to the timing chart.

First, suppose that the pixel is that shown in FIG. 13A or FIG. 13B. Suppose that the signal line drive circuit is of the configuration shown in FIG. 5 or FIG. 44. A method of driving in this case will be described below with reference to the timing chart of FIG. 10.

The scan line (first scan line 1102 shown in FIG. 13A, or first scan line 1132 shown in FIG. 13B) is selected line by line, the current is inputted from the signal line (reference numeral 1101 shown in FIG. 13A or reference numeral 1131 shown in FIG. 13B). This current is the value according to the video signal. This is carried out over the period of one frame period.

Figure 10:
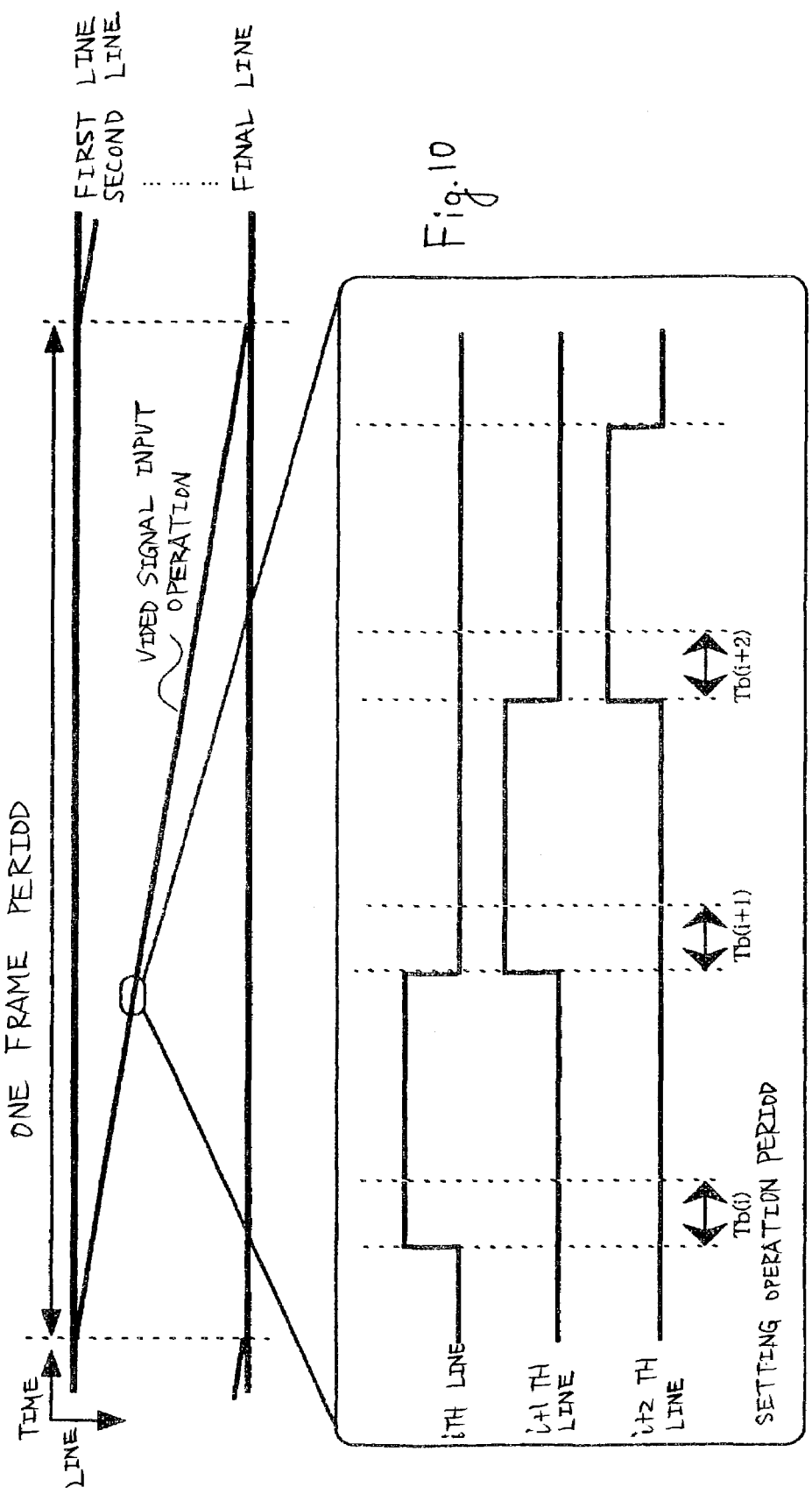
FIG. 10 is a timing chart.

Hereinbefore, an image display operation, that is, a method of driving concerning with the operation of the pixel has been described. Next, the timing of the setting operation of the current source circuit disposed in the signal line drive circuit will be described below. Here, it is defined that the setting operation and the input operation with respect to the current source circuit cannot be carried out at the same time. The input operation of the current source circuit of the signal line drive circuit is usually carried out over one frame period. Therefore, if it remains as it is, the setting operation of the current source circuit of the signal line drive circuit cannot be carried out. Hence, as shown in FIG. 10, during the period when the respective scan lines are selected (gate selection period, horizontal scan period), only the initial period, it is made so that the setting operation is carried out while the input operation of the current source circuit disposed in the signal line drive circuit is stopped. Specifically, during the respective horizontal scan period, the setting operation period Tb is disposed. It should be noted that that period may be corresponded to the retrace line period.

Figure 11:
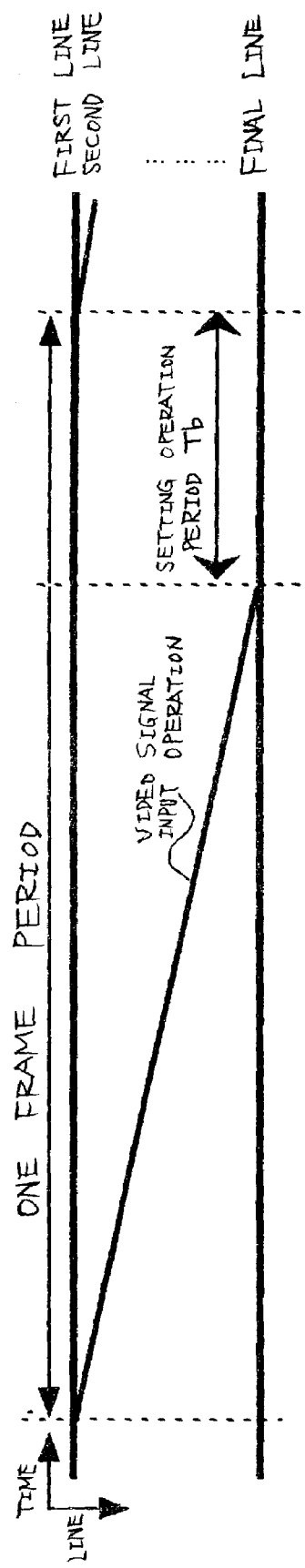
FIG. 11 is a timing chart.

Or, as shown in FIG. 11, the input operation of the current source circuit of the signal line drive circuit (input operation of video signal) is carried out in a period of some tens of percentages out of one frame period, during the remaining period, the setting operation of the current source circuit of the signal line drive circuit may be carried out. Specifically, one frame period includes a plurality of horizontal scan periods and the setting operation periods.

It should be noted that when the setting operation of the current source circuit of the signal line drive circuit is carried out, it is necessary to carry out in such a state where the current neither leaks nor enters another current. If the current leaks or anther current enters, in that state, the setting operation of the current source circuit is to be carried out. Then, the setting operation cannot be carried out with the precise value. Hence, it is necessary to make it in an OFF-state before the setting operation of the current source circuit of the signal line drive circuit in the case of the transistor 182 in FIG. 24, the transistors A, B and C in FIG. 45, or the like. However, in the case where the switch 203 is disposed as in FIG. 46, the current neither leaks nor enters another current, it is not necessary to consider these.

The present Example is capable of being optionally combined with Embodiments 1–8 and Example 1.

EXAMPLE 3

In this example, technical devices when performing color display will be described.

With a light emitting device comprised of an organic EL device, the luminance can be variable depending on the color even though current having the same magnitude is supplied to the light emitting device. In addition, in the case where the light emitting device has deteriorated over time, the deterioration degree is different depending on the color. Thus, when performing color display with a light emitting apparatus using light emitting devices, various technical devices are required to adjust the white balance.

The simplest technique is to change the magnitude of the current that is input to the pixel. To achieve the technique, the magnitude of the reference constant current source should be changed depending on the color.

Another technique is to use circuits as shown in FIGS. 6(C) to 6(E) for the pixel, signal line driver circuit, reference constant current source, and the like. In the circuits as shown in FIGS. 6(C) to 6(E), the W/L ratio of two transistors forming the current mirror circuit is changed depending on the color. Thus, the magnitude of the current to be input to the pixel can be changed depending on the color.

Still another technique is to change the length of a lightening period. The technique can be applied to either of the case where the time gradation method is employed and the case where the time gradation method is not employed. According to the technique, the luminance of each pixel can be adjusted.

The white balance can be easily adjusted by using any one of the techniques or a combination thereof.

This example may be arbitrarily combined with Embodiments 1 to 8 and Examples 1 and 2.

EXAMPLE 4

Figure 12A:
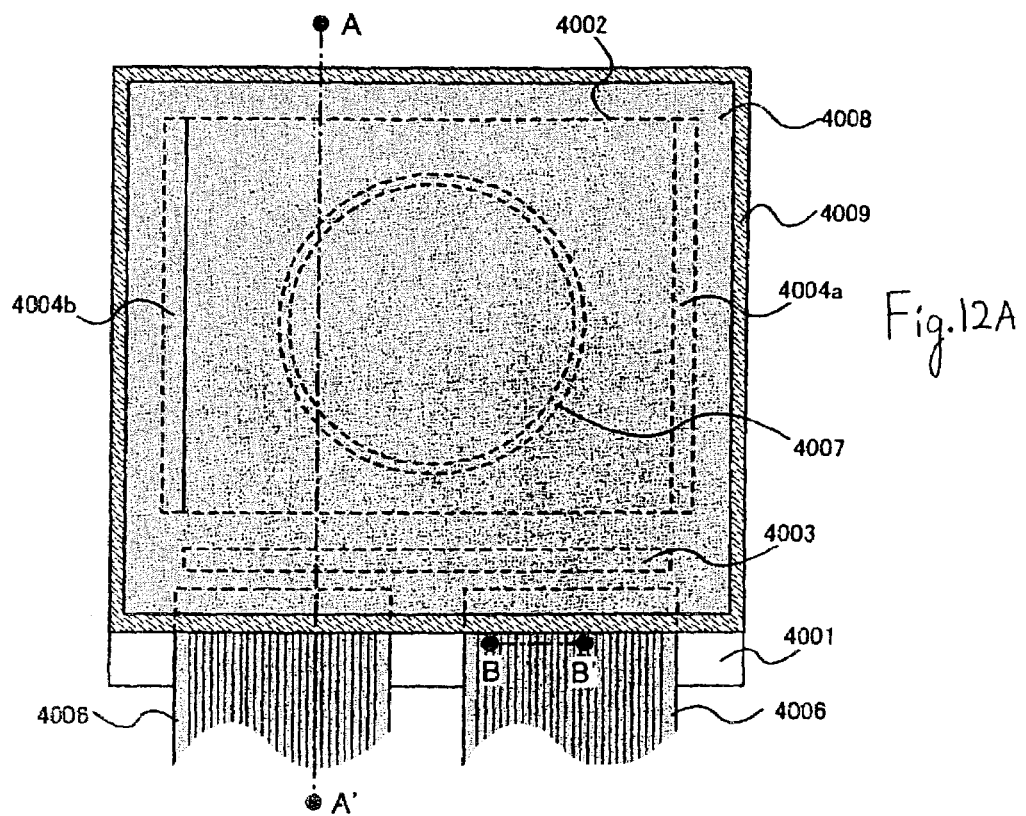
FIG. 12 is views of the appearance of a light emitting device.
Figure 12B:
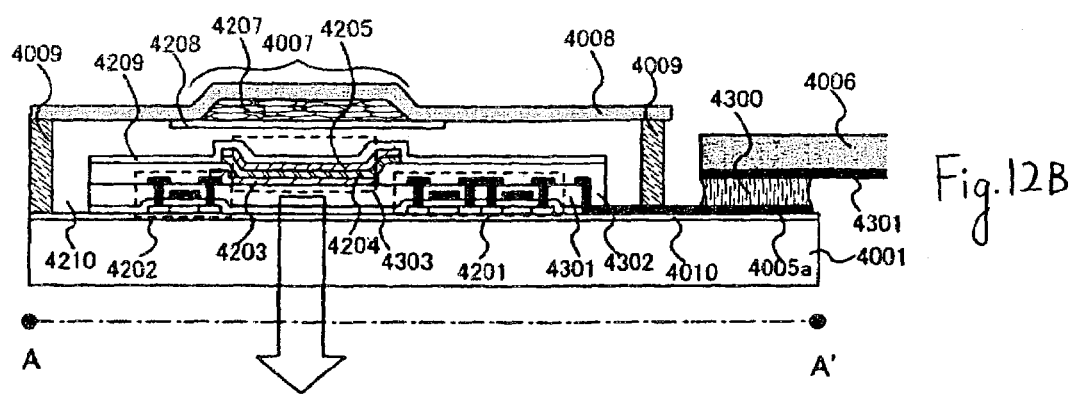
Figure 12C:
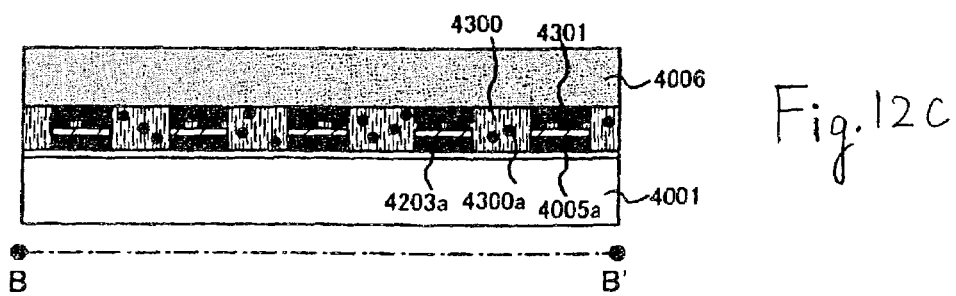

In this example, the appearances of the light emitting apparatus (semiconductor apparatus) of the present invention will be described using FIG. 12. FIG. 12 is a top view of a light emitting apparatus formed such that an element substrate on which transistors are formed is sealed with a sealing material; FIG. 12(B) is a cross-sectional view taken along the line A–A' of FIG. 12(A); and FIG. 12(C) is a cross-sectional view taken along the line B–B' of FIG. 12(A).

A sealing material 4009 is provided so as to enclose a pixel portion 4002, a source signal line driver circuit 4003, and gate signal line driver circuits 4004a and 4004b that are provided on a substrate 4001. In addition, a sealing material 4008 is provided over the pixel portion 4002, the source signal line driver circuit 4003, and the gate signal line driver circuits 4004a and 4004b. Thus, the pixel portion 4002, the source signal line driver circuit 4003, and the gate signal line driver circuits 4004a and 4004b are sealed by the substrate 4001, the sealing material 4009, and the sealing material 4008 with a filler material 4210.

The pixel portion 4002, the source signal line driver circuit 4003, and the gate signal line driver circuits 4004a and 4004b, which are provided over the substrate 4001, include a plurality of TFTs. FIG. 12(B) representatively shows a driving TFT (incidentally, an n-channel TFT and a p-channel TFT are shown in this example) 4201 included in the source signal line driver circuit 4003, and an erasing TFT 4202 included in the pixel portion 4002, which are formed on a base film 4010.

In this example, a p-channel TFT or an n-channel TFT that is manufactured according to a known method is used for the driving TFT 4201, and an n-channel TFT manufactured according to a known method is used for the erasing TFT 4202.

An interlayer insulating film (leveling film) 4301 is formed on the driving TFT 4201 and the erasing TFT 4202, and a pixel electrode (anode) 4203 for being electrically connected to a drain of the erasing TFT 4202 is formed thereon. A transparent conductive film having a large work function is used for the pixel electrode 4203. For the transparent conductive film, a compound of indium oxide and tin oxide, a compound of indium oxide and zinc oxide, zinc oxide, tin oxide, or indium oxide can be used. Alternatively, the transparent conductive film added with gallium may be used.

An insulating film 4302 is formed on the pixel electrode 4203, and the insulating film 4302 is formed with an opening portion formed on the pixel electrode 4203. In the opening portion, a light emitting layer 4204 is formed on the pixel electrode 4203. The light emitting layer 4204 may be formed using a known light emitting material or inorganic light emitting material. As the light emitting material, either of a low molecular weight (monomer) material and a high molecular weight (polymer) material may be used.

As a forming method of the light emitting layer 4204, a known vapor deposition technique or coating technique may be used. The structure of the light emitting layer 4204 may be either a laminate structure, which is formed by arbitrarily combining a hole injection layer, a hole transportation layer, a light-emitting layer, an electron transportation layer, and an electron injection layer, or a single-layer structure.

Formed on the light emitting layer 4204 is a cathode 4205 formed of a conductive film (representatively, a conductive film containing aluminum, copper, or silver as its main constituent, or a laminate film of the conductive film and another conductive film) having a light shielding property. Moisture and oxygen existing on an interface of the cathode 4205 and the light emitting layer 4204 are desirably eliminated as much as possible. For this reason, a technical device is necessary in that the light emitting layer 4204 is formed in an nitrogen or noble gas atmosphere, and the cathode 4205 is formed without being exposed to oxygen, moisture, and the like. In this example, the above-described film deposition is enabled using a multi-chamber method (cluster-tool method) film deposition apparatus. In addition, the cathode 4205 is applied with a predetermined voltage.

In the above-described manner, a light emitting device 4303 constituted by the pixel electrode (anode) 4203, the light emitting layer 4204, and the cathode 4205 is formed. A protective film is formed on the insulating film so as to cover the light emitting device 4303. The protective film is effective for preventing, for example, oxygen and moisture, from entering the light emitting device 4303.

Reference numeral 4005*a* denotes a drawing wiring that is connected to a power supply line and that is electrically connected to a source region of the erasing TFT 4202. The drawing wiring 4005*a* is passed between the sealing material 4009 and the substrate 4001 and is then electrically connected to an FPC wiring 4301 of an FPC 4006 via an anisotropic conductive film 4300.

As the sealing material 4008, a glass material, a metal material (representatively, a stainless steel material), ceramics material, or a plastic material (including a plastic film) may be used. As the plastic material, an FRP (fiberglass reinforced plastics) plate, a PVF (polyvinyl fluoride) film, a Mylar film, a polyester film, or an acrylic resin film may be used. Alternatively, a sheet having a structure in which an aluminum foil is sandwiched by the PVF film or the Mylar film may be used.

However, a cover material needs to be transparent when light emission is directed from the light emitting layer to the cover material. In this case, a transparent substance such as a glass plate, a plastic plate, a polyester film, or an acrylic film, is used.

Further, for the filler material 4210, ultraviolet curing resin or a thermosetting resin maybe used in addition to an inactive gas, such as nitrogen or argon; and PVC (polyvinyl chloride), acrylic, polyimide, epoxy resin, silicon resin, PVB (polyvinyl butyral), or EVA (ethylene vinyl acetate) may be used. In this example, nitrogen was used for the filler material.

To keep the filler material 4210 to be exposed to a hygroscopic substance (preferably, barium oxide) or an oxygen-absorbable substance, a concave portion 4007 is provided on the surface of the sealing material 4008 on the side of the substrate 4001, and a hygroscopic substance or oxygen-absorbable substance 4207 is disposed. The hygroscopic substance or oxygen-absorbable substance 4207 is held in the concave portion 4007 via a concave-portion cover material 4208 such that the hygroscopic substance or oxygen-absorbable substance 4207 does not diffuse. The concave-portion cover material 4208 is in a fine mesh state and is formed to allow air and moisture to pass through and not to allow the hygroscopic substance or oxygen-absorbable substance 4207 to pass through. The provision of the hygroscopic substance or oxygen-absorbable substance 4207 enables the suppression of deterioration of the light emitting device 4303.

As shown in FIG. 12(C), simultaneously with the formation of the pixel electrode 4203, a conductive film 4203*a* is formed so as to be contact with an upper portion of the drawing wiring 4005*a*.

In addition, the anisotropic conductive film 4300 includes a conductive filler 4300*a*. The substrate 4001 and the FPC 4006 are thermally press-bonded, whereby the conductive film 4203*a* on the substrate 4001 and the FPC wiring 4301 on the FPC 4006 are electrically connected via the conductive filler 4300*a*.

This example may be arbitrarily combined with Embodiments 1 to 8 and Examples 1 to 4.

EXAMPLE 5

A light emitting apparatus using light emitting devices are of self-light emitting type, so that in comparison to a liquid crystal display, the light emitting apparatus offers a better visibility in bright portions and a wider view angle. Hence, the light emitting apparatus can be used in display portions of various electronics.

Electronics using the light emitting apparatus of the present invention include, for example, video cameras, digital cameras, goggle type displays (head mount displays), navigation systems, audio reproducing devices (such as car audio and audio components), notebook personal computers, game machines, mobile information terminals (such as mobile computers, mobile telephones, portable game machines, and electronic books), and image reproducing devices provided with a recording medium (specifically, devices for reproducing a recording medium such as a digital versatile disc (DVD), which includes a display capable of displaying images). In particular, in the case of mobile information terminals, since the degree of the view angle is appreciated important, the terminals preferably use the light emitting apparatus. Practical examples are shown in FIG. 22.

FIG. 22(A) shows a light emitting unit, which contains a casing 2001, a support base 2002, a display portion 2003, a speaker portion 2004, a video input terminal 2005, and the like. The light emitting apparatus of the present invention can be applied to the display portion 2003. Further, the light emitting unit shown in FIG. 22(A) is completed with the present invention. Since the light emitting apparatus is of self-light emitting type, it does not need a back light, and therefore a display portion that is thinner than a liquid crystal display can be obtained. Note that light emitting units include all information display units, for example, personal computers, television broadcast transmitter-receivers, and advertisement displays.

FIG. 22(B) shows a digital still camera, which contains a main body 2101, a display portion 2102, an image receiving portion 2103, operation keys 2104, an external connection port 2105, a shutter 2106, and the like. The light emitting apparatus of the present invention can be applied to the display portion 2102. Further, the digital still camera shown in FIG. 22(B) is completed with the present invention.

FIG. 22(C) shows a laptop computer, which contains a main body 2201, a casing 2202, a display portion 2203, a keyboard 2204, external connection ports 2205, a pointing mouse 2206, and the like. The light emitting device of the present invention can be applied to the display portion 2203. Further, the light emitting device shown in FIG. 22(C) is completed with the present invention.

FIG. 22(D) shows a mobile computer, which contains a main body 2301, a display portion 2302, a switch 2303, operation keys 2304, an infrared port 2305, and the like. The light emitting apparatus of present invention can be applied to the display portion 2302. Further, the mobile computer shown in FIG. 22(D) is completed with the present invention.

FIG. 22(E) shows a portable image reproducing device provided with a recording medium (specifically, a DVD reproducing device), which contains a main body 2401, a casing 2402, a display portion A 2403, a display portion B 2404, a recording medium (such as a DVD) read-in portion 2405, operation keys 2406, a speaker portion 2407, and the like. The display portion A 2403 mainly displays image information, and the display portion B 2404 mainly displays character information. The light emitting device of the present invention can be used in the display portion A 2403 and in the display portion B 2404. Note that family game machines and the like are included in the image reproducing devices provided with a recording medium. Further, the DVD reproducing device shown in FIG. 22(E) is completed with the present invention.

FIG. 22(F) shows a goggle type display (head mounted display), which contains a main body 2501, a display portion 2502, an arm portion 2503, and the like. The light emitting device of the present invention can be used in the display portion 2502. The goggle type display shown in FIG. 22(F) is completed with the present invention.

FIG. 22(G) shows a video camera, which contains a main body 2601, a display portion 2602, a casing 2603, external connection ports 2604, a remote control reception portion 2605, an image receiving portion 2606, a battery 2607, an audio input portion 2608, operation keys 2609, an eyepiece portion 2610, and the like. The light emitting device of the present invention can be used in the display portion 2602. The video camera shown in FIG. 22(G) is completed with the present invention.

Here, FIG. 22(H) shows a mobile telephone, which contains a main body 2701, a casing 2702, a display portion 2703, an audio input portion 2704, an audio output portion 2705, operation keys 2706, external connection ports 2707, an antenna 2708, and the like. The light emitting device of the present invention can be used in the display portion 2703. Note that, by displaying white characters on a black background, the display portion 2703 can suppress the consumption current of the mobile telephone. Further, the mobile telephone shown in FIG. 22(H) is completed with the present invention.

When the emission luminance of light emitting materials are increased in the future, the light emitting device will be able to be applied to a front or rear type projector by expanding and projecting light containing image information having been output lenses or the like.

Cases are increasing in which the above-described electronic devices display information distributed via electronic communication lines such as the Internet and CATVs (cable TVs). Particularly increased are cases where moving picture information is displayed. Since the response speed of the light emitting material is very high, the light emitting apparatus is preferably used for moving picture display.

Since the light emitting apparatus consume the power in light emitting portions, information is desirably displayed so that the light emitting portions are reduced as much as possible. Thus, in the case where the light emitting apparatus are used for a display portion of a mobile information terminal, particularly, a mobile telephone, an audio playback device, or the like, which primarily displays character information, it is preferable that the character information be formed in the light emitting portions with the non-light emitting portions being used as the background.

As described above, the application range of the present invention is very wide, so that the invention can be used for electronics in all of fields. The electronics according to this example may use the light emitting apparatus with the structure according to any one of Embodiments 1 to 8 and Examples 1 to 4.

The present invention having the structures described above can suppress influences of variation in characteristics of TFTs, and can supply a desired current to the outside.

The present invention provides the signal line driver circuit having two shift registers (the first and the second shift registers). One of the two shift register is the power source circuit and the other is the circuit for controlling a video signal, for example, for controlling a latch circuit, a sampling switch, and the switch 101 (signal current control switch). Accordingly, it is possible to operate the first and the second shift registers independently, and it leads inevitably to perform a setting operation of the power source circuit and the image display operation independently. The composition of the present invention capable of operating the power source circuit and the latch circuit independently is very beneficial because the setting operation can be performed with accuracy when it has enough time for the setting operation.

Note that a shift register includes a flip-flop circuit, a decoder circuit, or the like. In the case where the shift register includes the flip-flop circuit, in general, a plurality of wirings are sequentially selected from the first column to the last column. On the other hand, in the case where the shift register is comprised of the decoder circuit or the like, a plurality of wiring are selected at random. If the plurality of wiring can be selected at random, the setting signal become able to be output at random. Thus, setting operation of the current source circuit can be performed randomly instead of being performed sequentially from the first column to the last column. When the setting operation can be performed at random for the current source circuit, various advantages are exhibited. For example, a sufficient time can be arbitrarily used to perform the setting operation for the current source circuit. In addition, in the case where periods during which the setting operation can be performed are dotted in one frame, when an arbitrary column can be selected, the degree of freedom is increased, and a setting operation period can be sufficiently secured. One of other advantages is that the influence of charge leakage in a capacitor device disposed in the current source circuit can be made inconspicuous. Thus, when a defect has occurred in association with the setting operation, the defect can be made inconspicuous.

What is claimed is:

1. A signal line drive circuit comprising:
a plurality of current source circuits corresponding to a plurality of wirings;
a first shift register and a second shift register; and
a latch circuit,
wherein in each of said plurality of current source circuits, a supplied current is converted into a voltage according to a first sampling pulse supplied from said first shift register,
wherein said voltage is held in a capacitor provided in each of said plurality of current source circuits,
wherein a current corresponding to said voltage is outputted from each of said plurality of current source circuits according to a video signal, and
wherein said latch circuit operates according to a second sampling pulse supplied from said second shift register.

2. A signal line drive circuit comprising:
a first current source circuit and a second current source circuit;
a first shift register and a second shift register; and
a latch circuit,
wherein in each of said first current source circuit and said second current source circuit, a supplied current is converted into a voltage according to a first sampling pulse supplied from said first shift register,
wherein said voltage is held in a capacitor provided in one of said first current source circuit and said second current source circuit,
wherein a current corresponding to said voltage is outputted from the other of said first current source circuit and said second current source circuit according to a video signal, and
wherein said latch circuit operates according to a second sampling pulse supplied from said second shift register.

3. A signal line drive circuit comprising n pieces of current source circuits (n is natural number of 2 or more) corresponding to a plurality of wirings;
a first shift register and a second shift register; and
a latch circuit,
wherein in each of said n pieces of current source circuits, a supplied current is converted into a voltage according to a first sampling pulse supplied from said first shift register,
wherein said voltage is held in a capacitor provided in each of said n pieces of current source circuits,
wherein a current corresponding to said voltage is outputted from each of said n pieces of current source circuits according to a video signal, and
wherein said latch circuit operates according to a second sampling pulse supplied from said second shift register.

4. The signal line drive circuit as claimed in any one of claims 1–3, wherein said signal line drive circuit comprises m pieces of constant current sources for reference,
current values supplied from said m pieces of constant current sources for reference are set at $2^0:2^1:\ldots:2^{m-1}$.

5. The signal line drive circuit as claimed in claim 4, wherein said m pieces of constant current sources for reference corresponds to bit different from each other.

6. The signal line drive circuit as claimed in any one of claims 1–3, wherein sampling pulses supplied from said first shift register are outputted to a plurality of columns at the same time.

7. The signal line drive circuit as claimed in any one of claims 1 and 3, wherein said plurality of wirings are a plurality of signal lines or a plurality of current lines.

8. The signal line drive circuit as claimed in any one of claims 1 and 3, wherein said first shift register and said second shift register are configured only with a flip-flop circuit, and said plurality of wirings are in turn selected.

9. The signal line drive circuit as claimed in any one of claims 1 and 3, wherein said first shift register or said second shift register is configured with a decoder circuit, and said plurality of wirings are selected at random.

10. The signal line drive circuit as claimed in any one of claims 1 and 3, wherein said first shift register or said second shift register is configured with a flip-flop circuit, a first latch to which a column selection signal is inputted and a logic operator to which a selection control signal is inputted, and said plurality of wirings are selected at random.

11. The signal line drive circuit as claimed in any one of claims 1 and 3, wherein said first shift register or said second shift register is configured with a flip-flop circuit, a first latch to which a column selection signal is inputted, and a second latch to which a latch signal for selection is inputted, and said plurality of wirings are selected at random.

12. The signal line drive circuit as claimed in any one of claims 1–3, wherein said capacitor maintains a voltage generated between a gate and a source of a transistor of said current source circuits by a current supplied when a drain and said gate of said transistor are in a short-circuited state.

13. The signal line drive circuit as claimed in any one of claims 1–3, wherein each of said current source circuits comprises a transistor, a first switch for controlling a conduction between a gate and a drain of said transistor, a second switch for controlling a conduction between a constant current source for reference and said gate of said transistor, and a third switch for controlling a conduction between said drain of said transistor and a pixel.

14. The signal line drive circuit as claimed in any one of claims 1–3, wherein said capacitor maintains a voltage generated between a gate and a source of a first or second transistor of said current source circuits by a supplied current when drains and gates of both of said first and second transistors are in a short-circuited state.

15. The signal line drive circuit as claimed in any one of claims 1–3, wherein said current source circuits have a current mirror circuit configured with a first and a second transistor, a first switch for controlling a conduction between a gate and a source of said first and said second transistors, and a second switch for controlling a conduction between a constant current source for reference and gates of said first and said second transistors.

16. The signal line drive circuit as claimed in any one of claims 1–3, wherein said capacitor maintains a voltage generated between a gate and a source of one of a first and a second transistor of said current source circuits by a supplied current when a drain and said gate of said one of said first and said second transistors are in a short-circuited state.

17. The signal line drive circuit as claimed in any one of claims 1–3, wherein each of said current source circuits comprises,
- a current mirror circuit including a first and a second transistor,
- a first switch for controlling a conduction between a constant current source for reference and a drain of said first transistor,
- a second switch for controlling a conduction of any one selected from a conduction between a drain and a gate of said first transistor, a conduction between said gate of said first transistor and a gate of said second transistor and a conduction between said gates of said first and said second transistors and said constant current source for reference.

18. The signal line drive circuit as claimed in claim 15, wherein a gate width/gate length of said first and said second transistors is set at the same values.

19. The signal line drive circuit as claimed in claim 16, wherein a gate width/gate length of said first and said second transistors is set at the same values.

20. The signal line drive circuit as claimed in claim 17, wherein a gate width/gate length of said first and said second transistors is set at the same values.

21. The signal line drive circuit as claimed in claim 15, wherein a gate width/a gate length of said first transistor is set at a value larger than that of a gate width/a gate length of said second transistor.

22. The signal line drive circuit as claimed in claim 16, wherein a gate width/a gate length of said first transistor is set at a value larger than that of a gate width/a gate length of said second transistor.

23. The signal line drive circuit as claimed in claim 17, wherein a gate width/a gate length of said first transistor is set at a value larger than that of a gate width/a gate length of said second transistor.

24. The signal line drive circuit as claimed in any one of claims 1–3, wherein each of said current source circuits comprises a transistor, a first and a second switch for controlling supply of a current to said capacitor and a third switch for controlling a conduction between a gate and a drain of said transistor, and
- a gate of said transistor is connected to said first switch, a source of said transistor is connected to said second switch, and a drain of said transistor is connected to said third switch.

25. The signal line drive circuit as claimed in any one of claims 1–3, wherein each of said current source circuits comprises a current mirror circuit including a pieces of transistors (a is natural number of 2 or more),
- a gate width/a gate length of said a pieces of transistors is at $2^0:2^1:\ldots:2^{a-1}$, and a drain current of said a pieces of transistors is at $2^0:2^1:\ldots:2^{a-1}$.

26. The signal line drive circuit as claimed in claim 12, wherein said transistor operates in a saturated region.

27. The signal line drive circuit as claimed in claim 12, wherein an active layer of said transistor is formed using a polysilicon.

28. The signal line drive circuit as claimed in any one of claims 1–3, wherein said first and said second shift registers operate at different frequencies.

* * * * *